March 21, 1961 T. A. BANNING, JR., ET AL 2,976,354

TAPE RECORDING AND TRANSLATING AND THE LIKE

Filed May 4, 1954 21 Sheets-Sheet 1

Inventors:
Thomas A. Banning, Jr. &
Emil L. Ranseen,
by Thos. A. Banning Jr.
Atty.

TAPE RECORDING AND TRANSLATING AND THE LIKE

Filed May 4, 1954 21 Sheets-Sheet 2

Inventors:
Thomas A. Banning, Jr., &
Emil L. Ranseen,
by Thos. A. Banning, Jr.
Atty.

TAPE RECORDING AND TRANSLATING AND THE LIKE

Filed May 4, 1954 21 Sheets-Sheet 3

Inventors:
Thomas A. Banning, Jr., &
Emil L. Ransom,
By [signature] Atty.

TAPE RECORDING AND TRANSLATING AND THE LIKE

Filed May 4, 1954 21 Sheets-Sheet 4

Inventors:
Thomas A. Banning, Jr. &
Emil L. Ranseen,
by [signature] Atty.

Inventors:
Thomas A. Banning, Jr.
& Emil L. Ranseen,
by [signature]
Atty.

TAPE RECORDING AND TRANSLATING AND THE LIKE

Filed May 4, 1954 21 Sheets-Sheet 6

Inventors:
Thomas A. Banning, Jr., &
Emil L. Ranseen,
by Thos. A. Banning Jr.
Atty.

Inventors:
Thomas A. Banning, Jr. & Emil L. Ranseen,
by [signature] Atty.

March 21, 1961 T. A. BANNING, JR., ET AL 2,976,354

TAPE RECORDING AND TRANSLATING AND THE LIKE

Filed May 4, 1954 21 Sheets-Sheet 8

Inventors:
Thomas A. Banning, Jr. &
Emil L. Ranseen,
by [signature]
Atty.

March 21, 1961 T. A. BANNING, JR., ET AL 2,976,354

TAPE RECORDING AND TRANSLATING AND THE LIKE

Filed May 4, 1954 21 Sheets-Sheet 9

Inventors:
Thomas A. Banning, Jr. & Emil L. Ranseen,
by [signature] Atty.

TAPE RECORDING AND TRANSLATING AND THE LIKE

Filed May 4, 1954 21 Sheets-Sheet 10

Inventors:
Thomas A. Banning, Jr. & Emil L. Ronseen,
by Thos. A. Banning Atty.

Inventors:
Thomas A. Banning Jr. & Emil L. Ranseen,
by [signature] Atty.

TAPE RECORDING AND TRANSLATING AND THE LIKE

Filed May 4, 1954 21 Sheets-Sheet 12

Inventors:
Thomas A. Banning, Jr., &
Emil L. Ranseen,
by [signature]
Atty.

Inventors:
Thomas A. Banning, Jr. & Emil L. Ranseen,
by Ths. A. Banning Jr. Atty.

Inventors:
Thomas A. Banning, Jr. &
Emil L. Ranseen,
by [signature]
Atty.

TAPE RECORDING AND TRANSLATING AND THE LIKE

Filed May 4, 1954 21 Sheets-Sheet 15

Inventors:
Thomas A. Banning, Jr., &
Emil L. Ranseen,
by [signature] Atty.

Fig. 79. "A"

Inventors:
Thomas A. Banning Jr.,
& Emil L. Ranseen,
by Thos. A. Banning Jr.
Att'y.

March 21, 1961 T. A. BANNING, JR., ET AL 2,976,354

TAPE RECORDING AND TRANSLATING AND THE LIKE

Filed May 4, 1954 21 Sheets-Sheet 17

Inventors:
Thomas A. Banning, Jr.
& Emil L. Ranseen,
by Thos. A. Banning Jr.
Atty.

TAPE RECORDING AND TRANSLATING AND THE LIKE

Filed May 4, 1954 21 Sheets-Sheet 18

Inventors:
Thomas A. Banning, Jr. &
Emil L. Ragseen,
by Thos. A. Banning Jr.
Atty.

TAPE RECORDING AND TRANSLATING AND THE LIKE

Filed May 4, 1954 21 Sheets-Sheet 19

Inventors:
Thomas A. Banning, Jr., &
Emil L. Ranseen,
by [signature]
Atty.

TAPE RECORDING AND TRANSLATING AND THE LIKE

Inventors:
Thomas A. Banning, Jr. &
Emil L. Ramseen,
by [signature]
Atty.

March 21, 1961 T. A. BANNING, JR., ET AL 2,976,354

TAPE RECORDING AND TRANSLATING AND THE LIKE

Filed May 4, 1954 21 Sheets-Sheet 21

Inventors:
Thomas A. Banning, Jr., &
Emil L. Ransee[illegible],
by [signature] Atty.

United States Patent Office 2,976,354

Patented Mar. 21, 1961

2,976,354

TAPE RECORDING AND TRANSLATING AND THE LIKE

Thomas A. Banning, Jr., and Emil L. Ramseen, Chicago, Ill., assignors, by direct and mesne assignments, to Thomas A. Banning, Jr., as trustee Filed May 4, 1954, Ser. No. 427,428

28 Claims. (Cl. 178—6.6)

This invention relates to improvements in tape recording and translating, and the like. As will appear in full detail hereinafter, the present improvements have been devised with especial reference to the recording and translating of very high frequency signals, such as must be handled in the recording and playing-back of television signals, but it will also appear that various of the features herein disclosed are also applicable to use in connection with recording and translating many other kinds or classes of signals than those which occur in television operations. We contemplate these many other kinds and classes of signals as being within the purview of our present invention, and as being generally included within the title by which this case is defined. In order that proper understanding of various features herein disclosed may be had, and to emphasize the relationships of various of said features to each other, the following comments are deemed to be in order:

A prime object of our invention relates to the ability to record and translate signals of extremely high frequency, of the order of several or many megacycles, with faithful recording of such signals, and without need of using tape speeds of excessive value. In this connection it is well understood that the rate of tape scan required for any frequency of signals is dependent on the closeness with which the signals can be recorded, that is, the tape distance required between successive signals, in order to ensure accurate recording and subsequent translation of the signals faithfully and without blur or intermixing of successive signal values improperly. Much experience has indicated that when using magnetic recordings on tape which is provided with a coating of magnetizable powder or fine granular material, successive signal variations may be accurately recorded and translated when such signals are spaced not less than substantially one one-thousandth of an inch from each other on the tape—that is, when there are not more than substantially one thousand signal variations within one inch of scan of the tape. This practical limitation is presently imposed by the sizes of magnetizable particles, the regularity with which they may be distributed over the tape surface, and above all, the technical qualities of the recording head elements and of the sensing equipment used during translation. It is to be expected that with improved equipment for recording and sensing it may become possible to increase the number of signal variations which may be properly recorded and translated for a specified tape spacing, but even so, any such improvements will also work to the benefit of the improved equipment and the improved method or recording and sensing hereinafter to be disclosed, so that the present improvements will still maintain a proportionately advanced position in this art.

When the recordings are made as a linear record along the length of the tape it is evident that the limitation of substantially one thousand record variations per inch directly affects the length of tape which must be provided for the recording of a specified number of signal variations. Likewise, when the recording is made according to such linear principle it is evident that the tape speed needed for recording and translating signal variations of any specified frequency is directly affected by the signal variation frequency, being the quotient of the rate of such signal variations divided by the factor of 1,000, such quotient generally being expressed in inches per second of tape travel, the frequency being expressed in variations per second. Thus, for recording and translating sound signals, within the range usually accepted as covering the ability of the human ear to effect detection, namely, fifteen to twenty thousand waves per second, it is completely possible to record and translate such sound signals conveniently by use of a conventional lineal scan or recording, along the length of the tape. Under such a system of recording the tape speed need not exceed approximately fifteen to twenty inches per second, to stay within the accepted limit of one thousand signal variations per inch of recording. Speeds of tape travel of that amount are completely acceptable in the art as presently developed, and excellent recordings and translations of the signal variations of frequencies just mentioned may be effected. Such frequencies of signal variations as just mentioned are, however, far below those which must be handled and recorded and translated for such arts as television recordings, and even for recording and translating radio frequency signals when used as carrier frequencies for audio intelligence. Here we are dealing with frequencies running into several or many millions per second. Linear tape recordings of such frequencies would require tape travels of upwards of several or many thousands of inches per second, if made according to conventional schemes of recording and translation, even when using multiple tracks and multiple recording and translating heads.

The signal variations currently expected in television operations are of the order of three to five million per second, that is, 3 to 5 megacycles. The radio frequencies currently used as carriers within the so-called broadcast band are between about 0.560 and 1.560 megacycles (560 to 1560 kilocycles). It is thus apparent that arrangements capable of recording and translating the currently expected signal variations for television operations should also be able, as far as frequencies of signal variations are concerned, to also take care of recordings and translations of radio frequency carrier signals within the broadcast band as currently assigned by the competent authorities of the F.C.C. In fact much higher radio frequencies of signals may also be successfully recorded and translated than those covered by the broadcast band, since signal variations of two or three times the highest radio frequency signals of that band can be successfully recorded and translated by use of the improvements hereinafter disclosed.

Here it should be noted that the term "signal variations" is intended to refer to variation of signals which variations are of intensity, such as the intensity of an electron beam; but nevertheless that term also covers and is intended to cover and refer to frequency variations, since the instantaneous intensity of the electron beam responding to amplified signals must necessarily follow radio frequency amplitude variations, either of a single radio frequency received at the receiving antenna, or of a multitude of radio frequencies also received at a common antenna. When using the term "signal variations" in reference to television signals it is understood that the signal variations are those of the intensity of the electron beam following the successive scans of the raster, since, during each scan many variations of intensity occur. Thus said term is intended to refer to the variations of intensity of the signals being recorded or translated on the tape, and by use of our presently disclosed improvements.

An important feature and object of our present invention relates to the provision of recordings wherein the total recording on the tape comprises a series of successive cross-scans extending across that portion of the tape width which is or may be assigned for receiving and retaining the recording now being referred to. These cross-scans are made while the tape is travelling at substantially uniform speed so that each scan is displaced from preceding and following scans by a tape distance equal to the amount of tape travel effected during the time consumed in producing the scan and starting the next scan. All of these scans extend from one edge to the opposite edge (when produced according to presently conventional scanning means, as hereinafter illustrated and described), but we also contemplate and include as being within the purview of our invention scanning arrangements in which the scans are produced alternately in opposite directions so that the proximate ends of successive scans come together at the edges of the scanned area. At this point we mention the foregoing since the currently accepted scanning arrangements in television operations include scans produced by conventional saw-tooth generators, so that actually each scan starts at the same edge as all other scans, and extends to the opposite edge of the raster and is followed by a succeeding scan which also extends in that same direction across the raster, being displaced from the previous scan by a stated amount depending on the absolute size of the raster produced by the operation. This type of scanning presents the important advantage that the amount of separation between scans is constant across the raster, whereas such separation would vary from zero at one edge of the raster to a maximum in the center of the raster, and back to zero at the other edge of the raster where connection would be effected to the succeeding scan, if the alternate direction of scanning were to be used. However, we wish it understood that we contemplate as being within the scope of our present invention both types or forms of scan, except as we may limit ourselves in the claims to follow.

Now the distance required between successive scans as produced across the scanned area may be made as small as is consistent with effecting a good recording, wherein the signals carried by each scan do not overlap or interfere with the signals of the previous and succeeding scans. The length of each scan across the scanned area may be made as great as desired, but when recording television signal variations it is desirable that each cross scan of the electron beam of the receiver kinescope be accompanied by a like or corresponding cross scan effected on the recording tape. That is, there will then be, on the tape, one cross scan for each cross scan of the beam on the phosphor surface of the receiver kinescope; and each such cross scan on the tape will include variations of intensity of the record exactly corresponding to the intensity variations of the electron beam effecting the scans on the kinescope phosphor screen. There will also be, on the tape record, one cross scan for each such kinescope cross scan, regardless of whether that cross scan of the kinescope be for a monochrome signal translation, or for a color signal translation. There will also be, on the tape recording as many cross scans, in a given interval of time, as there are cross scans produced on the kinescope screen; and also, the rate of cross scanning on the tape recording will be equal to the rate of cross scanning effected on the kinescope screen of the television recorder.

The term "rate" as used in the preceding sentence has to do with the number of scans effected per second, both in the receiver kinescope and on the tape recording. Under current regulations of the F.C.C. that rate is 15,750 scans per second, being 525 scans for each of 30 frames completed per second. Accordingly, the tape will receive 15,750 cross scans per second. The linear travel of the tape may then be determined by assuming the separation between successive scans along the tape. If that separation be assumed as two one-thousandths of an inch, it is evident that the linear tape travel will be 31.50 inches per second. For other assumed amounts of separation between successive scans the tape travel will be correspondingly faster or slower according as the separation between successive scans be greater or less than such assumption of two one-thousandths of an inch. Even for an assumed separation of as much as one one-hundreth of an inch the necessary tape travel would only amount to 157.50 inches per second, or about 13.13 feet per second. We shall presently disclose means to effect very close cross scans on the tape, and to translate such close cross scans very certainly and without cross interference between successive scans, thus making possible the use of relatively slow or small rates of tape travel to meet the imposed conditions of the present and related problems of recording and translation of such signals and signal variations.

At this point we call attention to the fact that by our cross scan arrangement we produce in effect an "area" of scan since the portion of tape which is subjected to recording operations has length along the tape as well as width across the tape. That width will be selected conveniently according to the purpose and object of the recordings, together with the number of signal variations which are expected to occur during each cross scan. If the expected number of signal variations be of the order of 300 for each or any scan, then a width of the scanned area (length of each cross scan) may be, say, 1½ inches, with corresponding production of 200 signal variations per inch of cross scan, a rather small number, or conversely, a liberal allowance or spacing between expected signal variations. Thus, the scanned area may be of width of, say, 1½ inches. The provision of means to produce a scanned "area" as distinguished from a lineal scan along the length of the tape, makes is possible to effect reduction of the required rate of tape travel by an enormous amount, together with corresponding reduction of the linear length of tape required for the recording of a production or events having a duration of one or two hours. The amount of reduction of tape length required for a recording of given time duration may be readily determined as the number of cross scans which may be produced during a tape travel equal to the cross scan length. Thus, if that cross scan length be 1½ inches, and the number of cross scan per inch be 500 (two one-thousandths of an inch apart), then the tape length required for the recording according to our cross scan operation will be one seven hundred and fiftieth of that length which would have been required for a single lineal scan. Or, if the spacing between successive scans be one one-hundredth inch (100 scans per inch), even so, the reduction in tape length will be of the order of one one-hundred and fiftieth of that tape length which would have been required for a lineal scan of the program length in question.

The foregoing comparisons have been made on the assumption that the allowed distance between signal variations is the same in both of the compared systems of recording.

It is here mentioned that during the operation of recording the cross scans are produced on the surface of the tape, either by laying onto that surface signal effects which are of magnitude proportional to the strengths of the successively received signals, or as modulations on the surface of a charge or magnetic effect previously produced on the tape surface. In either case the recording of the signals in cross scans can be and is effected without need of coordinating the locations of such cross scans with other previously determined or produced signals on the tape. It is here pointed out, however, that during the production of such cross scan recordings we also produce on the tape regularly spaced synchronizing signals which are of use in effecting the proper scanning effects during subsequent translations and "play-back."

During such subsequent translation or "play-back" the scanning sensor effects cross scans exactly corresponding to the forms of the cross scans previously recorded on the tape. If those cross scans be straight cross lines, they are scanned by scanning equipment which produces corresponding straight cross scanning sensing operations. If the cross scans laid down on the tape during the recording are of curved form (as will hereinafter appear to be very desirable), then they are scanned during the translation or play-back by corresponding cross scanning sensing operations.

It is also noted that the rate of the cross scanning sensing operations during play-back must be exactly such as will ensure correct cross scanning of each cross scan of the tape as it comes to the position of scan of the sensing unit, so that such sensing unit will be affected and caused to respond according to the strength of the recorded signal at each point along the cross scan sensed; and also so that the sensing unit will remain in correct registry with each cross scan recording of the tape during the complete sensing of such cross scan from one end thereof to the other. We have made provision for effecting all of these operations and meeting all of these requirements, as well as many others hereinafter to be disclosed.

Reference has been made to the production of regularly spaced synhcronizing signals on the tape during the recording operation. These may be coordinated with suitable synchronizing elements of the translating interpretation equipment so that during translation or play-back the operations of the electron beam of the kinescope on which the play-back is produced will be properly coordinated with the cross scanning operations of thre tape sensing unit. When a recording is being produced means must be available which will deliver to the equipment of the recorder the signals for production of such synchronizing signals in order that said signals shall be properly placed on the tape. When the recorder is being used for the recording of a program coming in from the ether and received through the antenna of a television receiver, that receiver itself is provided with means responsive to the received synchronizing signals to ensure that the scans of the receiver kinescope shall be properly synhcronized with the signals emitted by the sending station; and under these conditions of recording a program received over the ether said synchronizing signals from the sending station may also be used for production of the synchronizing signals placed on the tape in regularly spaced and signal coordinated fashion. Then, when such so-recorded program is afterwards played-back into the kinescope of the television receiver both the kinescope scans and the cross scans of the recorded tape may be synchronized to ensure that the receiver kinescope's scans will be properly synchronized with the signals delivered by the recorder as the successive scans are sensed.

When the recorder is being used to record signals without the simultaneous presence of a conventional television receiver and its synchronizing elements for production of the synchronizing signals in harmony with the synchronizing signals received over the ether, means must be provided as a portion of the recorder equipment to produce synchronizing operations which may be placed on the tape in proper harmony with the cross scans. We have made provision for all of the foregoing and other synchronizing requirements.

When the recorder is being used to record operations of a commercial nature or like operations, generally but not always from so-called "closed circuits," such equipment must of itself be provided with the means to produce the needed synchronizing signals, either as a portion of the sending portion of such closed circuit equipment, or as a portion of the recording equipment thereof.

We have made provision for meeting the requirements of such arrangements.

Furthermore, when a recorder "commercial recording" has been made, such as just referred to, and it is desired to play-back such commercial recording, means must be provided for ensuring proper synchronization of the scanning operations of the kinescope or kinescopes of such commercial equipment's receiver with the cross scan operations of the recorder whereon the recording was made, or the tape produced thereby. We have made such provision.

It is thus here noted that we have made provision for ensuring proper synchronization of the cross scanning operations of the recorder's equipment with received signals, whether from the ether or from a closed circuit, with the scanning operations of the receiving equipment whereon the recorder program of the recorder is to be and is being reproduced. We shall hereinafter disclose various circuit arrangements for various of such and other operations, together with provisions of means to ensure proper synchronization of the recorder's cross scans with the scanning operations of the receiver or reproducer which is fed by such recorder.

Since the rate of tape travel must be correct at all times for production of the cross scans and for sensing of such cross scans after they have been produced, and since such rate of tape travel must also be correct to ensure that the rate of cross scan arrivals of the tape record at the location of the sensing unit shall harmonize with the scanning operations of the receivng equipment, it is necessary to provide means, as a portion of the synchronizing equipment, for ensuring a very closly regulated control of the rate of tape travel. Otherwise proper sensing and interpreting operations of the recorder and of the receiver will not occur. We have made such provision in the disclosures hereinafter described. Generally it may here be mentioned that extremely close regulation of the usual public service A.C. is provided, so that the variations of frequnecy of the delivered current are well within a minute fraction of one percent either side of the normal or average frequency. Accordingly, we provide, as a portion of our recorder equipment, synchronous motor means to drive and advance the tape, which tape is provided with sprocket driven perforations, so that the tape is positively prevented from slippage with respect to the motor drive elements, the sprockets. Then, when reliance is placed on the synchronizing signals which are received over the ether as a portion of the received television program, for producing the synchronizing signals on the recording tape, it is evident that the synchronizing signals recorded on the tape will occupy locations extremely close to the proper locations which they should occupy with respect to the corresponding cross scans. Then, when play-back is being effected, such synchronizing signals will be sent out by the tape record at exactly the proper times to ensure corrections of the operation of the receiving equipment of the television set according to the synchronizing signals which were previously emitted for the program now being played-back. The necessary corrective operations may be and are then made in the receiver itself to ensure periodical correction based on the reproductions of the synchronizing signals which were actually sent out on the original program now being played-back. Usually such corrective signals are emitted by the sending station at one corner of each new frame of scans, and in any case the synchronizing signals recorded by the tape will occupy positions corresponding to those positions occupied by the synchronizing signals of the original program.

It is to be noted that in any case, since the synchronizing signals are received from the tape record corresponding to a specified position of all frames recorded, generally a specified corner of the frame, it follows that correction is made after each 525 scans (or in some cases, each 262.5 scans), so that even if the correction should eliminate a full line of scan the correction effect would not be noticeable to the observer. In fact, no more noticeable effect will be thus produced than is produced during the reception of a conventionally produced, received, and reproduced television program.

We have provided the means for effecting all of the operations heretofore described, as will hereinafter appear in full detail.

Conveniently the synchronizing signals are produced as a row along one edge portion of the tape, and outside of the cross scanning area. We wish to point out, however, that if desired these synchronizing signals may be planted onto the area of the cross scans, and in such case they will be properly picked up and forwarded to the amplifying and/or other equipment, in accordance with well understood principles in this art.

Conveniently, also, we have provided means to make a linear recording of the sound signals received during a television or like program. Such linear recording, when produced, may also be located along one of the edges of the tape, with suitable provision for its production, and for its interpretation or sensing, and forwarding to amplifying or other suitable equipment. It is here noted that since the rate of linear travel of the tape of the present system of recording is high enough to effect a satisfactory sound recording by linear recording of conventional type, such a linear recording has been shown in various of the drawings to be hereinafter described in detail. Thus, for example, when using a tape travel of the rate of, say, 31.50 inches per second, and on the assumption that satisfactory sound records may be made at linear spacings of $\frac{1}{1000}$ inch, it is possible to effect recordings of sound of the frequency of 31,500 waves per second, well above the usually accepted requirements for such recordings. However, we now call attention to a further scheme of sound or like recording which is provided for in the present disclosures, as follows:

If desired the sound recordings, either as a simple sound recording, or in connection with high frequency variations, such as in television, may be effected by cross scans, making use of suitable scanning equipment, presently to be described. In such case extremely fine and faithful recordings may be produced since the total length of line scanned during each second is very large. For example, when scanning 15,750 lines or scans per second, according to requirements of presently in force rules of the F.C.C., and with a scanned tape width of 1½ inches, it is evident that the total length of scanned line per second will be 23,625 inches per second (being 15,750 times 1½ inches). If the recorded sound waves are of the frequency of 15,000 per second (very high), still each such wave will extend over more than a full scan length, extending from one scan into another. For lower frequencies and pitches of sound, the successive waves will extend, in some cases over many successive scans. Thus, due to the length of record possible for each such wave it is possible to secure a recording thereof which will include substantially all of the minute variations of sound intensity contained in such wave; and also it is possible to secure faithful recordings of frequencies and variations beyond any possible means of recording now conventionally known or used. Thus, we include within the purview of our present invention also the recording and interpretation and sensing of sound and other signals, as well as those included within the usual terminology of television.

The foregoing comments concerning the recording and sensing and interpretation of sound signals have had reference to the audio frequency signals after usual detection and rectification—in other words, the customary audio signals. Now it is noted, as already shown, that variations of frequency of the order of three to five megacycles or even higher, may be recorded by use of our presently disclosed equipment, and may be sensed and interpreted from such a recording. Since the radio frequency signals used within the so-called "broadcast band," extend only between substantially 560 and 1560 kc. it is evident that, by use of our principle of cross scanning, and by use of equipment hereinafter to be disclosed in full detail, we can produce a tape recording of the radio signals received on the antenna, including in such recording all the radio frequency signals within the range of receptions which may be interpreted by the equipment, for example, up to, say, four or five megacycles. That is, such a recording would include all radio frequency signals within such high stated frequency. These would all be imposed on the tape recording as variations of intensity of the recordings, and they would be sufficiently spaced along the successive scans so that improper overlaps would not occur. We have already mentioned the possibility of effecting recordings of variations of the order of three to four megacycles frequencies. Having made such a recording, by playing that recording back to the receiving antenna of a conventional radio receiver provided with the usual frequency tuning equipment, it would be possible to then select from the radio frequency recording on the tape any program or series of signals placed on the tape and having a specified radio frequency carrier wave.

Study of the foregoing will reveal that such a recording comprises a recording of all of the radio carrier wave frequencies on the ether during the interval of recording, so that, by tuning the receiver connected to such a tape recorded series of records, any one of the programs or series of signals contained on such tape recording may be tuned and brought in by the customary receiver. Upon re-tuning such receiver any other program which was on the ether during the interval of such recording may then be brought on and used by the user. Thus, it is possible to effect not only audio frequency recordings of audio programs, as audio recordings, but also to effect recordings of the radio frequency carrier waves from which such audio interpretations are derived. Various novel and unusual uses of such recording systems will suggest themselves to those who are familiar with various uses of radio frequency signalling equipment.

Since, as above shown, the audio frequency signals of a sound track produced by use of the cross scans would include, generally not more than one wave of sound per cross scan, and would usually extend over several or many scans, it is seen that if desired, such audio frequency sound recordings may be effected by cross scans superimposed on the cross scans produced for the television or other high frequency signal variations, and with proper tuning equipment, including, for example, proper sound trap arrangements, for dividing the signals during subsequent sensing and interpreting operations. By thus superimposing the sound track cross scans on the high frequency signals it would not only be possible to make use of the very great accuracy of the sound recordings, but would also be possible to reduce the overall width of the tape by that amount otherwise assigned to the sound track. We have hereinafter shown and will describe such arrangements.

Since, as will now be apparent, the intensities of the signals recorded along the successive scans of the tape are in direct proportion to the intensities of the corresponding received signals, and since said scans are spaced along the tape at uniform time spacings and thus also at uniform spatial spacings (in the case of recorded signals corresponding to the television program which has been recorded), and since the scans of the tape record correspond exactly to the scans of the electron beam of the television receiver, when recording television signals, it follows that the intensities of the recorded signals, if made or caused to become viewable, will produce a visible recording of picture or series of pictures corresponding exactly to the successive "frames" of the received television program. In fact, there will be produced on the tape recording a "frame" corresponding to each frame of the signals interpreted on the television viewing screen. We have provided means and shall fully disclose the same herein, for effecting the desired visibility of these frames on the tape recording.

In connection with the foregoing, it is now noted that by producing the tape recording on a transparent tape, and rendering the intensities of the signal variations visible, it is possible to produce a "moving picture" film as a replica of the so-received signals. Such replica can then be used in a familiar form and type of moving picture projector for projecting the picture as a moving picture on a suitable screen. We shall refer to this feature of the invention hereinafter.

At this point we mention that we have herein disclosed two forms of recording, each of which embodies the features already referred to. In the one form the recordings are made by magnetic means in the form of magnetic modulations of magnetizable material either carried by or comprising the tape itself; in the other form the recordings are made as modulations of electrostatic charges carried by the tape, together with provision for sealing in the modulated electrostatic charges to effect a permanent recording in the form of electrets contained within the body of the tape recording. It is here noted that such electrostatic charges or electrets exert electrostatic effects on adjacent bodies which are capable of electrostatic responses, attracting such bodies to the tape and holding them against the tape by electrostatic force. Included in such electrostatically attractible bodies are minute particles of magnetizable dust or powder. Accordingly, by provision of means to "dust" or project such dust or powder onto the electrostatically modulated tape prior to sealing the electrets permanently in place within the tape, it is possible to cause the tape to take at each elemental area thereof a body of such fine dust or powder in amount proportional to the electrostatic charge of the previous modulation at such elemental area, thus providing the tape at each elemental area with magnetizable material in amount proportional to the modulated electrostatic charge, and thus proportional to the magnitude of the signal which affected such area during the recording thereon. Then, when the electrostatic charges are sealed such magnetizable material will also be sealed into the tape and permanently secured in place therein.

Now the permeance of the magnetizable material at each elemental area will be directly proportional to the amount of magnetizable material present at such area. Accordingly, it is possible to use such a produced and recorded tape for sensing and translation of its signals either by means of electrostatically responsive equipment, or by means of magnetically responsive equipment. We shall hereinafter disclose the equipment and form of such recordings in detail.

In connection with the foregoing, it is also apparent that when using tape formed of suitable dielectric material as the carrier of the electrostatic charges, and which tape is transparent, the magnetizable material dusted or applied to the modulated charge as already explained will produce at each elemental area of the tape a reduction of transparency proportional to the amount of such magnetizable material present at such elemental area. Thus there will be produced a transparent film composed of "frames" and showing by transmitted light the recorded picture of each frame. In other words, a moving picture sequence is thus produced and may be projected onto the screen.

Although we have in the foregoing statement made reference to one arrangement in which the tape may be provided with a magnetic recording, or a recording which is magnetically sensible—that is, which may be sensed by magnetic means to produce a translation—nevertheless we have also herein shown and shall presently describe other means to produce magnetic tape recordings, and to sense and translate such recordings. Such other means makes provision for direct production of the magnetically sensible recordings, and means to directly sense and translate the same in very simple manner. Furthermore, we shall disclose such magnetic recording and sensing by use of magnetically sensible tapes provided with either powdered or fine material surfacings, or with sheet surfacings which are of magnetic nature and capable of receiving and retaining the magnetic signals indefinitely if desired, or capable of having such signals "erased" by simple means preparatory to receiving and retaining other magnetic signals.

The use of cross scans of recordings requires the provision of means to place such scans on the tape surface with accurate variations or modulations of the records according to the received signal intensities; and the sensing of such scans requires that means be provided for sensing each scan crosswise of the tape during linear tape travel, with production of signals whose intensity shall vary according to and under control of the intensities of the recordings at all points along each scan—that is, across the tape. We have provided such means and shall hereinafter disclose the same in full detail. In this connection we have herein disclosed such means for producing the recordings either electrostatically or magnetically; and have also herein disclosed the means for sensing and translating the recorded signals for both the electrostatic and magnetic types of recordings. All such means we shall hereinafter disclose in full detail.

The production of the cross scan recordings requires the provision of means which shall cause the received and modulated signal to traverse the tape in regular fashion, from one edge of the signal receiving area to the other edge thereof, producing the desired recording along each scan according to the intensity of the signal at each point of record. During this operation the separation or spacing between successive cross scans will depend on the rate of tape travel (the tape travelling lengthwise at constant speed), compared to the number of scans executed per unit time. Comment has already been offered relating to this relationship. When the features of the present invention are incorporated into recording devices intended primarily for recording television signals and programs, we find it convenient to provide for one cross scan of the recorded signals for each cross or horizontal scan of the electron beam of the receiver kinescope. By providing this relationship we can effect control of the cross scans of the recorder unit in synchronism with the kinescope scans by provision of suitable connections between the horizontal deflector of the kinescope beam (usually a saw-tooth generator provided in the television receiver itself) and the scan producing means of the recorder. Thus the cross scan of the recorder and that of the kinescope beam will be maintained in exact synchronism during the signal recording operation.

Since the recording is generally to be effected on a clear tape—that is, one which has not had any recording produced thereon, or one from which a previous recording has been "erased" so that the tape is "clear"—the placing of the scans across such tape may be effected without special reference to the exact location at which each cross scan is located, provided, of course, that the successive cross scans are placed at regular and closely or accurately measured displacements from each other. This result may be readily secured by the arrangement already referred to wherein the saw-tooth generator of the television receiver is used to effect control of the cross scans of the recorder since such saw-tooth generator is extremely accurate in its regular scanning controls. The foregoing, taken in conjunction with the provision of means to drive the tape lengthwise by use of a toothed sprocket driven by a synchronous motor supplied with regulated frequency A.C. will thus ensure scans at extremely accurate displacement along the recorded length of the tape. Thus it is a comparatively simple matter to effect proper placement of the original recordings of cross scans on the tape.

The provision of suitable synchronizing means to ensure correct registry of the sensing unit (presently to be described) requires the provision of synchronizing signals records on the tape at the time of making the recordings of the cross scans, to thus locate each such synchronizing signal record at its correct location in comparison to the recorded cross scans. The conventional television receiver is provided with the vertical deflector means, usually in the form of another saw-tooth generator; and provision is conveniently included in such television receiver for returning the electron beam to one corner of the "frame" upon the incoming of each synchronizing signal from the ether, by way of the antenna. Such synchronizing received signal comes regularly at conclusion of each set of scanning signals sent out by the sending station. We provide means to place a synchronizing signal on the tape, preferably close to or even superposed upon the scan signals already referred to, such synchronizing signals being so placed under control of the received synchronizing signals coming from the sending station. Since the television receiver itself is also provided with means to ensure correction of the location of the kinescope electron beam upon receipt of each such synchronizing signal from the sending station it follows that our presently disclosed means ensures correct placement of the synchronizing signals on the tape to correspond in location to the operations of the receiver kinescope.

It is thus evident that when making a record of a program which is also being televised by a conventional television receiver use may be made of the synchronizing signal amplifying equipment of such receiver to provide the needed synchronizing signal records on the recorder tape. Therefore, when effecting such a recording as just described it is not necessary to provide special synchronizing signal amplifying units, except, in some cases, as supplemental to such units as are found in the television receiver itself.

When, however, the recorder is to be used for making a recording under conditions wherein no such conventional synchronizing equipment is already present and available for providing the synchronizing signals to the recorder, special provision must be made either in the recorder or supplemental thereto to effect provision of such recorder synchronizing signals of form which can be placed and recorded regularly on the tape. We have made such provision to meet various conditions of recording. Instances of such special recording conditions may be stated as follows:

In industrial operations it will frequently be desirable to make tape recordings of plant operations to permanently record such operations by tape recordings which may afterwards be translated and played-back on suitable kinescope equipment. Such recordings may be desirable in connection with analyses of plant operations from the standpoint of determination of efficiency of such operations, or for aid in settlement of disputes or for other purposes and reasons which will suggest themselves to the student of this application. The production of such recordings will entail provision of suitable camera equipment capable of producing the necessary scanning signals for transmission to the recorder (and/or to suitable kinescope equipment whereby the plant operations may be watched and followed at a convenient location). In such case the necessary synchronizing signal producing equipment may be provided in connection with such camera equipment, or elsewhere, as required to enable proper synchronizing signals to be sent to the recorder and elsewhere that they may be needed. We have herein disclosed such arrangements.

In the case of a desire to produce a recording of signals, such as audio signals by means of the cross scan arrangements herein disclosed, it will be necessary to make provision for sending such signals during the recording operation, such sending equipment being provided either as a part of the recorder itself, or specially, as desired. We have herein disclosed means to make recordings of audio signals of selected carrier wave frequency, such as that frequency to which a conventional radio receiver may be tuned, and for afterwards playing-back such recorded audio signals into and through the radio receiver, acting as an audio frequency amplifying and sound producing or speaker unit. It is to be here noted that under such conditions of operation it will usually not be necessary to make use of such synchronizing signals, but they may be desired for use in connections with other operations in which the recorded audio frequency record is to be used. Such synchronizing signals on the tape will, however, be available for use in connection with the playing-back of such audio recording, in case it should be found that there was a tendency for the sensing unit of the recorder to lag slightly behind, or to slightly lead, the locations of the cross scans as they arrived at the location of the sensing unit. For this and other reasons it is found desirable to make provision for production of synchronizing signals on the tape recording even in the case of recordings of audio frequency signals. We have herein disclosed means to produce such synchronizing signals under the conditions of making a recording of audio frequency signals; such synchronizing signal producing means preferably, but not necessarily, comprising a portion of the recorder itself.

In the case of making a recording of all of the radio frequency signals being received by the antenna, within a range of frequencies, such as a range up to three or four, or more megacycles, provision should also be made for producing the synchronizing signals on the tape, so that they will be available for use and for effecting controls, during playing-back a selected set of signals through a conventional radio receiver, or otherwise. We have provided means to effect such synchronizing signal recordings, preferably, but not necessarily, as a portion of the recorder itself.

We have referred to the recording of "signal variations" occurring during the scanning operations. Usually these are variations of intensity of the received signal during the scan, such variations of intensity being interpreted as variations of intensity of the electron beam produced in the kinescope of the television receiver. When the received signals are those of a conventional monochrome televised program, it is evident that simple recording operations will occur in the recorder, the cross scans produced on the recorder tape varying in intensity or strength from point to point across the scanned area of the tape in harmony with the strengths of the received signals.

When, however, the received signals comprise those of a color televised program special signalling arrangements are used. Under one system of such color programming the emitted signals comprise mixed "highs" of the signals produced corresponding to the three primary colors, such highs being the wave peaks of three sets of high frequency waves produced at time or phase spacings of one hundred twenty degrees from each other, such peaks being mixed in regular sequence at the sending station, and emitted as such a mixed set of signals. Each scan then includes highs emitted according to the three primary colors in regular progression. According to another system the signals are sent out from the sending station as complete lineal scans, each scan being effected under one color condition, and the successive scans being emitted under color conditions of the three primary colors in a selected order of progression. It is to be noted, however, that in each such case the signals are emitted on the basis of lineal progression across the picture or object being televised, although the significance of the signals at different portions of the scans in the two schemes are not the same as far as colors are concerned. Still either scheme of signals can be received and recorded on the basis of cross scans produced on the tape of a suitable recorder. We have made provision, and have disclosed the means to make recordings of the "color signals" under either or both schemes of signalling and reception, as will hereinafter appear in full detail.

In connection with the foregoing we also point out that when the color signals are emitted according to the mixed "highs" or "dot" principle, the received signals comprise short dots or pulses, coming at regular progression, and of intensity corresponding to the emitted signals. When such "dot" signals are recorded on the tape they comprise dots or like signal elements located in regular progression along each cross scan, each recorded dot being of intensity corresponding to the intensity of the received signal. Then, when such a recording is played-back into a suitable color television receiver these dots will appear as the pulse signals needed to effect reproduction of the replica of the original object in color as desired. Correspondingly, when the emitted signals are produced as complete linear scans of intensity varying during each scan, but each scan corresponding to the scanning of the picture or object under a given color condition, the recorded scans on the tape will likewise be of varying intensity corresponding to the varying intensity of the received signals for such scan, but each recorded scan will in such case correspond to one of the scans emitted under a specified color condition. In either case the receiver will afterwards receive from the tape recording signals coming according to the proper scheme, and will interpret such signals as a color replica the same as would have been produced had the signals to such receiver come directly from the ether instead of having been subjected to an intermediate recording process.

The cross scanning unit must execute its cross scans at extremely fast rate; for example, when recording the conventional scans in synchronism with the scan signals emitted by a conventional television system operating under present F.C.C. regulations, and received and interpreted in a conventional television receiver, these scans come at the rate of 15,750 per second. Furthermore, when the cross scans produced on the tape recording cover a tape width of 1½ inches or thereabouts, the actual distance scanned per second is 23,625 inches, or slightly more when the scans are curved as will presently appear in full detail. This is a scanning velocity of almost 2,000 feet/sec., a very high value. Accordingly, it is at once apparent that special means must be provided which is capable of executing the scans at such high rates, accompanied by provision for modulation of the scan intensities many times during each scan. We have provided such means herein.

Fundamentally we have provided a scanning unit which includes a controllable beam, such as an electron beam, projected towards a suitable excitable surface or other suitable receiving element. It is well understood that such a beam may be directed or "deflected" conveniently either magnetically or electrostatically, and according to the principles which are universally used in television kinescopes, and elsewhere. In other words, we provide a scanning tube element or unit, including the necessary electron gun, envelope, and deflecting control or controls. Usually only a single deflecting control is required, being one which will cause the beam to execute scans in a single plane; but provision is made for producing either a modulated strength beam or a beam of uniform strength, but controllable as need be by the user or as a factory adjustment in the original setting of the unit. The scanning tube is set in juxtaposition to the travelling tape, so that the scans are effected across the desired width of such tape. As will presently appear, the scanning tube may be supported either at right angles to the tape surface or parallel to the tape surface or at some intermediate angle; but for reasons which will be disclosed presently herein we prefer to support the scanning tube parallel to the tape surface, so that the swings of the beam are also parallel to the tape surface, that is, are executed within a plane parallel to the tape surface. This arrangement provides the advantage that the height of the equipment is materially reduced; but a further and far more important advantage, in many cases, lies in the fact that no special provision need be made, when the scanning tube is thus supported, for compensating for the radial swing of the beam scans inside of the tube. This will be discussed further hereinafter.

With the scanning tube thus supported adjacent to and parallel to the tape surface, and with the beam executing its scans according to the controls which are provided therefor, and with the tape travelling at uniform rate lengthwise, it remains to consider the provision of means to transfer the effects of the electron beam within the tube envelope, to the tape surface during making a recording; and afterwards, to cause sensing of the previously recorded signals, using the beam scans as a portion of the sensing and control equipment. We shall now discuss these matters briefly, showing how the necessary transfers of energy or effects are produced for both the recording operation, and afterwards for the sensing and translation operations. It is now remembered that during the recording operation the cross scans of recordings will be placed on the tape at such tape elemental areas as are present in harmony with the rapidly changing beam swing locations; but that during subsequent sensing and play-back operations, the scans of the beam are not the controlling element. On the contrary, during such playing-back each swing of the scanning beam must register with a previously recorded cross scan, even though the tape is travelling lengthwise at uniform speed.

Thus it is apparent that the scanning beam, generally an electron beam, is called upon to perform two distinct types of operations during the two operations of making a recording and afterwards sensing and translating that recording. But in both of these operations provision must be made for transferring the effects of the electron beam within its envelope to the outside of such envelope at the proper position adjacent to the tape surface, and also to cause such effects thus transferred to the tape surface location to be of a kind which can produce the desired recording or sense and translate the previously made recording.

Generally speaking the envelope is highly vacuumized, that is, provided with a hard vacuum. Generally, too the envelope is of material such as will not transmit the electron beam through its mass, so that under such conditions the electron beam's direct operations are contained within the envelope. There are, however, envelope materials which are transparent to electron and similar beams, and when the envelope is made of such a material the electron beam effects may be transferred directly through the envelope material to the necessary location close to the tape surface for further functioning at such location. We shall now discuss means to transfer the electron beam's effects to the outside of the envelope close to the tape surface. In this discussion we shall disclose the means to secure these desired effects for either a magnetic recording on the tape surface, or for an electrostatic recording thereon, and for sensing and playing-back the recordings in both such instances.

One means to effect transfer of the electron beam's effects to the outside of the tube or envelope may be termed a "conduction effect." It is well known that the electron beam possesses the ability to discharge electrons from a charged element against which such beam impinges, and that the rate of such discharge is proportional to the strength of the electron beam. Accordingly, by providing along the end of the envelope of the electron beam scanning unit a series, generally a large number, of small conductors, such as very small gage wires, extending through the envelope, and spaced apart very small distances in the form of a row extending along the path of scan of the electron beam, these wires will be successively contacted by the electron beam during its scanning movement, and discharges will occur through the wires in succession, each discharge being dependent on the strength of the electron beam when in impingement with such wire. Since these wires extend to the outside of the envelope they may be used in various ways to effect operations, either of recording or of sensing, as the case may be, under proper controls hereinafter disclosed.

By the use of such means as just described the effects of the discharges occurring through these wires in succession may be converted into electrical and magnetic effects to produce magnetic recordings on the magnetizable surface of the tape, or to sense the strength of the magnetic effect previously placed on the tape; or the discharges occurring through these wires may be used for producing electrostatic discharges from a previously electrified surface of a tape of dielectric material, which discharges will be of amount proportional to the strength of the electron beam as it strikes each wire, thus producing a modulated remainder of electrostatic charge on the dielectric surface, corresponding to the strengths of the signals, and a subsequent sensing operation may be produced as will hereinafter appear when the recorded signals are to be sensed and translated. Here we may mention that such sensing operation may be readily produced by use of an electron beam of steady value acting on the wires during the scanning operation, together with a "detector plate" located in close proximity to the surface of the tape opposite to that surface which is proximate to the said wires. Such detector plate will then have induced on it a charge whose value will fluctuate exactly corresponding to the remainder charge carried by the electrostatically recorded tape at the location of that wire which is momentarily being acted on by the electron beam. These operations will be fully explained hereinafter. When this "conductor" arrangement is to be used for production and subsequent sensing of the recordings, various means may be used to effect such results. Since the discharges produced through the wires are of themselves small currents of magnitudes proportional to the strengths of the electron beam as it strikes each wire within the envelope, it follows that these small currents may be amplified and used for generation of magnetic effects at locations on the tape corresponding to the locations of the wires as they are contacted by the electron beam, to thus produce the desired magnetic recording on the magnetizable surface of the tape. Conversely, when it is desired to sense and play-back such a recorded magnetic recording, by use of such "conductor" arrangement, the sensing equipment may include small conductors in position to be acted on by the magnetic charge carried by the tape at the lineal tape locations of such small conductors, together with arrangements whereby only each such conductor will be made effective for sensing operations which is the one momentarily controlled by impingement of the electron beam with the corresponding wire extending through the envelope. All such arrangements will be disclosed in full detail hereinafter.

Another means to effect transfer of the electron beam's effects to the outside of the tube or envelope may be termed an "ionizing beam" effect. It is well known that waves of lengths generally within the "ultra-violet" range possess the ability to ionize or render conducting gases, especially air, through which such beams flow; or that such ionizing beams produce enormously increased rates of discharge of electrons from surfaces against which they impinge. It is also well known that when the electron beam excites phosphors of various known compositions there are produced or emitted wave lengths within the ultra-violet range, that is, ultraviolet beam wave lengths. It is also well known that various materials used for production of envelopes or portions thereof are of highly transparent characteristic for wave-lengths of the ultra-violet or ionizing series, so that such wave-lengths may be transmitted through such an envelope to the outside thereof. All of these facts are well known, and we shall hereinafter mention examples of some of the materials which may be used for practice of this invention, but by way of illustration only.

Accordingly, in producing the "ionizing beam" effect now under discussion we may coat the surface of the tube or envelope with such a phosphor as will emit ultra-violet when excited by impingement of the electron beam, thus converting the electron beam into an ultra-violet beam at the point of such impingement. Since such point of impingement travels along the phosphor surface as the scan proceeds, it follows that such so-produced ultra-violet beam will also travel along the scanned path in exact harmony and synchronism with the scanning movement of the electron beam. Thus such ultra-violet beam may be caused to follow a path extending through the material of the envelope to the outside of such envelope, where the desired uses may be made of such ultra-violet beam either during a recording operation, or during a sensing and translating operation. It is noted that the strength of the so-produced ultra-violet beam will also be exactly proportional to the strength of the exciting electron beam, so that properly modulated effects will be available outside of the envelope, or so that an ultra-violet beam of constant intensity may be produced outside of the envelope when the electron beam is of constant intensity. If desired the envelope window through which the ultra-violet beam is transmitted to the outside of the envelope may be made of a lens form so that the ultra-violet beam delivered to the sensing or other element outside of the envelope will produce a sharply defined effect at a small area. We have herein disclosed means to produce the foregoing effects and functions, as will hereinafter appear in full detail.

When such an "ionizing beam" arrangement is used to produce a record according to the electrostatic method disclosed herein the surface of the tape may first be subjected to the effects of a pre-charging unit, so that such surface is provided with a uniform and rather high electrostatic charge. Then, by directing the ultra-violet beam against such charged surface some of such pre-charge will be discharged, leaving the charge on the tape surface of an amount reduced according to such discharging effect. When the ultra-violet beam is modulated according to the intensities of the signals to be recorded it is evident that the remainder charge so left on the tape surface will be modulated in amount at each elemental area corresponding to the intensity of the signal so recorded. Thus a modulated charge is produced on the tape surface.

Directly after producing such a modulated amount charge on the tape surface a sealing sheet of thin dielectric material may be sealed to the charge modulated surface of the so treated sheet, thus sealing in the electrets of the remainder charge, and producing a permanent electrostatic tape recording usable for playing-back an indefinite number of times. Various means may be provided and used, other than such a sealing sheet, to seal in the modulated charge, and we have herein disclosed some such other or alternate sealing means hereinafter.

We have also provided simple means to afterwards sense the electrostatic remainder charge produced and sealed as above. One such sensing means comprises a detector plate located close to one surface of the travelling electrostatically recorded tape so as to be subject to the electrostatic induction produced by the charge carried by such tape. Such detector plate extends across the width of the travelling tape record and is thus subject to the inductive influence of all charges lying across the tape at the location of such detector plate; but we have also provided means to subject the tape surface to the effects of a scanned ultra-violet or other ionizing beam (such as previously disclosed and discussed herein) so that the effects produced at the point of impingement of such ultra-violet beam against the tape surface are the combined effects of such ultra-violet beam and the previously modulated charge carried by the tape. By causing such ultra-violet scanning and sensing beam to be of uniform intensity it is evident that the net effect produced on the detector plate is of intensity or amount proportional to the electrostatic charge carried by the tape at the point of ultra-violet beam impingement, and is thus usable for amplification for play-back and other desired uses. We have disclosed means to produce all such functions and effects, and shall disclose them fully hereinafter.

When such an "ionizing beam" arrangement is used to produce a record according to the magnetic recording principle disclosed herein it is evident that means must be provided for converting the effects of the ultra-violet beam outside of the envelope (when such ultra-violet beam is generated and used at such outside location) into means to produce on the tape surface a magnetic recording at each elemental area which recording is of strength proportional to the strength of the ultra-violet beam then flowing, and at location corresponding to the momentary position of the electron beam in its swing. It is here noted that during this operation the lateral swing of the electron beam and of the ultra-violet beam, at the recording position on the tape is of a high rate, being of the order of 2,000 ft./sec., or 24,000 inches/sec., as already mentioned; whereas the rate of tape travel lengthwise of the tape is of the order of, say, not over 150 inches/sec., when the cross scans are spaced $\frac{1}{100}$ inch apart (one one-hundredth of an inch). It is thus evident that the lengthwise movement of the tape is of substantially no practical effect in producing (or afterwards sensing and playing-back) the records, since such lengthwise movement is probably not greater than $\frac{1}{160}$ of the lateral or cross scanning movement executed by the ultra-violet beam. It will probably be much less than the ratio just indicated in most cases, that is, the ratio will, in most cases be much greater than that indicated above.

Now the ultra-violet beam outside of the envelop may, if desired be used in conjunction with suitable translating devices to produce magnetic effects by use of minute coils located in a row across the tape location and close to the tape surface, such coils being sequentially energized by currents produced or controlled by the strength of the ultra-violet beam at each location during its scan. Such an arrangement would be similar, in some respects to that which was previously referred to under the discussion of operations according to the "conduction effect." Thus a magnetic recording would be produced by use of the ultra-violet beam arrangement. Likewise, such a recording could be sensed and translated under control of the ultra-violet beam arrangement, being a sensing of the magnetic recording by such means. It is to be noted, however, that such "conduction effect" means is discontinuous in its functioning, and a recording made thereby will comprise a large number of small dots or distinct elemental area records, close together and in effect merging together, depending on their size and on the closeness with which they may be practically produced on the tape, and afterwards sensed and translated.

One important feature and function which we are able to perform by use of the "ionizing beam" (ultra-violet beam) arrangements presently to be disclosed in full detail, is the production of a continuous scanned record across the recorded width of the tape, such continuous record being completely continuous across the full scanned width, and modulated strictly according to the instantaneous variations of beam strength or intensity; and the ability to afterwards scan and sense and interpret such continuous cross scanned recording, to thus produce a very faithful playing-back of such recording. We are able to effect these results by use of the "ionizing beam" effect since the ionizing beam flows continuously through the transparent window of the tube envelope at all locations along the scan, and since provision may be made for continuous use of the transmitted beam at the outside of the envelope, and for such operations as are needed. During the recording operation the ultra-violet (ionizing) beam travels across the scanned width of the tape in strict harmony with the cross scan being executed by the electron beam of the tube, as a continuous travel and without interruptions except such as may be due to reduction of the beam's strength to zero when the electron beam may have been also reduced to zero value. Furthermore, the strength of the ultra-violet beam will vary strictly according to the modulated strength of the electron beam during each scanning operation, when the operation is a recording operation. When the operation is a sensing and translating operation the strength of the ultra-violet beam will be constant at such value as shall have been pre-set either by the user of the unit, or as a factory adjustment.

Now the production of a magnetizing effect on the tape by use of such ultra-violet beam requires the provision of intermediate means to convert the ultra-violet beam outside of the envelope into a current whose strength shall be proportional to the strength of the ultra-violet beam at each instant and at each instantaneous location of such ultra-violet beam during its scan, and which current shall be available to produce at each instant a magnetizing effect close to the surface of the travelling tape, and at location crosswise of the tape exactly corresponding at all times to the location of the ultra-violet beam (and the electron beam). The foregoing requirements must be met in order to produce the desired continuous magnetic recording during the recording operation. Conversely, when such magnetic continuous modulated scan recording is afterwards to be sensed and translated, provision must be made for producing a detection current or potential effect which can be amplified for use in the desired manner, and for controlling such current or potential to produce values thereof strictly corresponding to the strength of the magnetic record at the point of scan momentarily to be sensed, and means, under control of the ultra-violet beam during its scross scans for determining the elemental area, laterally, of the tape, at which such operations shall occur. Actually, in one means to be hereinafter disclosed in full detail, we have provided means to thus determine both the location, laterally of the tape, at which the sensing is occurring, and for determining the momentary strength of such sensed recording, at such location, both as a function of the location of the ultra-violet beam laterally of the tape width, that is, the position of the ultra-violet beam during its cross scan. All such means we shall disclose fully hereinafter.

At this point we may mention that both the ultra-violet beam controlled recording operation, and the ultra-violet beam controlled sensing and translating operation, just above referred to, may be produced by one and the same element of structure or means, with provision for simply and conveniently changing from the one operation to another by a simple switching operation. In the recording process then produced the ultra-violet beam is of modulated strength, corresponding exactly at all times in strength to the strength of the electron beam; in the sensing and translating process then produced the ultra-violet beam is of an adjusted constant strength, the variations in magnetization on the elemental areas of the tape producing the desired sensing effects at continuously changing locations across the scanned area of the tape as determined by the momentary locations of the ultra-violet beam during its scans, being the same locations momentarily as are found for the electron beam. All of these operations will be fully disclosed hereinafter.

The strengths of the electron beam as it is modulated, or when it is used as a beam of constant strength, as during sensing and translating operations, and correspondingly, the strengths of the ultra-violet beam, are comparatively small, but of accurately controlled and modulated amount. It is therefore desirable, in some cases, to provide means to amplify the strengths of the electron beam (and sometimes, also, of the ultra-violet beam derived therefrom), prior to transmitting their effects to the tape recording, or prior to the acting of the tape recording on the ultra-violet beam. We have provided simple means to secure such amplifications, as will hereinafter appear in full detail.

Reference has been made to the avoidance of need of special provision for compensating for the radial swing of the beam scans by placing the scanning tube parallel to the tape surface, so that the beam scans are executed in a plane or planes substantially parallel to such tape surface. The following further explanation of this relationship is now in order:

The electron beam, when deflected during its scans, swings about a pivotal point, the deflections occuring under a suitable deflection control or controls, and according to well understood and widely used principles. Such beam is readily brought to focus, corresponding to a determined beam length, and such focusing may be either fixed or variable. It is desirable, when possible, to use a fixed focus arrangement, as avoiding complexities of circuitry and for other reasons well understood in the electric arts. When a beam of fixed focal length is used in the scanning tube it is evident that perfect focus can be obtained for all points along the scan only by using a phosphor surface of arcuate form and formed as a segment of a circle drawn about the pivotal point. Accordingly, it is desirable to form the end surface of the envelope tube, on which the phosphor is deposited, as a circular arc drawn about the pivotal point as a center; but when such a curved surface arrangement is incorporated within a tube standing at right angles to the tape surface it is evident that the distance from such tube end to the tape surface varies from a minimum at the center of the scan swing to a maximum at each end of such swing. Accordingly, when using the electron beam excited ultra-violet beam delivering phosphor arrangement it is desirable to locate the tube parallel to the tape surface so that the beam swings can be executed within a plane (or planes) substantially parallel to the tape surface, under which conditions all portions of the path of the focused end of the electron beam during its complete swing will lie within a plane parallel to the tape surface, and thus all portions of such path will be equidistant from the tape surface. But it is evident that, when the ultra-violet beam produced by such arrangement is transmitted through the end of the tube or envelope, acting as a window, such ultra-volet beam will be parallel to the tape surface, also, instead of normal thereto, as would generally be desired. We have made provision for bringing the ultra-violet beam into normalcy with the tape surface in various manners, some of which we will now refer to briefly, and will disclose in full detail hereinafter.

One means to effect change of direction of the beam comprises the provision of a curved reflector outside of the tube window, and in position to reflect the ultra-violet beam delivered through the window down directly towards the tape surface. Such reflector may be formed of any one of a number of materials which are excellent reflectors of ultra-violet rays, and which are highly efficient reflectors thereof. We shall disclose this solution of the problem more fully hereinafter. According to another solution of this problem we provide a curved window in the lower flat surface of the tube, being that surface which lies parallel and close to the tape surface. In such arrangement this curved window is formed of material transparent to ultra-violet rays, and the inner surface of such window is provided with a deposit of the phosphor which will emit ultra-violet under electron beam excitation, so that the ultra-violet beam is produced directly against such window. We then also provide means within the tube to reflect the electron beam at right-angles onto such phosphor surface. Such reflecting or deflecting means conveniently takes the form of a curved dynode of potential such as to cause magnification of the strength of the electron beam, such dynode delivering a secondary radiation beam towards the phosphor surface, and of greatly magnified strength or power as compared to the original electron beam. Thus a two-fold purpose and object is attained, in the sense that an outside reflector for the ultra-violet beam is not needed, and in the further sense of a great magnification of the effects produced.

Although the aforementioned arrangements which incorporate the provision and use of a tube and electron beam swing arrangement in which the swing is within a plane parallel to the tape surface, result in production of curved cross scans examination of various forms of recording produced by such arrangements will reveal that no serious objection may be lodged against such arrangements. With such arrangements the successive scans can be placed on the tape fully as close together as is possible when using straight cross scans, so that as much recording can be placed on a given length of tape in the one case as in the other; or, conversely, no more tape length is needed to carry a recording in the one case than in the other.

When the scanning tube arrangement incorporating the "conduction effect" is used, with conductor wires extending through the envelope from points of electron beam impingement within the envelope, to points of useful application of the effects transmitted by such wires to the outside of the envelope, it is evident that the inner electron beam impingement receiving ends of such wires may be brought into a circular arc drawn about the pivotal point of electron beam swing, thus enabling use of an electron beam arrangement with beam of fixed focal length. Thus it is possible to use a tube arrangement in which the tube is vertical instead of horizontal or parallel to the tape surface, and still bring the effects of the electron beam to the surface of the tape at all points along each full scan. It is also to be noted that such wire arrangements, or "conductor effect" arrangements may be used in connection with tube arrangements in which the tubes are parallel to the tape surface, and in which the electron beam swings are within a plane or planes parallel to the tape surface. We shall disclose such arrangements fully hereinafter.

When magnetic recordings are to be effected by use of the "ionizing effect," and when magnetic recordings are to be sensed and translated by said effect, provision must be made for converting the ultra-violet or other ionizing beam, outside of the envelope, to electrical effects, as already mentioned. We shall here disclose briefly how these results may be readily attained in order that the functions of the equipment may be better understood at this point.

According to one simple arrangement we provide two co-operating but slightly separated conductors lying within a plane close to the tape surface. These conductors are of curved form, and are electrically insulated from each other, and are separated from each other a distance to provide a narrow, curved slot opening or gap between them. This gap is of curvature to register with the curved path of scan of the ultra-violet beam which is delivered downwardly towards the tape surface, and is so located that the ultra-violet beam will strike the narrow line of air contained within the gap, and the gap is of the full width, across the tape, over which recording is effected and sensed. These two conductors conveniently take the form of narrow plates and said plates comprise portions of the recording or sensing circuit, depending on which operation is being carried on. As the ultra-violet beam strikes the air of such gap it renders said air conducting at the location of such striking, that is, the location of the beam. As the beam travels across the scan width it follows the path of this gap, and thus also produces its ionizing effect as a travelling conductor of conducting air. Such travelling conductor of air is very narrow (along the length of the gap), but by use of a beam of sufficient concentration a sufficient ionizing effect is produced to affect the conductivity at the location of the beam, so that various current and potential effects may be readily produced as needed. Thus, by subjecting the two conductors to a proper but fixed difference of potential from a suitable supply of current, the two conductors will be maintained at a constant difference of potential during recording operations. Now the conductivity, being the inverse of resistance of the gap at the point of impingement of the ultra-violet beam is greatly increased by such beam's ionizing effect; but that increase is directly proportional to the strength of the beam (within sufficient limits to meet the needs of the present problem). Thus, upon ionizing the gap at the location of the beam a current will flow between the two conductors, and the magntiude of such current will be substantially proportional to the strength of the beam, and thus also substantially proportional to the strength of the electron beam upon which the ultra-violet beam is based. This current will flow close to the surface of the tape, and in a direction which will produce a magnetizing effect on the magnetizable material of that tape; and since the strength of the current will be proportional, at all points of the scan, to the strength of the electron beam it follows that the magnetizing effect deposited on the tape surface will, at each elemental area of the path across the tape, be proportional to the strength of the electron beam. Thus there will be produced on the tape, for such scan, a magnetized line whereon the magnetic strength is at all points proportional to the strength of the electron beam. That beam was modulated according to the strength of the received signal, so a like modulation of the strength of the magnetic effect will be produced on the tape surface.

When such a magnetic recording is to be sensed and translated the same two conductors, with their air gap, and by use of the same tube and scanning electron beam and scanning ultra-violet beam, may be used. For this purpose various arrangements may be used. One such use is as follows:

If said conductors are connected, one to a point of fixed potential, such as a battery terminal, and the other to the grid of an electrode tube, the heating element of such tube being eventually connected to the other terminal of the circuit, then, if the electron beam be produced as a fixed strength beam (instead of being modulated as before), there will be produced a conductor across the gap due to the impingement of the ultra-violet beam at the gap, and such conductor will be of fixed and unvarying conductivity. Then as the beam travels along the gap during the scanning operation, such conductor will traverse the magnetic field produced by the previously laid down magnetization, and there will be developed in the conductor thus travelling an E.M.F. which will be proportional in amount to the strength of the magnetic field being traversed at each point of that scan. This will be true since the rate of scan (the rate of travel of the beam along the gap), will be constant, so that such E.M.F. will be a direct measure of the strength of that magnetic field at each point. This varying E.M.F. will be algebraically added to the potential of the connection to the grid, thus causing said grid potential to be modulated directly according and proportional to the strength of the field carried by the tape at each point of the scan. Suitable amplifying and translating devices can then be operated by the grid condition thus produced. This arrangement may be called a "potential" sensing arrangement since it does not require the flow of any current across the gap between the two conductors which establish that gap.

According to another arrangement the magnetic field carried by the tape surface may be sensed as follows: The electron beam will be produced as a fixed strength beam, so the strength of the ultra-violet beam will also be constant at the location of the gap. Thus the conductivity of the gap at the location of the impingement of the beam will also be constant, but that location will travel along the gap with the travel of the beam during scan. A closed circuit may be established including a source of fixed potential, such as a battery, and the two conductors which establish the gap, and preferably a fixed resistance will be included in such circuit. Under these conditions there will be a flow of current through such circuit, which flow will be inversely proportional to the resistance of the circuit, and directly proportional to the total E.M.F. acting in the circuit. Since the conductivity of the air gap is constant (the ultra-violet beam being of constant value according to our premise), it follows that any change in the potential acting in the circuit will be reflected as a change of current through the circuit; and by tapping the circuit at a convenient point, as by tapping it at one of the conductors establishing the gap, a variable potential will be made available, which will vary according to the change of potential acting in the circuit. That potential will include the battery potential, and also any potential induced in the portion of the circuit which comprises the air gap, since the circuit includes that air gap. As the scanning operation occurs the ionized air effect travels along the gap during such scan, thus producing a travelling conductor extending between the two gap conductors, and travelling very fast across the tape surface. There will be induced in such travelling conductor an E.M.F. whose value will be directly proportional to the strength of the magnetic field traversed at every point during scan, since the rate of travel is constant along the entire scan. This E.M.F. will be algebraically added to the battery potential to thus affect the total potential acting through the circuit, and thus the potential of the tapped conductor previously referred to will vary directly according to the strength of the field carried by the tape along the line of scan. Such varying potential may then be used in convenient manner to actuate the necessary translating devices, including proper amplification. This may be called the "closed circuit" sensing arrangement.

We have disclosed means to effect all of the foregoing operations and functions, as we shall herein disclose in full detail at a later point.

As a detail of construction of the devices for carrying forward certain of the operations and functions above described, we prefer to form the air gap from the two curved lengths of conductor already referred to, with the bottom faces thereof very smooth, and preferably surfaced with insulating material, such as a layer of hard plastic, very thin, deposited on the surfaces. These elements may then rest lightly on the surface of the travelling tape, which is travelling at a relatively slow rate so that little if any heating effect will be developed due to frictional contact. The conductors themselves may be provided with tapered proximate edges between which the current will flow, such edges being brought close to the tape surface. By this means the current effects, and the magnetic effects already referred to will be brought close to the magnetizable material on the tape surface.

The magnetizable surface of the tape may comprise either a coating of fine granulated magnetizable material, such as $Fe_3O_4$, or $Fe_2O_3$, or $Fe_3C$, or any of the various materials conventionally used for production of magnetic tapes for such recordings, but preferably such material, when used, should be very finely granulated. Or the magnetizable surface of the tape may comprise a thin sheet of highly magnetic material such as what is known as 4–79 Ni, being an alloy of iron and nickel and molybdenum, with substantially 4 percent molybdenum and 79 percent nickel. This alloy can be rolled into very thin sheets, such as a thin foil of much less than one one-thousandth inch in thickness. We propose to mount such a sheet of this magnetizable material onto a thin tape of carrier such as a thin tape of nylon or the like, cementing the sheet of alloy to such carrier in convenient manner. We may also provide such sheet of magnetizable material with cross ribs conforming to the curvature and spacing of the cross scans, such ribs being of very slight upward projection above the plane surface of the alloy sheet. Then, during the scanning operations the magnetic scans will be deposited principally on such ribs, and during sensing operations the ribs will provide nice surfaces, magnetized, which can be readily sensed by the means hereinelsewhere provided.

In order to reduce the depletion or exhaustion of the phosphor deposit due to repeated scannings thereof, we may modify the scanning arrangements by provision of means to cause scanning over a relatively small vertical dimension of phospher surface (vertical scanning) as well as producing the required lateral or horizontal scanning operations. It will presently appear that we have illustrated provisions for both horizontal and vertical deflections of the electron beam in various of the figures. When it is desired to produce such slight amount of vertical deflection for the purposes indicated provision therefor may be made by use of a second saw-tooth generator for the vertical scans, such second saw-tooth generator operating in harmony with the vertical scanning controls of the tubes; or, if desired, use may be made of the vertical deflecting arrangements found in the television receiver with which the present recorder is operated. In such case, however, the amount of vertical deflection to be made in the control of the recorder scans would be very small as compared to the total vertical deflection found in the television receiver kinescope—probably it would be of the order of ¼ to ½ inch, instead of many inches as provided in the television receiver. But nevertheless, provision can be made to effect a regular increase of the vertical deflection in the recorder beam's operations, through a cycle of 262.5 lines, thus corresponding in function to the operation of the television receiver, as far as the provision for vertical deflection is concerned, but not as far as the purpose of such deflection is concerned.

When such vertical deflection is used in the operation of the recorder tube, provision should also be made for ensuring that the ultra-violet beam (or other means of converting the electron beam's effects) shall effect its scans always along the same line of the tape (or along the line of the gap between the two conductors, already discussed), so that proper functioning of the translation effects shall always occur at the proper line position. This result can be readily secured by forming the mirror which reflects the ultra-violet beam with a slight and special curvature so that the reflected beam will always come to the same point of focus (being the gap between the conductors, or the like of scan on the tape, in the case of the electrostatic arrangements), regardless of the deflected position (vertically) of the electron beam within the tube as determined by such vertical deflecting means. We have made provision for all of the foregoing arrangements, and have disclosed the means to accomplish them, as will hereinafter appear in full detail.

It is noted that the path of scan on the tape will have a discreet dimension of width, being in direction along the tape. This dimension may be of amount dependent on the distance between center lines of successive scans, being the amount of tape advance per scan. Accordingly, the tape driving means may be designed to give that amount of advance which will conform to the needed scan dimension lengthwise of the tape, generally of the order of two or three thousandths of an inch, more or less.

Provision may be made for permitting slight rock of the scanning tube about a vertical axis (that is, an axis normal to the tape surface) so as to bring the lines of scan to correct or desired direction across the tape width. It is here noted that when the recording is made the scans will extend across the recording area, and the directions of such scans will depend on the exact relationship of the axis of the tube as compared to the center line or line of travel of the tape during the scanning operation in recording. When, however, the scanned and recorded record is to be sensed and played-back it is necessary that good registry of the sensing scan lines be secured with the previously recorded scan lines. By provision of such provision for rock this result can be readily secured. We have made such provision.

Provision may also be made for slight back and forth adjustments of the tube lengthwise of the tape travel. By this means registry of the sensed scans will be further provided for; and this adjustment, in conjunction with that previously stated, namely, slight rock of the tube, will enable extremely accurate performance to be secured in sensing and playing-back.

There is a slight loss of time between the completion of each scan and commencement of the next scan. This fact is well understood in this and related arts. Such loss of time is of the order of seven to eight percent. However, such time loss is also present in the operation of conventional television receivers, without noticeable depreciation of the faithfulness of receiving the televised pictures, and such loss of time will not more affect the recording operations than the affecting of the conventional receiver operations. It may be disregarded for practical purposes.

It is noted that when the recorder principles herein disclosed are applied to the recording of audio records, as distinguished from radio frequency signals (of the order of one or more megacycles), the scan rates may be materially reduced without loss of detail and without reduction of faithfulness of the recording. Thus the rate of tape travel may be correspondingly reduced, if desired, since the total number of scans to be recorded within a stated time interval will be proportionately reduced. However, when such high rates of scanning as 15,750/sec. are used for recording audio signals, extremely accurate recordings may be produced, with accuracy of detail recording not even approachable by conventional recording operations, such as linear recordings along the tape length. This will enable production of audio records in which all realizeable harmonics and other wave forms will be truly recorded, and may be played-back with equal accuracy.

Attention is called to the fact that by special provisions in the delivery of the signals to the scanning tube, and otherwise, it is possible to place several recordings on one and the same tape area, and afterwards sense any one or more of such recordings and play-back the same in correct form, all of which is fully disclosed hereinafter, and will be fully described.

In connection with the magnetizing effects and sensing of magnetization carried by the scans on the tape, it is noted that when there are provided only two conductors extending across the scanned width of the tape, there will be unidirectional current flow between such conductors at the point of ionization produced by the ionizing (ultra-violet) beam focus. Consequently, under this arrangement there will be only a single magnetic polar effect produced at the surface of the tape and effective to produce the modulated magnetization. As a modification of the air gap arrangement we also disclose means to divide such air gap into two parallel gap sections, with a third conductor extending along the dividing line, so that the ionizing beam acts simultaneously on both such parallel gap sections; and we accordingly connect the outside conductors together so they are of equal potential at all times, and we then connect the third conductor (central one) to the other pole of the circuit. By so doing, when the ionizing beam acts at any point along the scan both of the gap sections are simultaneously ionized, thus allowing current flow between the middle or third conductor and the two outside conductors, being current flows in opposite directions with respect to the tape length. Thus there will be produced magnetizing effects of both polarities, one effect at one side of the central conductor, and the other effect at the other side of the central conductor; and these two effects will result in a flow of magnetic lines of force downwardly to the tape surface at one side, and upwardly from the tape surface at the other side, with magnetic flow along the tape surface (for a very short distance) between such two flows, down and up, just stated. Thus a greatly increased magnetizing effect will be produced with a given current flow, and with a given size of parts, and given width of the scanned area (such width being the distance across the scan measured parallel to the direction of tape movement).

Other objects and uses of the invention will appear from a detailed description of the same, which consists in the features of construction and combinations of parts hereinafter described and claimed.

In the drawings:

Figure 1 shows a section of tape of one form, having thereon a recording incorporating features of the present invention, said recording including cross scanning of the high frequency signal values, and also including a linear soundtrack, and synchronizing signals located in another linear tracking; and the recording shown in this figure is one produced by an electrostatic operation, being an electrostatic recording, but in this figure no enclosing sheet or other protective covering is shown for retaining the electrets in place;

Figure 2 is a view similar to that of Figure 1, but in this figure we have shown a portion of a protective sheet or covering in place, and have also shown a "flat" scanning tube in position directly above the sheet on which the record is being produced; and in this figure we have shown, merely for reference purposes, longitudinally extending lines at equal spacings in the recording area, but actually no such lines will be recorded by the operation;

Figure 3 shows a side elevation corresponding to Figures 1 and 2, the reflector of ultra-violet being shown in section; and this figure shows the presence of a "pre-electrifying" plate above the travelling sheet, and also shows a "balancing" plate below such sheet for control and other purposes; and this figure shows how the ultra-violet beam which is delivered to the outside of the tube's window is reflected down onto the surface of the sheet for recording purposes by producing a modulated discharge of the previously placed electrostatic charge, leaving a remainder charge corresponding to the intensities of the signal variations which are recorded; and in this figure we have shown the enclosing or protecting sheet being fed into place on the charge carrying surface of the recorded sheet, so as to enclose and seal the modulated charge as a permanent record between the sheets;

Figures 1, 2, 3:
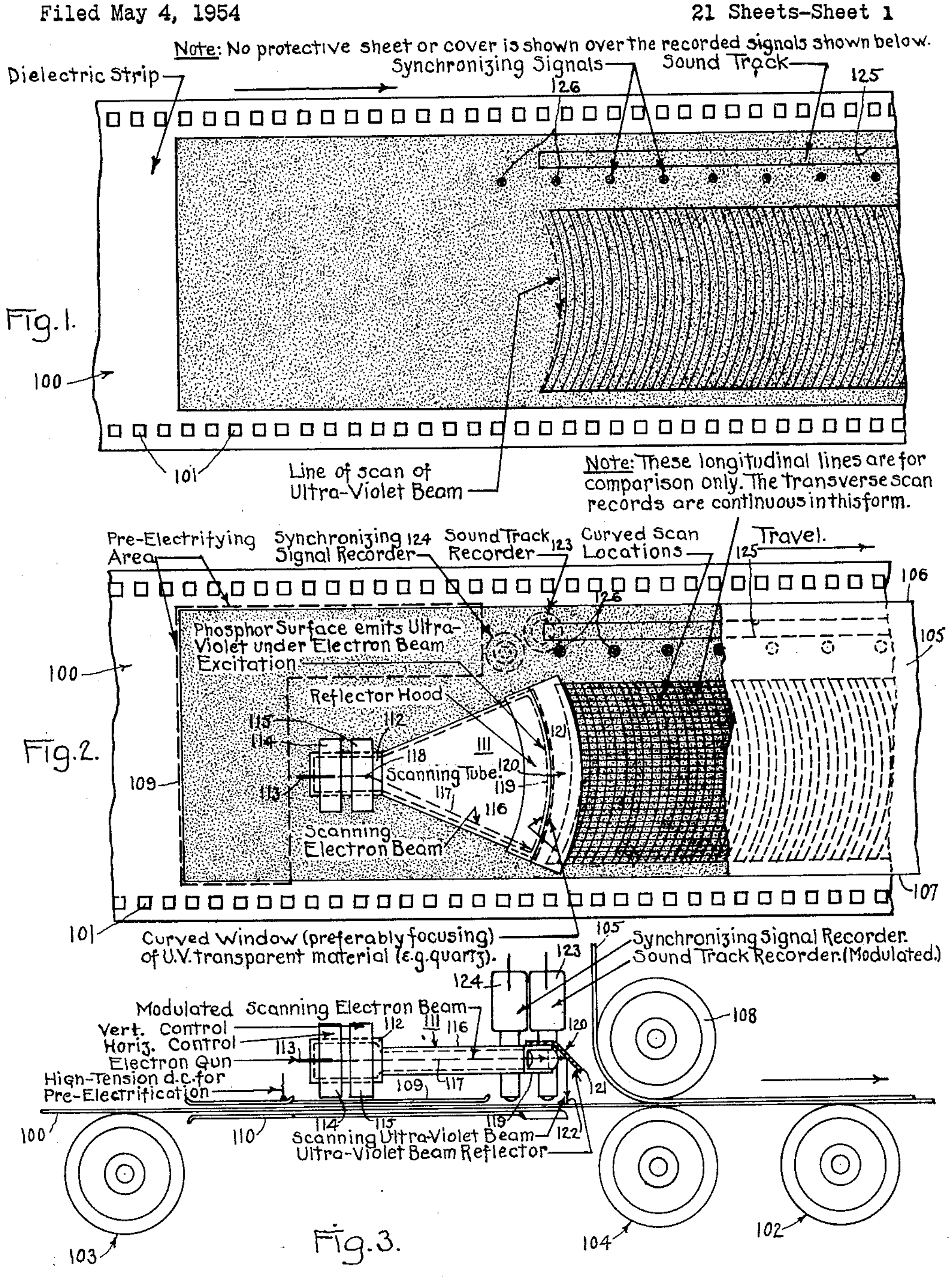
Figure 4:
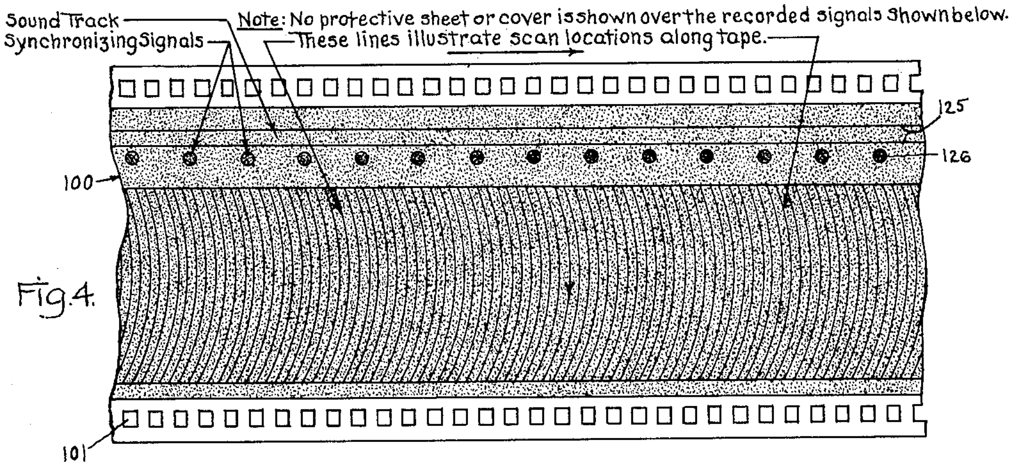
Figure 4 shows a length of the electrostatically recorded cross scanning, the cover or protective sheet not being shown in place, such showing being preliminary to the showing of a sensing and translating operation in which the tape record is to be used.
Figures 5, 6:
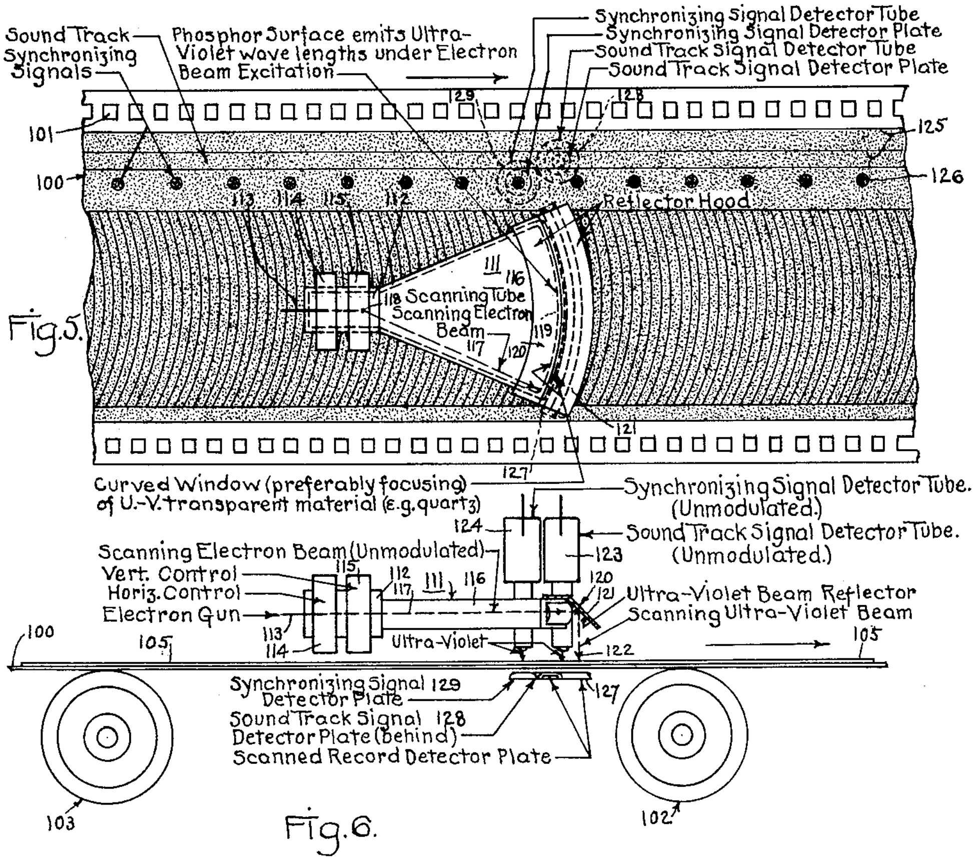
Figure 5 shows a view similar to that of Figure 2, but it shows the units, and the tape recording, when a sensing and translating operation is in progress; but the cover or protective sheet is not shown in this figure.
Figure 6 shows a side elevation corresponding to Figures 4 and 5, the reflector of ultra-violet being shown in section; but this figure shows the cover or protective sheet in place by edge view of greatly magnified thickness; and in this figure we have also shown the "detector" plate in place beneath the recorded tape and opposite to the locating of the ultra-violet beam scanning operations.
Figure 7:
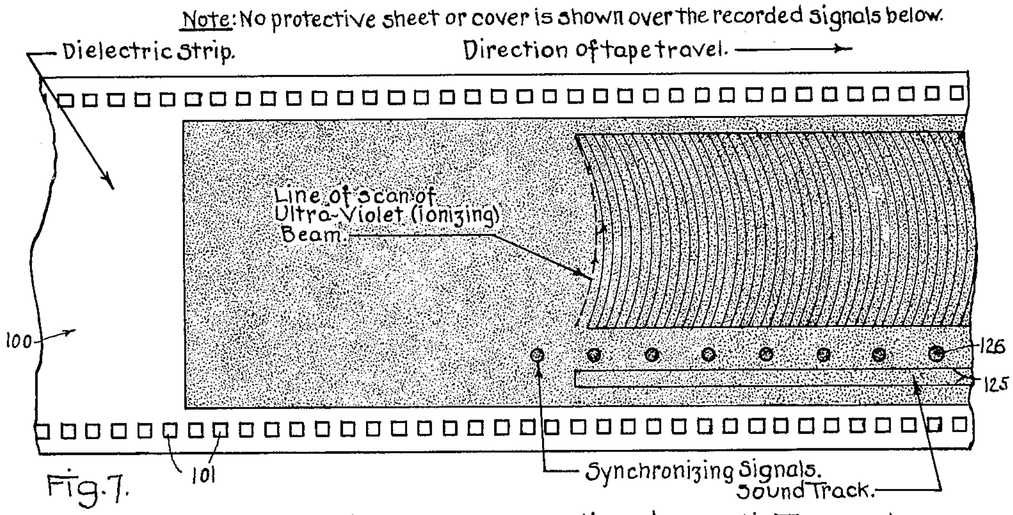
Figure 7 shows a view similar to that of Figure 1, for an operation employing electrostatic charging and modulation, but Figure 7 is a bottom face view of the tape strip, without the presence of the cover or protecting sheet; and accordingly the cross scans are reversed as compared to those shown in previous figures.
Figures 8, 9:
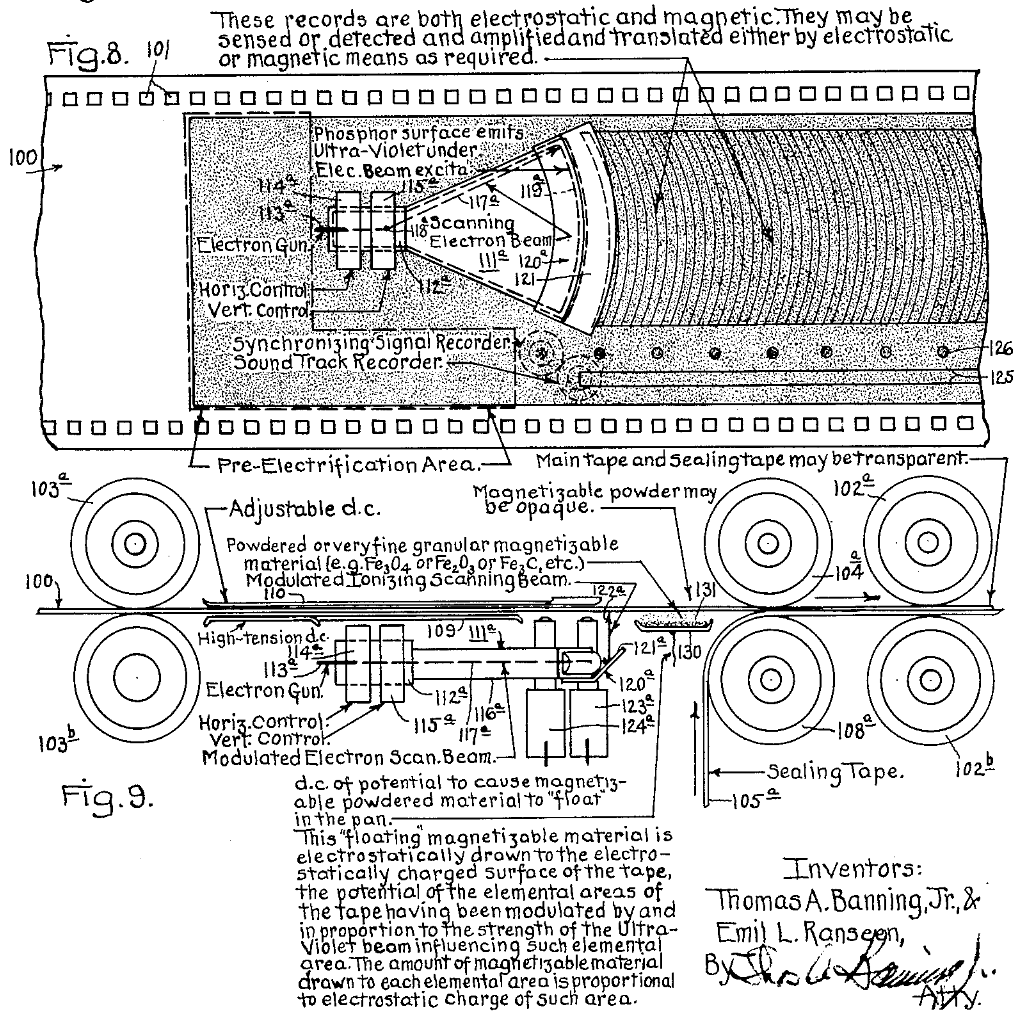
Figure 8 shows a view similar to that of Figure 2, but without the presence of any showing of the cover sheet, and for the operations in which the showing of Figure 7 is used, Figure 8 also being a bottom view of the parts and thus corresponding to Figure 7.
Figure 10:
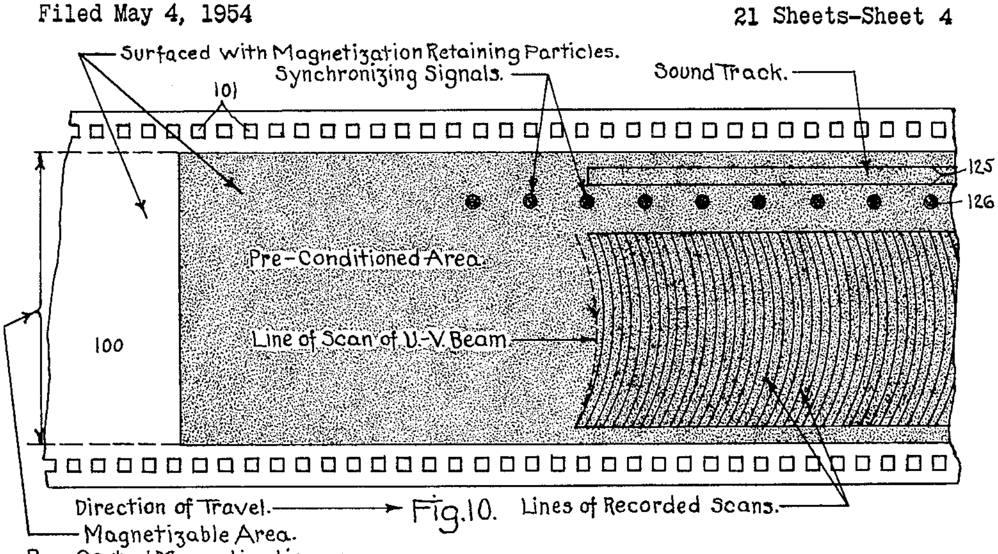
Figure 11:
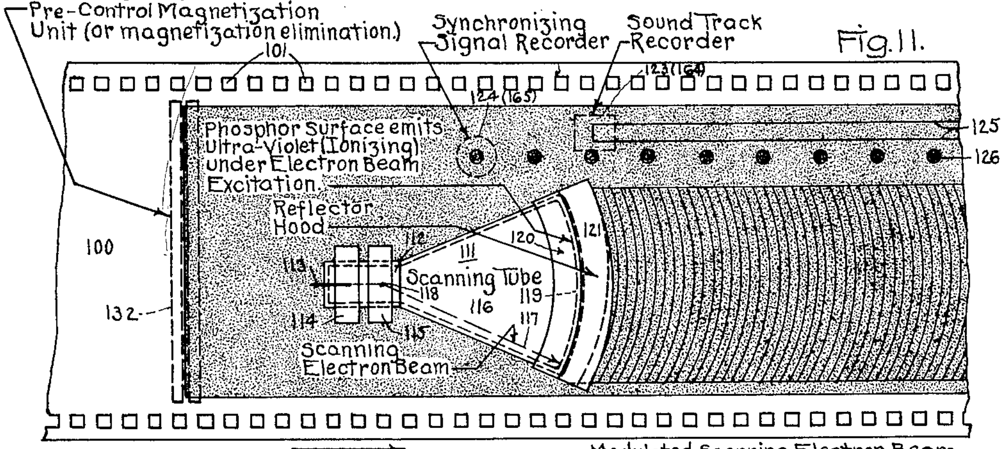
Figures 12, 12A:
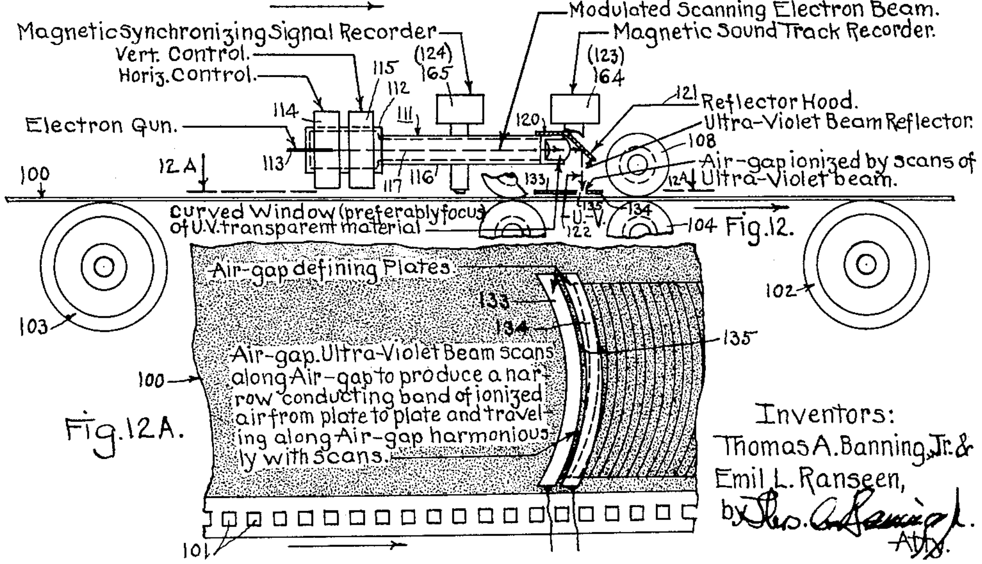
Figure 13:
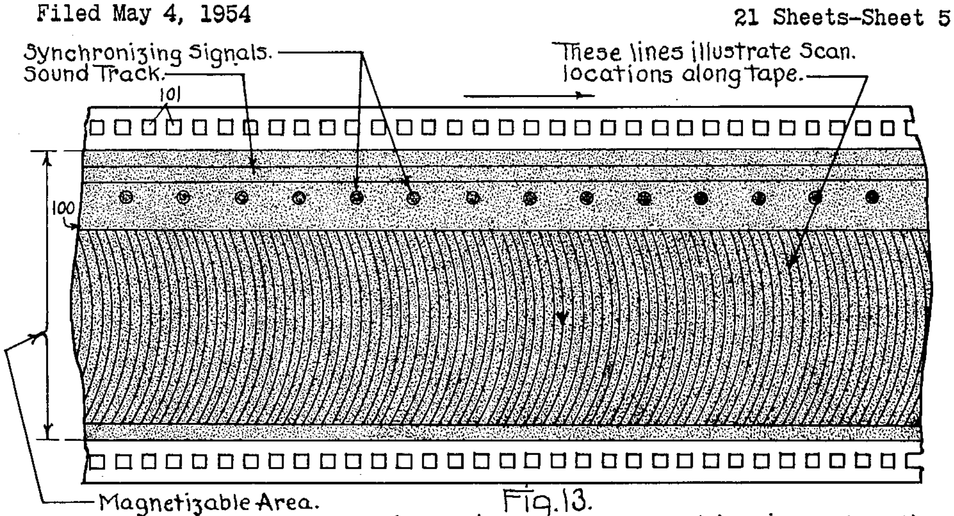
Figures 14, 15, 16:
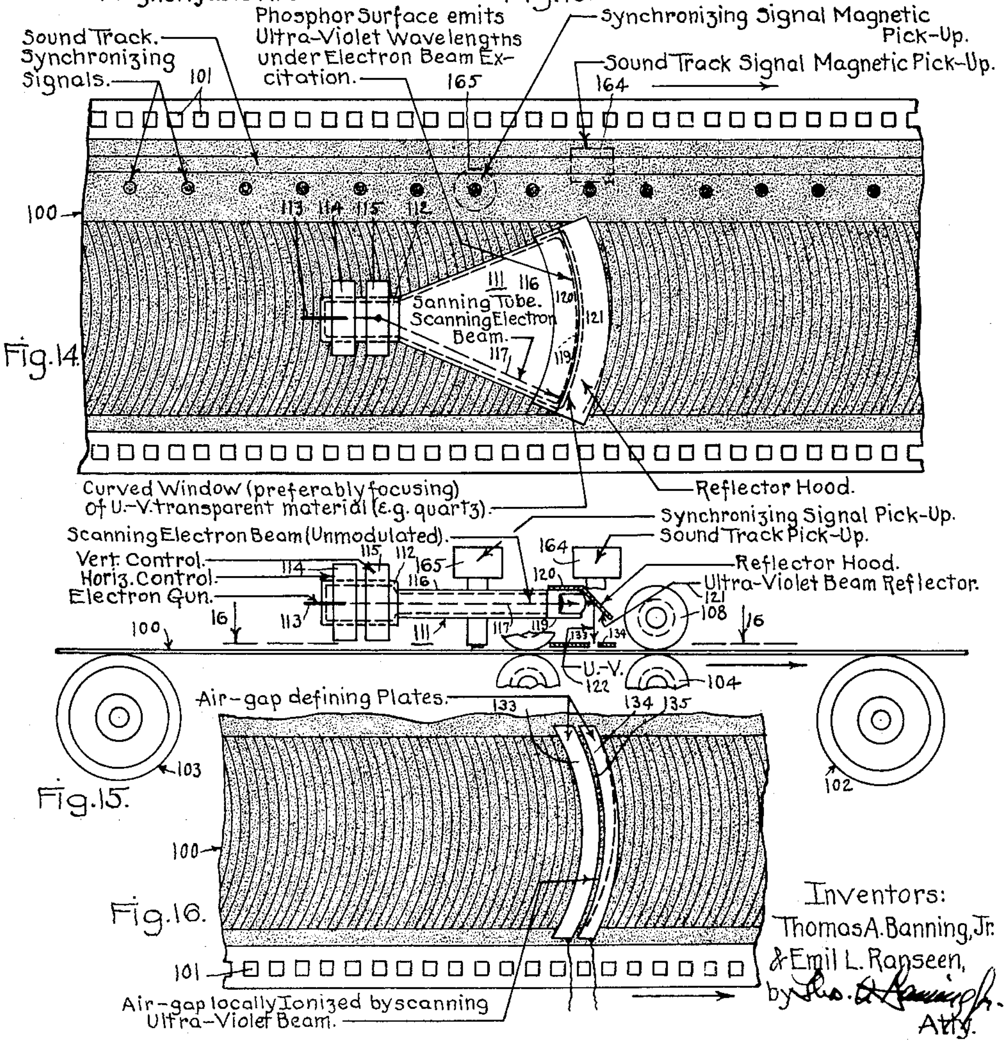
Figure 17:
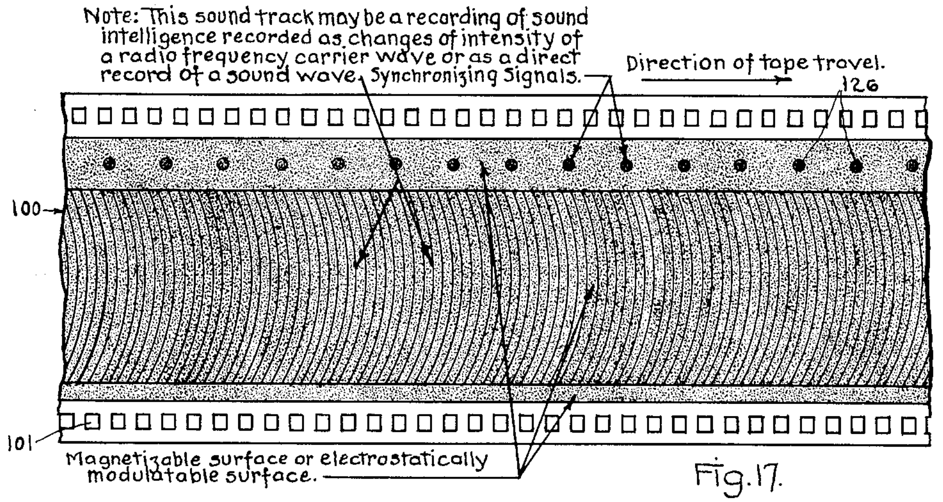
Figure 18:
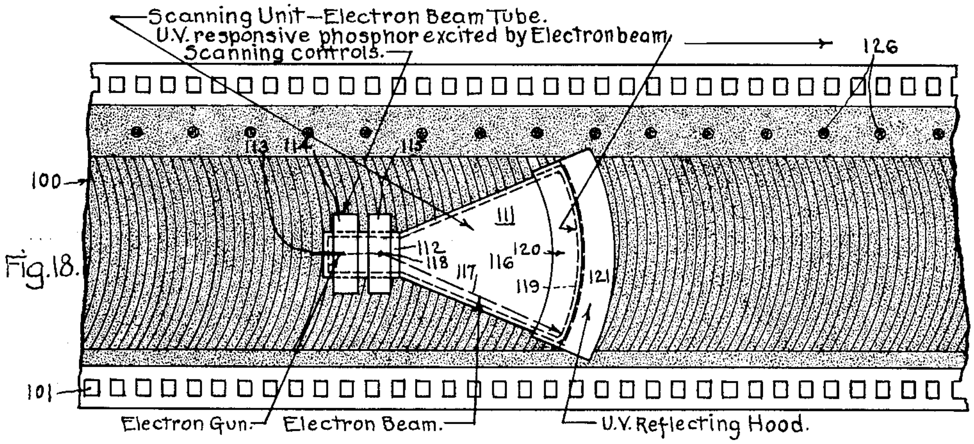
Figure 19:
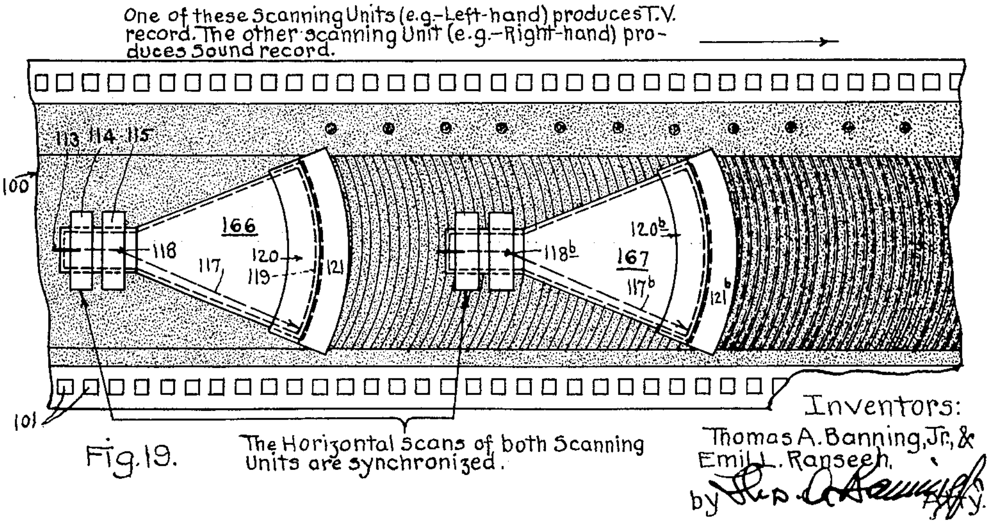
Figures 20, 21, 22, 23, 24, 25, 26:
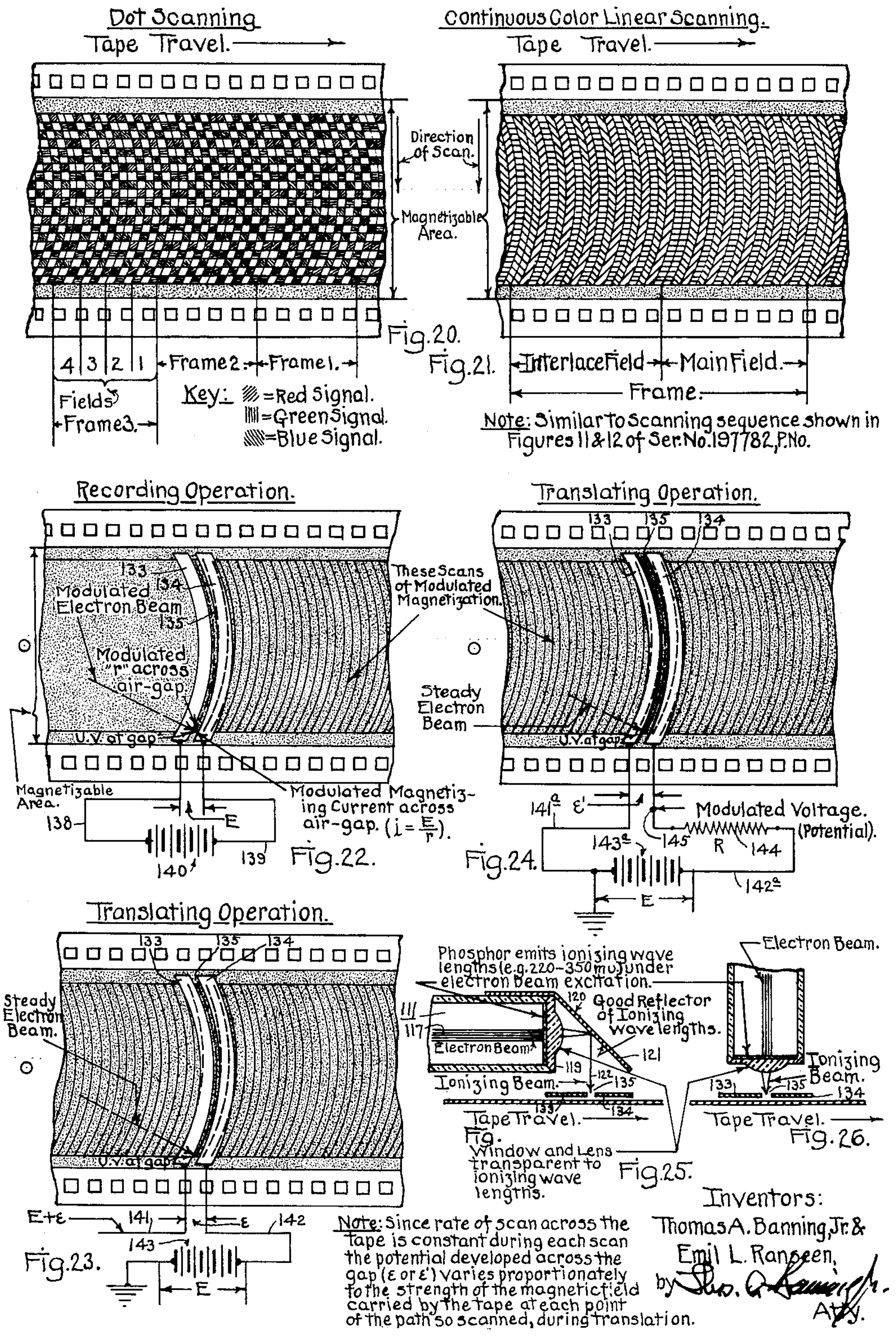
Figures 27, 28, 29, 30, 31, 32:
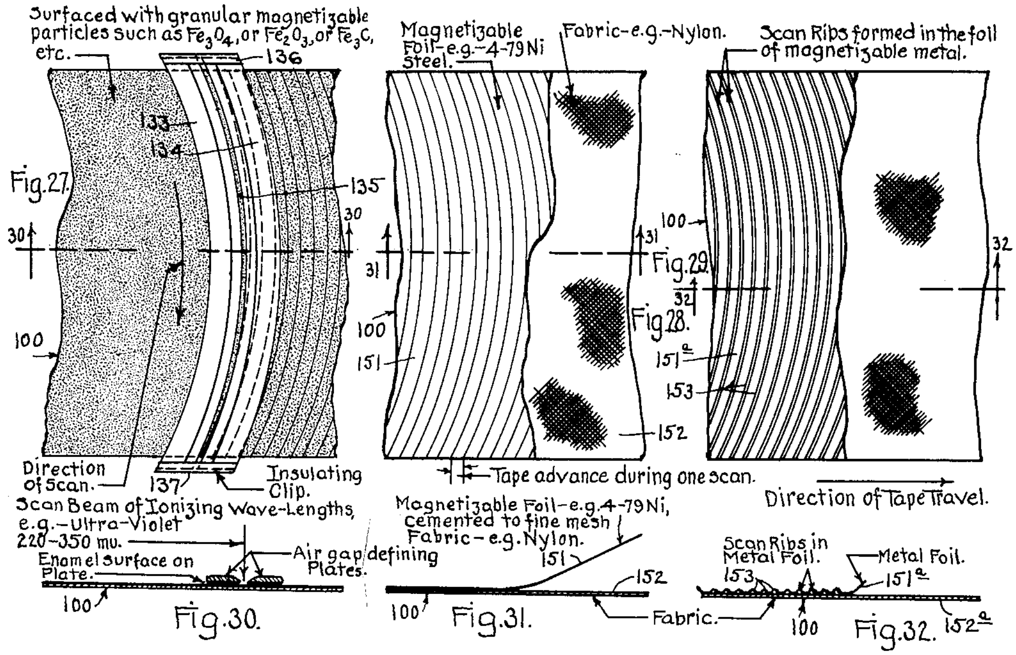
Figures 33, 34, 35, 37A, 37B:
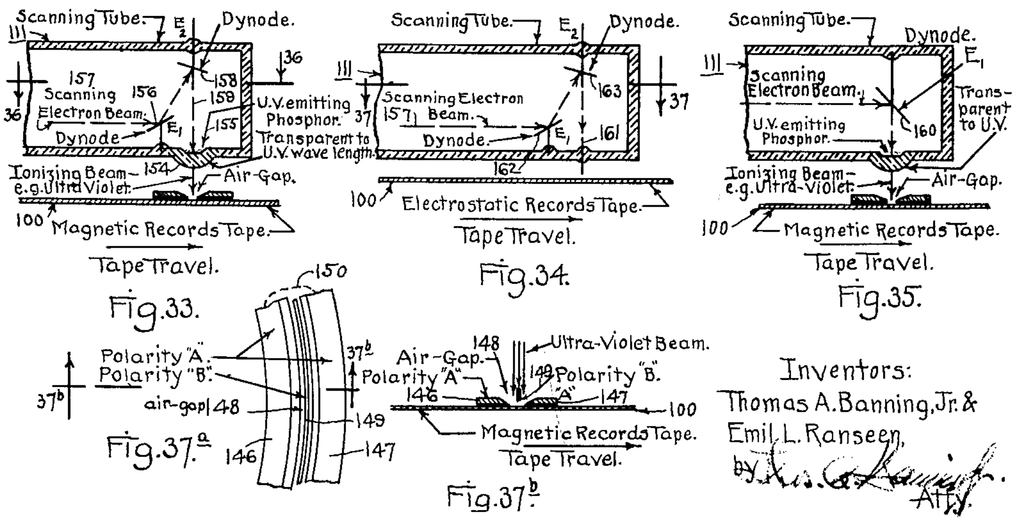

Figure 9 shows a side elevation corresponding to Figures 7 and 8, and for the operation shown in those figures; and Figure 9 shows that the scanning tube has been placed beneath the sheet on which the recording is being produced, with corresponding reversal of the positions of the "pre-electrification" and "balancing" plates; and in Figure 9 we have shown the protecting sheet or cover as being fed to the bottom face of the record carrying sheet, since the recordings have been produced on that bottom face, being a reversal of the previously illustrated arrangements; and in Figure 9 we have shown provision for delivering finely comminuted or even powdered magnetizable material to the electrostatically recorded bottom face of the sheet prior to the sealing and enclosing operation; such finely comminuted magnetizable material being carried by a shallow tray which can be electrified to a point such that the material carried by it will be substantially in a condition of electrostatic balance, ready to move promptly to the electrostatic charges carried by the under face of the recorded sheet travelling above it; the arrangement shown in Figures 7, 8 and 9 being one in which a combination recording is produced, both electrostatic and magnetic, which can be sensed either electrostatically or magnetically; and when the sheets are formed of transparent material the magnetic material which has been deposited by such electrostatic operation will produce a picture which may be viewed by transmitted light, being usable as a frame of a moving picture recording;

Figure 10 shows a view similar to that of Figure 1, but in Figure 10 the recording and sensing operations are produced by magnetic recordings instead of electrostatic recordings; and the arrangement of recording shown in Figure 10 does not require the use of any cover or protecting sheet to retain the magnetically recorded signals in force, being thus similar to conventional magnetic recordings, but being essentially dissimilar from other previously known magnetic recordings in essential and vital features, as will presently appear in full detail;

Figure 11 shows a view similar to that of Figure 2, but corresponding to the magnetic recording operation of Figure 10; and in Figure 11 we have shown, by way of illustration and not as any limitation, magnetic means to pre-magnetize the surface of the tape prior to the placing of the magnetic records thereon, such "pre-magnetizing" means being used or not used as may be found desirable, but serving to produce a uniform amount of magnetization on the tape when used, so as to ensure a regular recording operation on a magnetic base of known intensity;

Figure 12 shows a side elevation corresponding to Figures 10 and 11, the reflector of ultra-violet being shown in section; and this figure also shows in section the two conductors which provide the air gap which is ionized by the ultra-violet beam directed to and focused at such gap to thus produce the controlled conductivity conductor from one side of the gap to the other side, such controlled conductor moving along the gap (in the direction of scan) harmoniously with the scanning movement;

Figure 12A shows a fragmentary horizontal section taken on the line 12A—12A of Figure 12, looking down in the direction of the arrows; and this figure shows a detail of the two gap producing conductors which are insulated from each other and produce the desired air gap between them;

Figure 13 shows a view similar to that of Figure 4, but it shows a section of tape carrying magnetically recorded signal variations produced, for example, by recording means such as those shown in Figures 10, 11, 12 and 12A; and Figure 13 also shows magnetically recorded sound track and synchronizing signals;

Figure 14 shows a view similar to that of Figure 5, but for the condition of sensing and translating the magnetically recorded signals carried by the tape of Figure 4;

Figure 15 shows a side elevation corresponding to Figures 13 and 14, with the ultra-violet reflector shown in section;

Figure 16 shows a fragmentary horizontal section taken on the line 16—16 of Figure 15, looking in the direction of the arrows, downwardly towards the tape carrying the magnetically recorded signals, and it also shows the two gap producing conductors which are insulated from each other and produce the desired air gap between them;

Figure 17 shows a section of tape carrying cross scan recordings of sound signals which cross scans may be of either radio or audio frequency recordings; and this figure shows the presence of synchronizing signals placed in linear fashion along the tape, but does not show a linear sound track since in the showing of this figure the sound recordings comprise the cross scans already referred to;

Figure 18 shows a view similar to those of Figures 5 and 14, but for the case of sensing and interpreting the cross scanned sound track signals shown in Figure 17;

Figure 19 shows a view similar to that of Figure 18, but in Figure 19 the tape is shown as carrying cross scans of signal recordings for both a television picture recording and the accompanying sound records, the latter being superimposed on the picture signal variation recordings according to one feature previously referred to herein; and accordingly, Figure 19 shows the presence of two scanning tubes, one for the picture signal variation recordings and the other for the sound recordings, said two tubes being necessarily displaced lengthwise of the tape, but in proper locations to simultaneously sense both classes of recordings which go together, the recordings having been placed on the tape by scanning tubes which were similarly displaced lengthwise of the tape;

Figure 20 shows a section of tape carrying cross scans which are a recording of color television signals produced on the basis of the system of "mixed highs" previously referred to herein, the "dots" of recordings shown in this figure corresponding to the received signals on said system, and said dots being hatched to indicate the signals which correspond to the three colors, according to the key shown adjacent to this figure; and this figure shows the order of progression of these dot signals for three consecutive "frames," but it will be understood that only twelve scans have been shown for each frame instead of the conventional 525 scans for each frame as actually used;

Figure 21 shows a section of tape carrying cross scans which are a recording of color television signals produced on the basis of the system of linear color scans previously referred to herein, the cross scans of recordings shown in this figure corresponding to the received signals on said system, and said scans being hatched to indicate the scans which correspond to the three colors; and this figure shows the order of progression of these scan signals for a main field and an interlace field, but will be understood that only eighteen scans have been shown for each field instead of the conventional 263 scans for the main field and 262 scans for the interlace field as actually used;

In Figures 20 and 21 we have not shown any synchronizing signals nor any sound track signals recordings, for purposes of simplicity but it will be understood that proper provision for such recordings will be included as needed when making recordings of the color signal variations;

Figure 22 shows a section of tape, together with the two gap producing conductors to which we have previously referred herein, the arrangement being intended for producing the cross scans on the tape by magnetic recording operations, such recorded cross scans being shown in that portion of the tape which has passed the location of the air gap; and this figure shows, schematically, one simple circuit arrangement whereby the necessary magnetic effects may be produced adjacent and close to the surface of the tape which surface is of magnetizable material, with provision whereby the strengths of the recorded magnetizations will be proportional to the strengths of the electron beam at all locations of the recorded scan;

Figure 23 shows a section of tape, together with the two gap producing conductors to which we have previously referred herein, the arrangement being intended for sensing and interpreting previously laid down magnetic recordings on cross scans carried by the tape, such cross scans being shown on the tape both in advance of the sensing location and behind such location since the tape is travelling along; and this figure shows, schematically, one simple circuit arrangement whereby the necessary sensed effects are produced corresponding to the strengths of the magnetic recordings along each line of scan, and according to what may be called the "potential" sensing arrangement previously referred to herein;

Figure 24 shows a section of tape, together with the two gap producing conductors to which we have previously referred herein, the arrangement being intended for sensing and interpreting previously laid down magnetic recordings on cross scans carried by the tape, such cross scans being shown on the tape both in advance of the sensing location and behind such location since the tape is travelling along; and this figure shows, schematically, one simple circuit arrangement whereby the necessary sensed effects are produced corresponding to the strengths of the magnetic recordings along each line of scan, and according to what may be called the "closed circuit" sensing arrangement, previously referred to herein;

In Figures 22, 23 and 24 we have not shown any synchronizing signals nor any sound track signal recordings, for purposes of simplicity of showing, but it will be understood that proper provision for such recordings will be included as needed according to the recordings which are being made or sensed;

Figure 25 shows, on enlarged scale as compared to other figures, a detail section of one form of window end of the scanning tube which may be used in connection with the recording and sensing operation; such tube end being shown as provided with the phosphor surface excitable by the electron beam to produce the ultra-violet radiation, and the window being shown as including a lens arrangement for concentrating the ultra-violet into a beam transmittable through the material of the window and such lens arrangement; this figure also showing the ultra-violet reflector and the two gap producing conductors close to the tape surface; the tube arrangement of this figure being of the "horizontal" or "flat" type;

Figure 26 shows a view similar to that of Figure 25, but for the case of a vertically extending tube;

Figure 27 shows a section of tape provided with magnetizable particles or granular material spread over its surface according to well understood techniques; but this figure also shows, on enlarged scale, the two transverse conductors, separated from each other to provide the narrow gap to which the ultra-violet beam is focused; and shows these two conductors connected together in their end portions by suitable clips of insulating material so as to produce a self-contained sensing unit; and this figure also shows the cross scans which have been laid down on the tape surface during tape movement towards the right in the figure;

Figure 28 shows a section of tape provided with a magnetizable surface composed of a thin sheet or foil of highly magnetizable material, such as the alloy of molybdenum and nickel and other, known as "4–79 N I" which includes 4 percent molybdenum and 79 percent nickel, such magnetizable sheet or foil being of a thickness of a fraction of one one-thousandth of an inch, and being cemented or otherwise supported on the surface of a thin backing of non-magnetizable material of high tensile strength and little stretch, such as nylon; and in this figure the magnetizable foil has been cut away at the right-hand portion of the figure to reveal such supporting sheet below the foil;

Figure 29 shows a view similar to that of Figure 28, but in the present case we have provided the foil will slight upwardly extending ribs formed along curves and at spacings to exactly correspond to the successive scans to be performed on the tape by magnetic operations, it being intended that these ribs shall register with the air gap at the point of impingement of the ultra-violet beam as beam scan proceeds, thus ensuring very close control of the operation; and these ribs may be formed in convenient manner as by passing the foil between suitable forming rollers; or said ribs may be formed by the presence of curved threads extended across the surface of the nylon backing sheet so that by pressing the metal foil firmly against such backing sheet during a cementing operation by use of a yieldable roller, the desired ribs may be produced;

Figures 30, 31 and 32 are longitudinal sections taken on the lines 30—30, 31—31 and 32—32 of Figures 27, 28 and 29, respectively, looking in the directions of the arrows;

Figure 33 shows a fragmentary longitudinal section through the window end portion of a modified form of scanning tube, together with the adjacent portion of the tape, and the two spaced apart conductors to which the ultra-violet beam is directed; and in this form of construction the tube is provided with a curved window on its lower or tape proximate face, such window being of curvature corresponding to the path of travel of a reflected electron beam, and such window being provided on its inside surface with the proper phosphor deposit for emission of ultra-violet under electron beam excitation; and such curved window also preferably formed of lens characteristics to bring the ultra-violet beam to focus outside of the envelope, the window being formed of material which is highly transparent to ultra-violet wave lengths; and in this embodiment we have provided two dynodes within the envelope in position to receive the electron beam and to direct the secondary radiation step-by-step by a path to the phosphor deposit on the window, with amplification of beam strength at the position of each dynode, as shown in the figure;

Figure 34 shows another modification embodying some of the features disclosed in the modification of Figure 33; but in the present case we have shown the tube end as being provided with conductors extending through the material of the envelope, and with dynode arrangements to direct the electron beam, amplified, to such conductors.

Figures 36, 37:
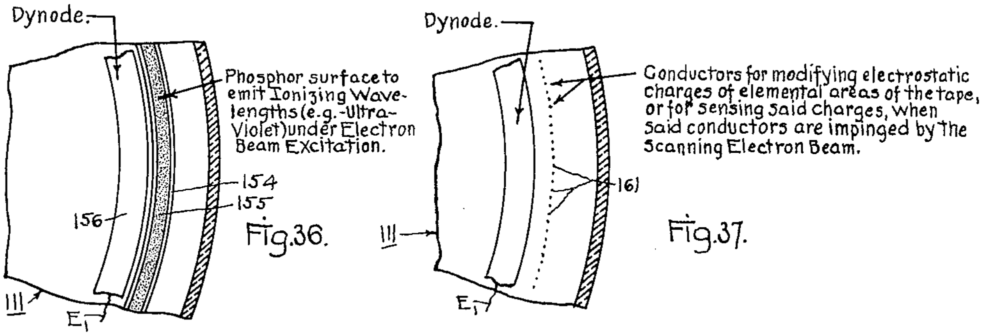
Figures 38, 39, 40, 41:
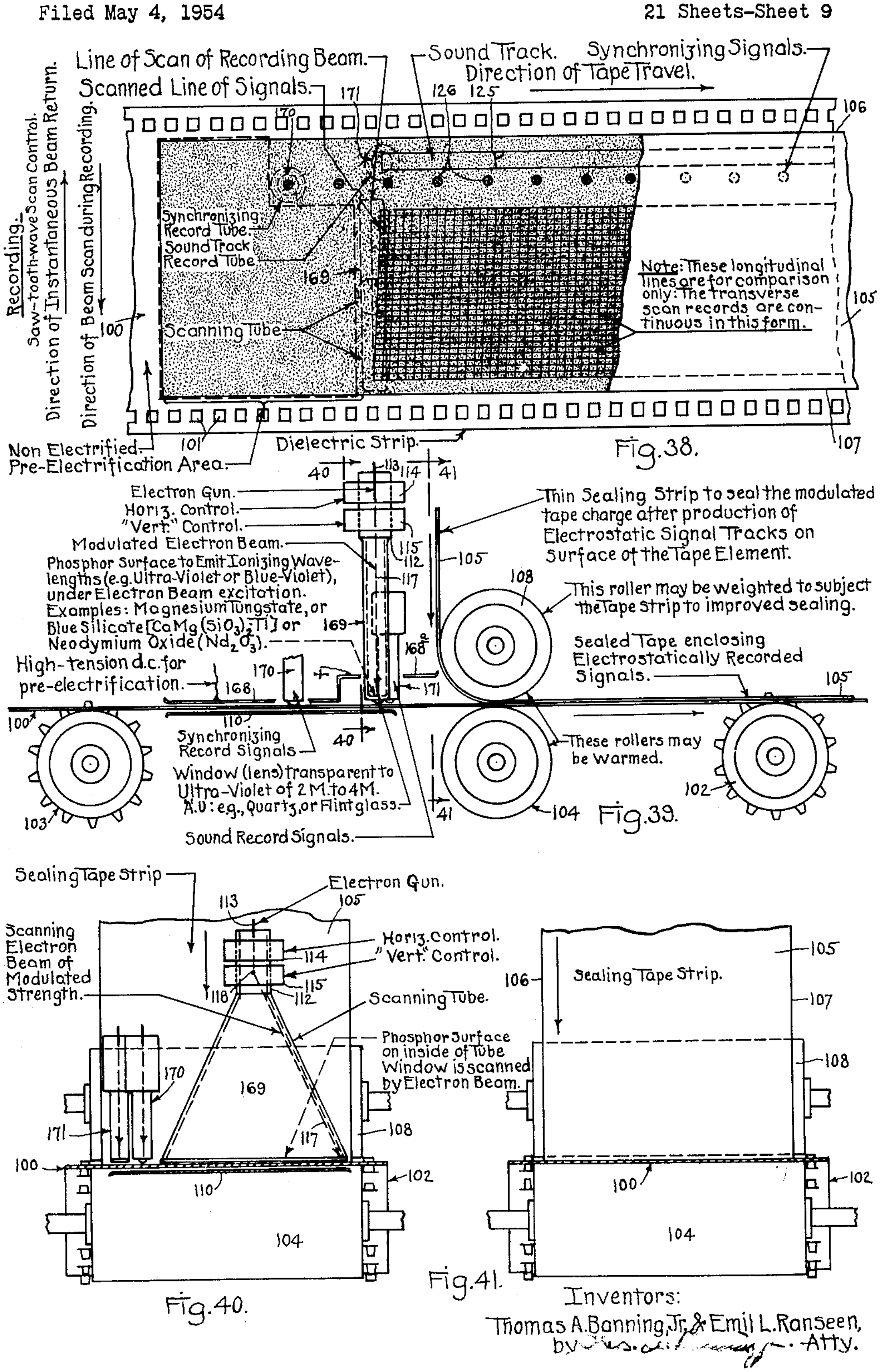
Figures 42, 43:
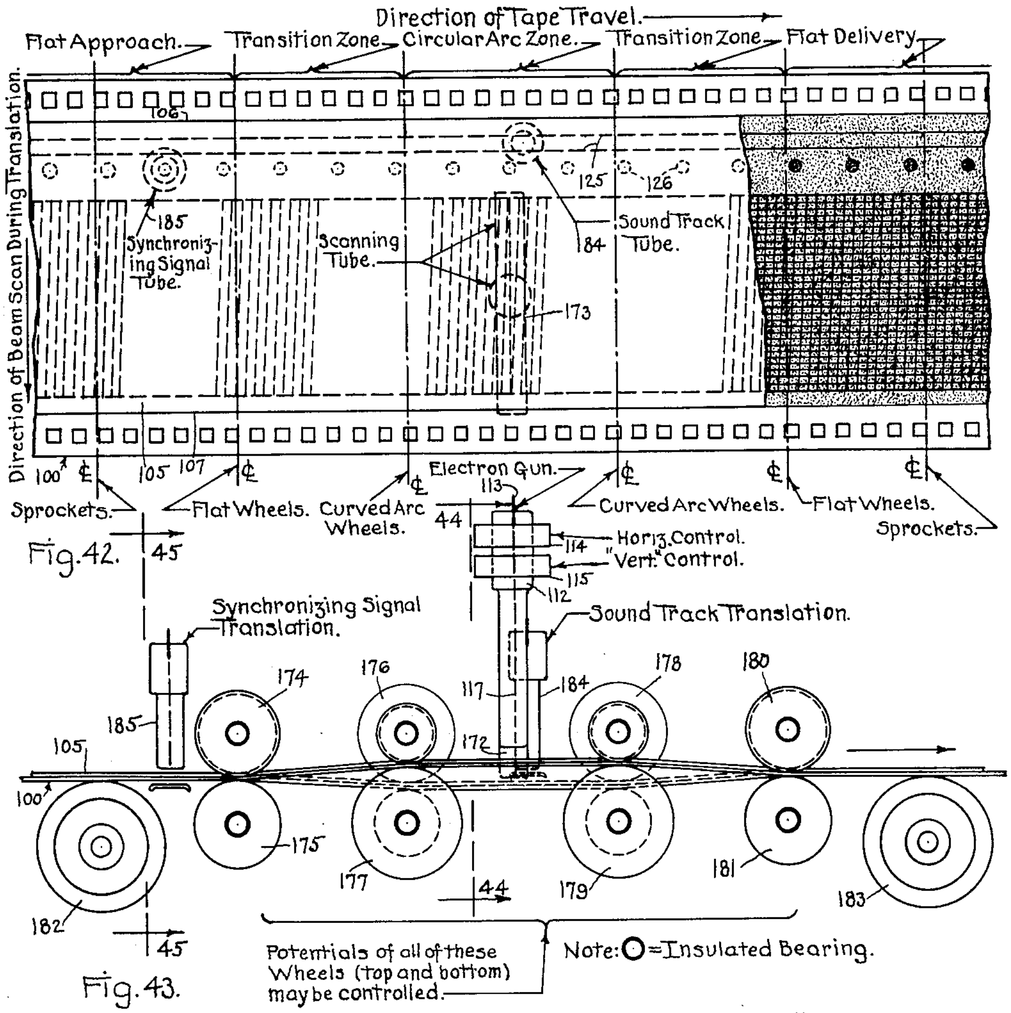
Figure 44:
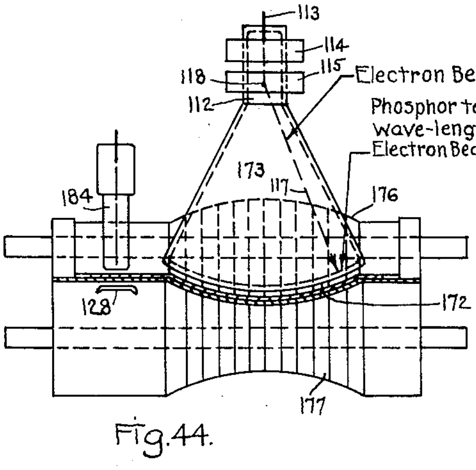
Figure 45:
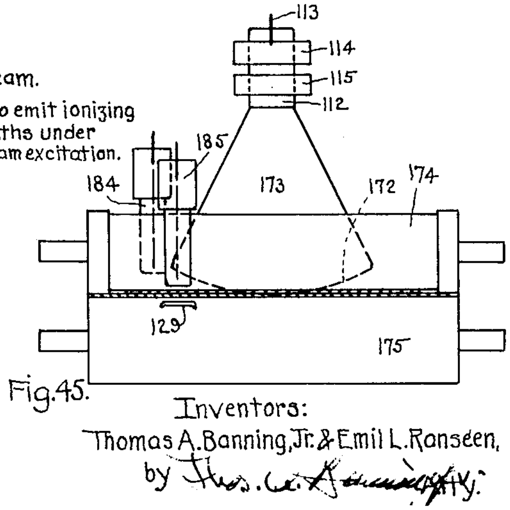
Figures 46, 47, 48, 49, 50:
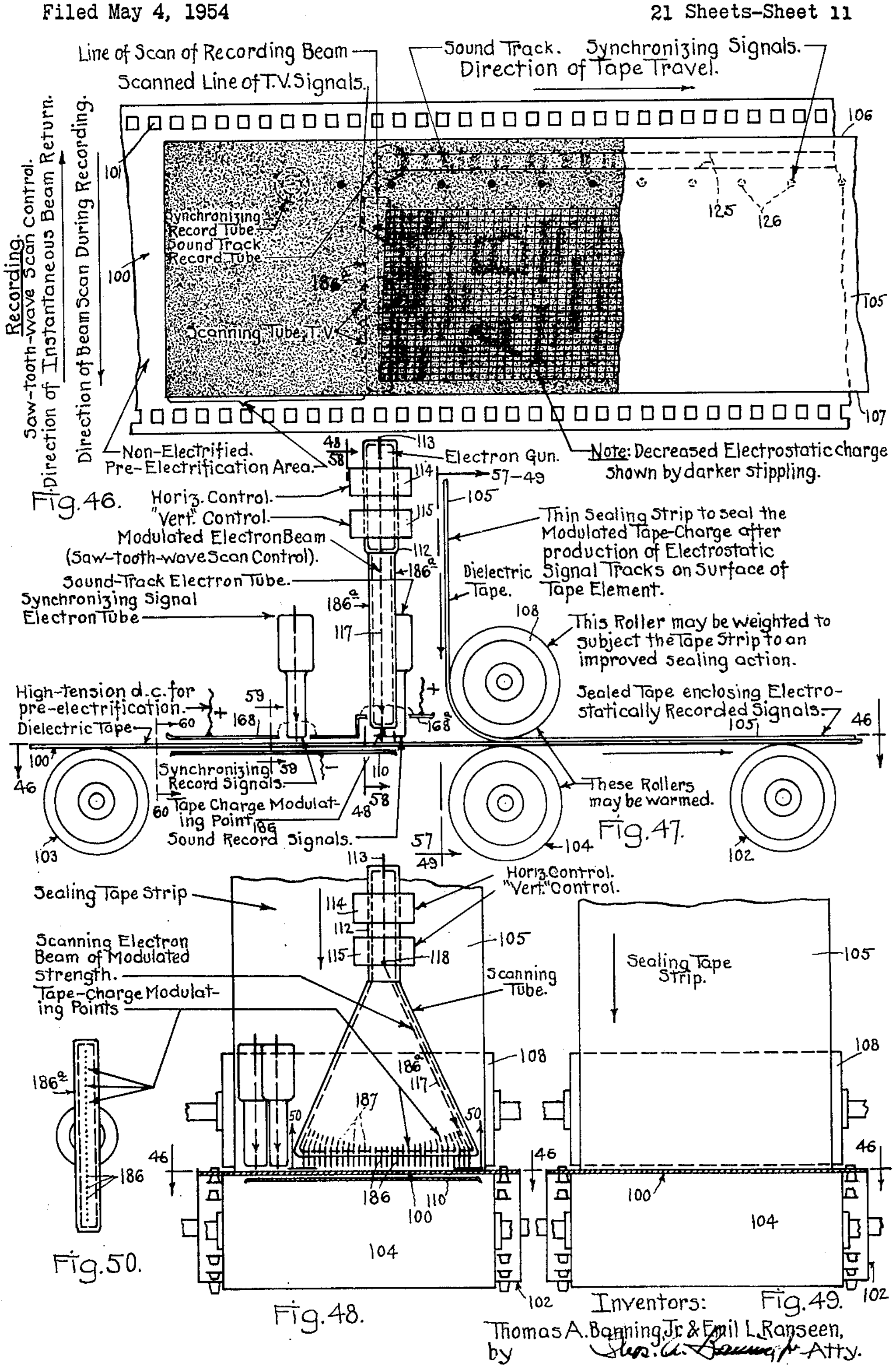
Figures 51, 52, 53, 54, 55, 56, 57, 58, 59, 60:
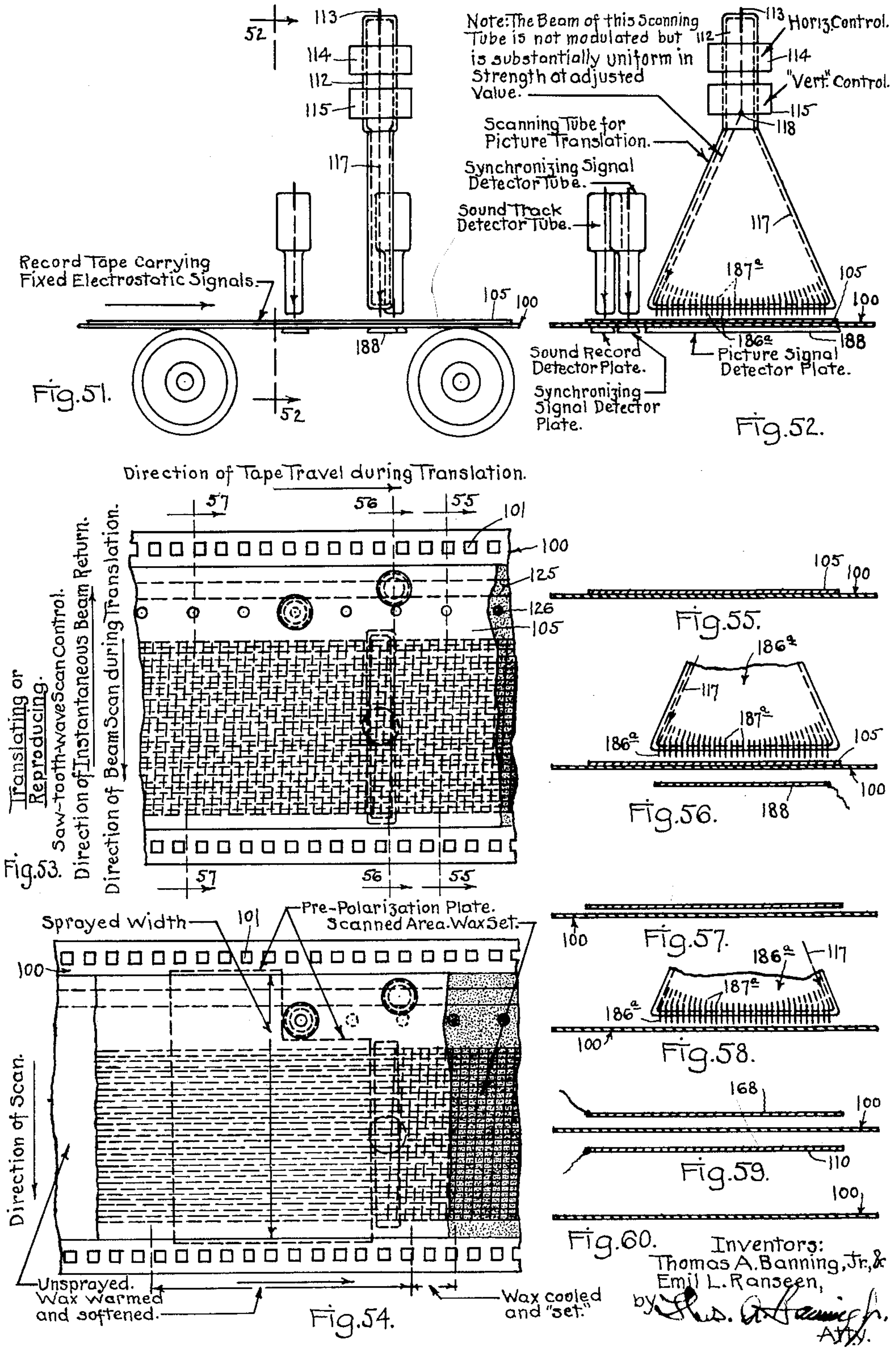
Figures 61, 62, 63, 64:
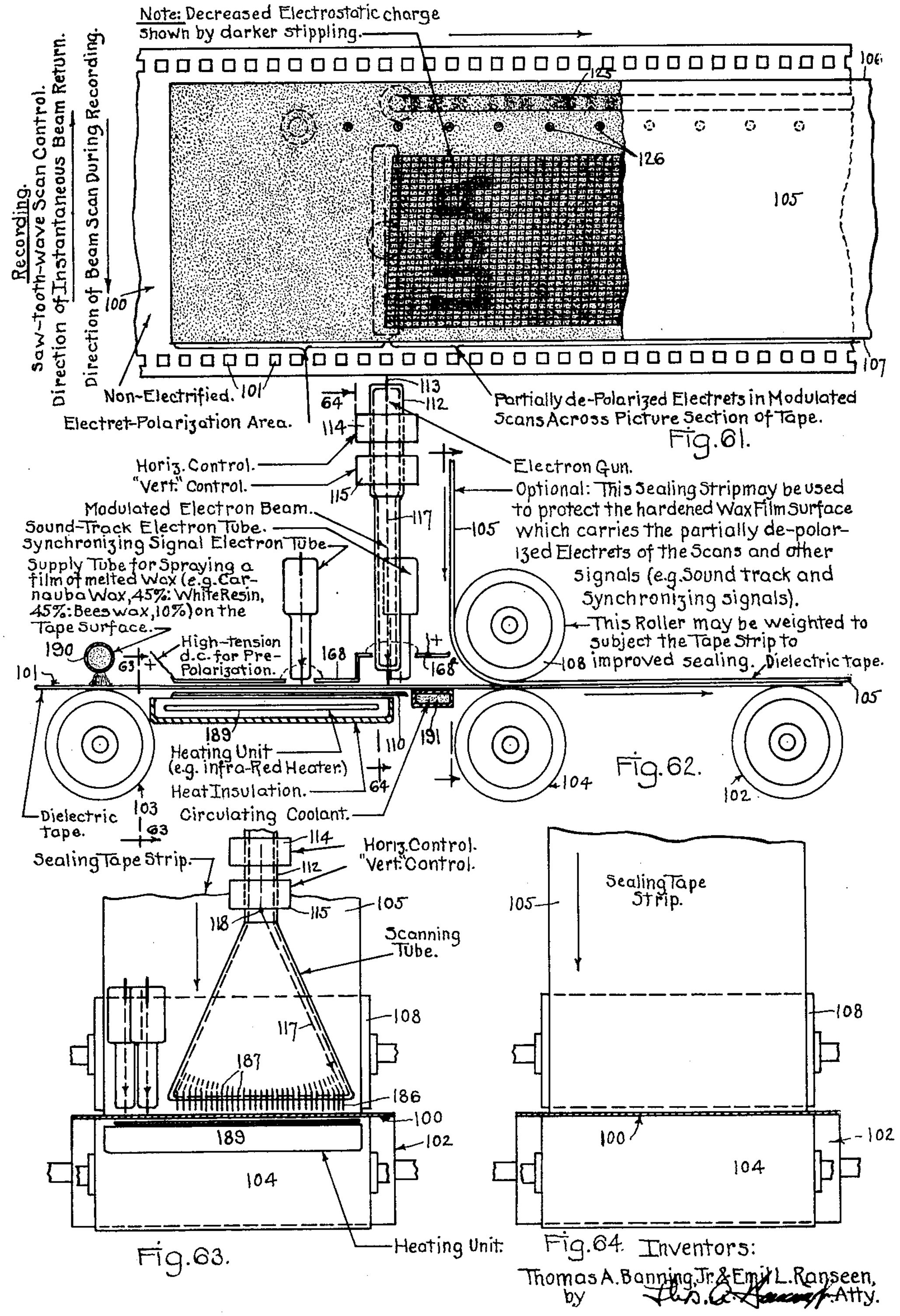
Figures 65, 66, 67, 68, 69, 70, 71:
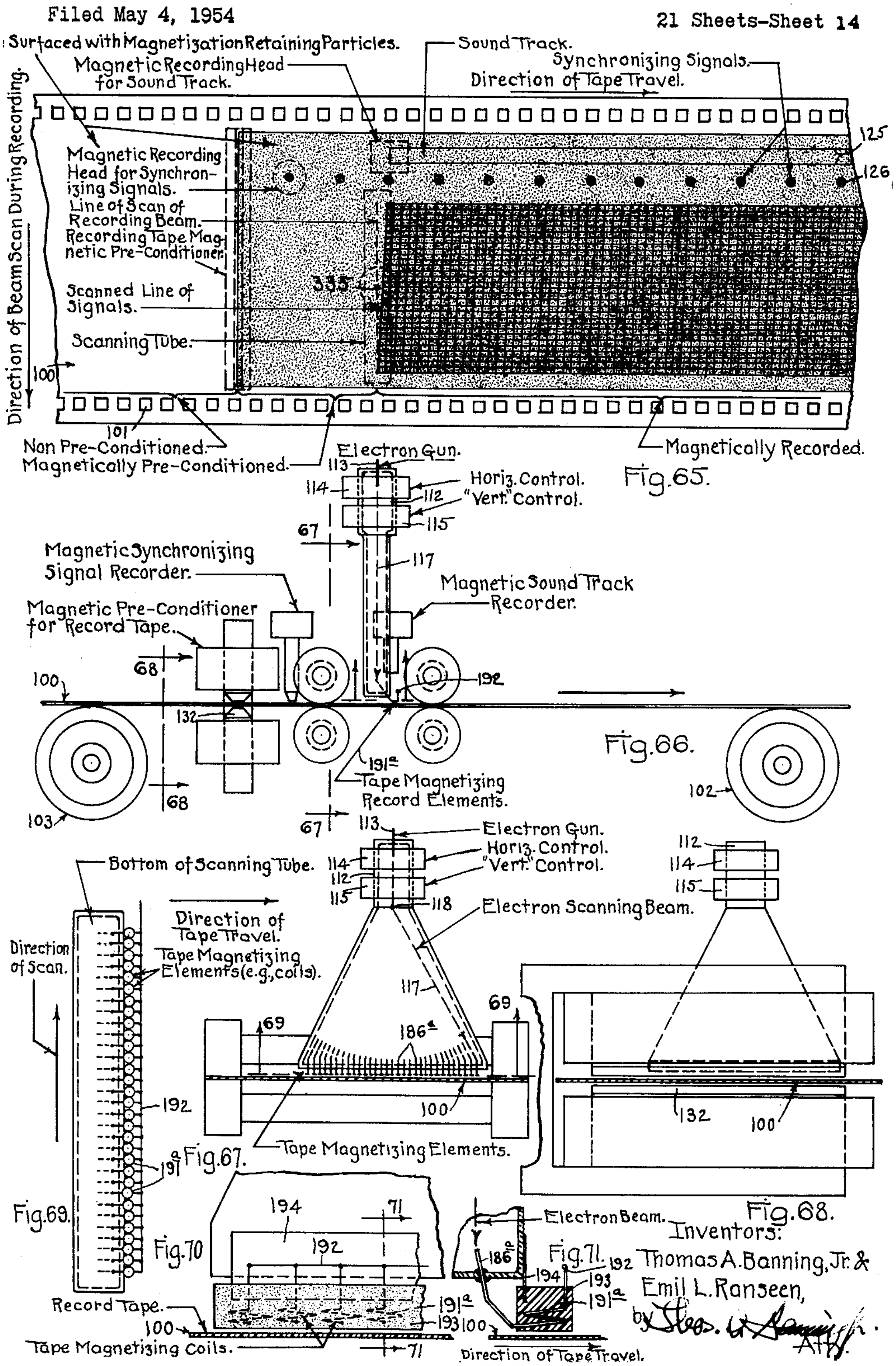
Figures 72, 73, 74, 75, 76, 77, 78:
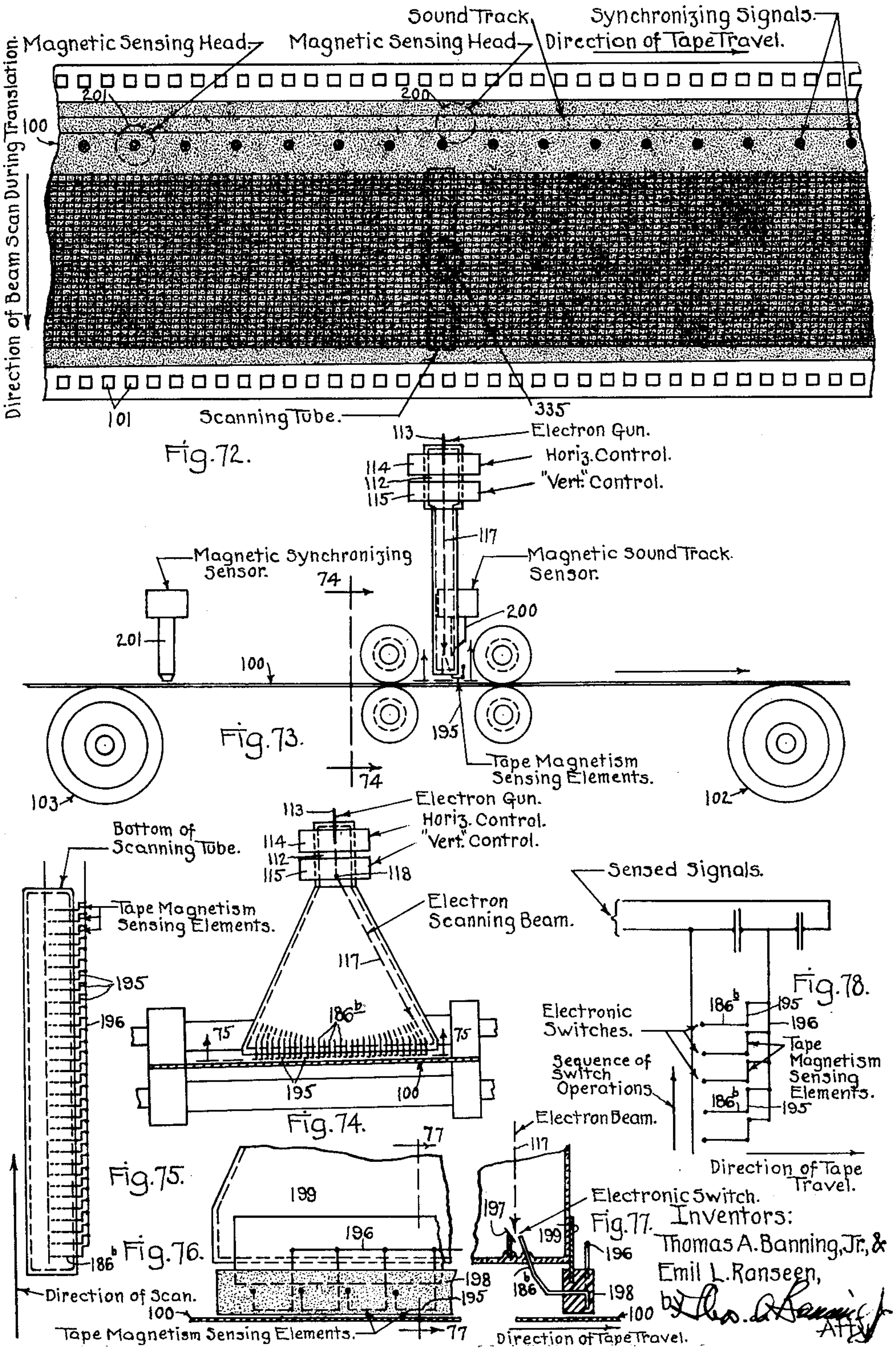
Figure 79:
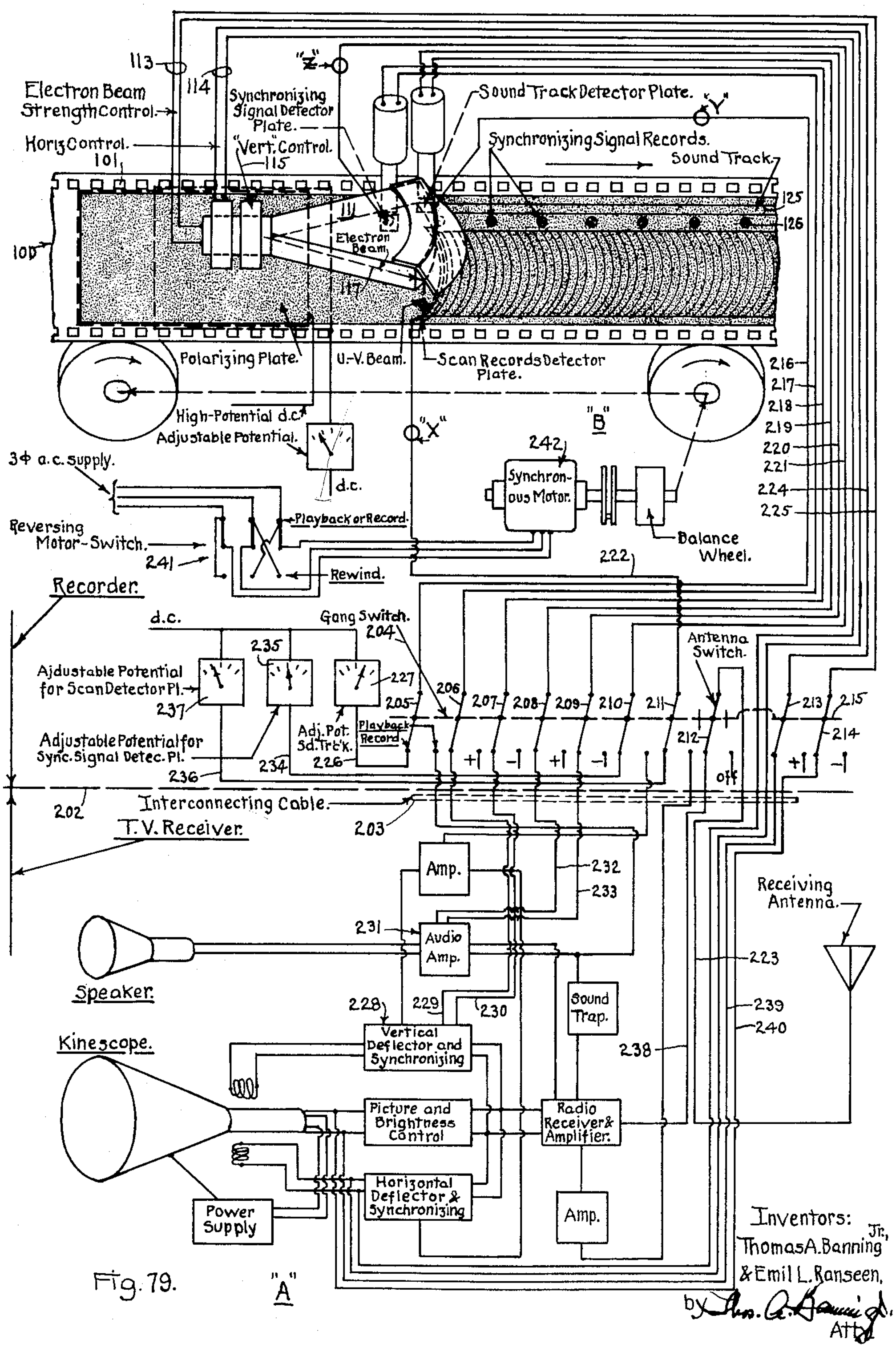
Figure 80:
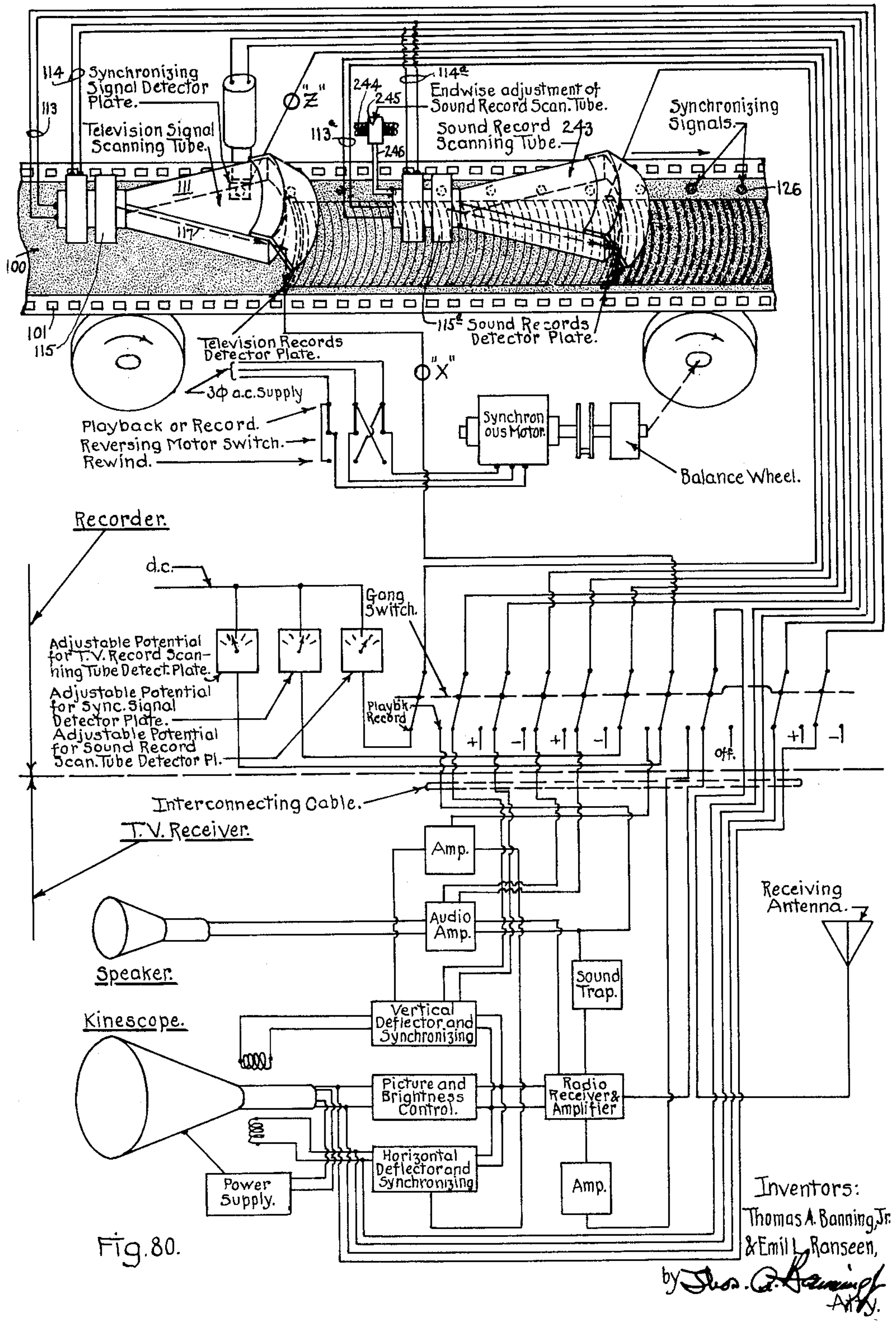
Figure 81:
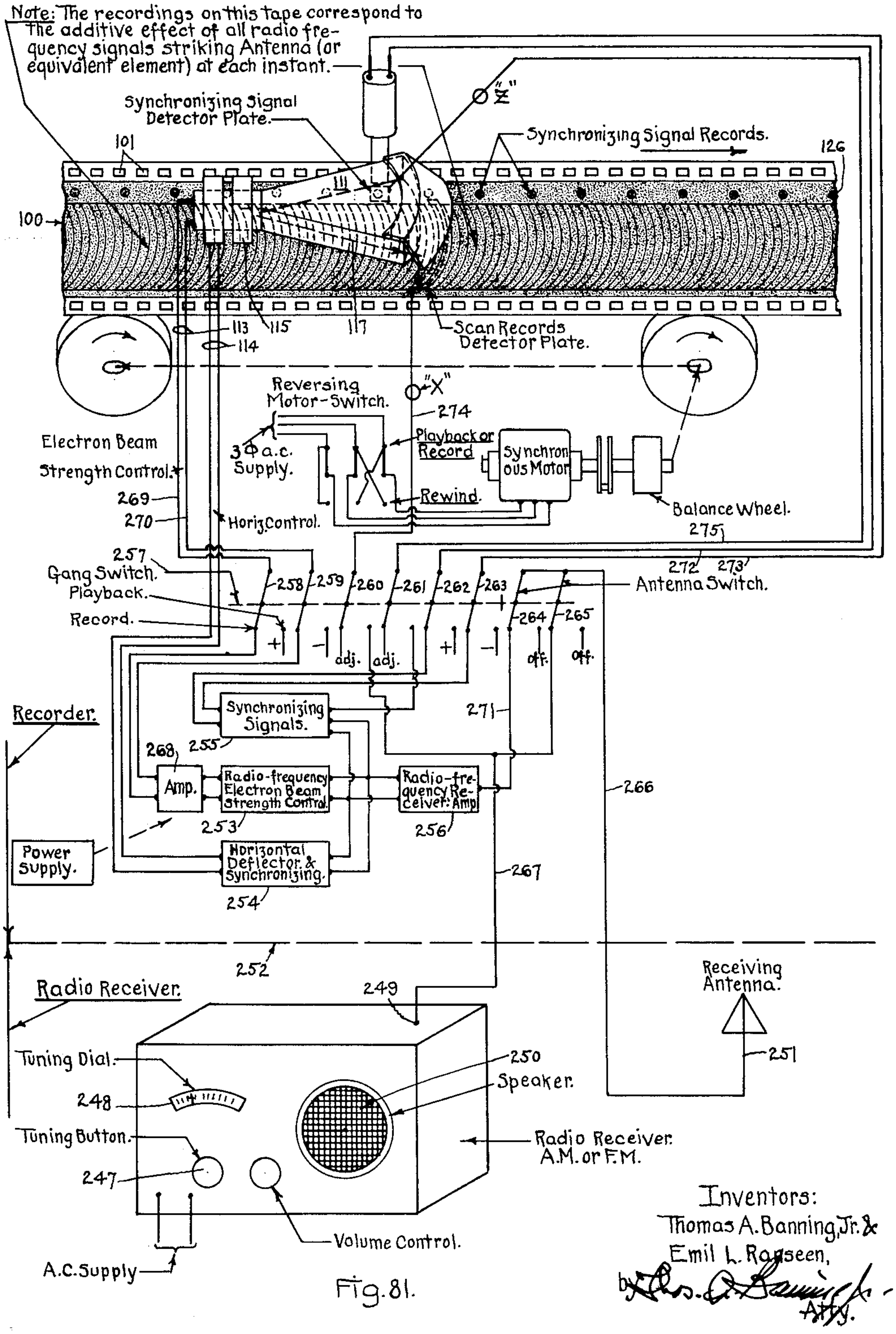
Figure 82:
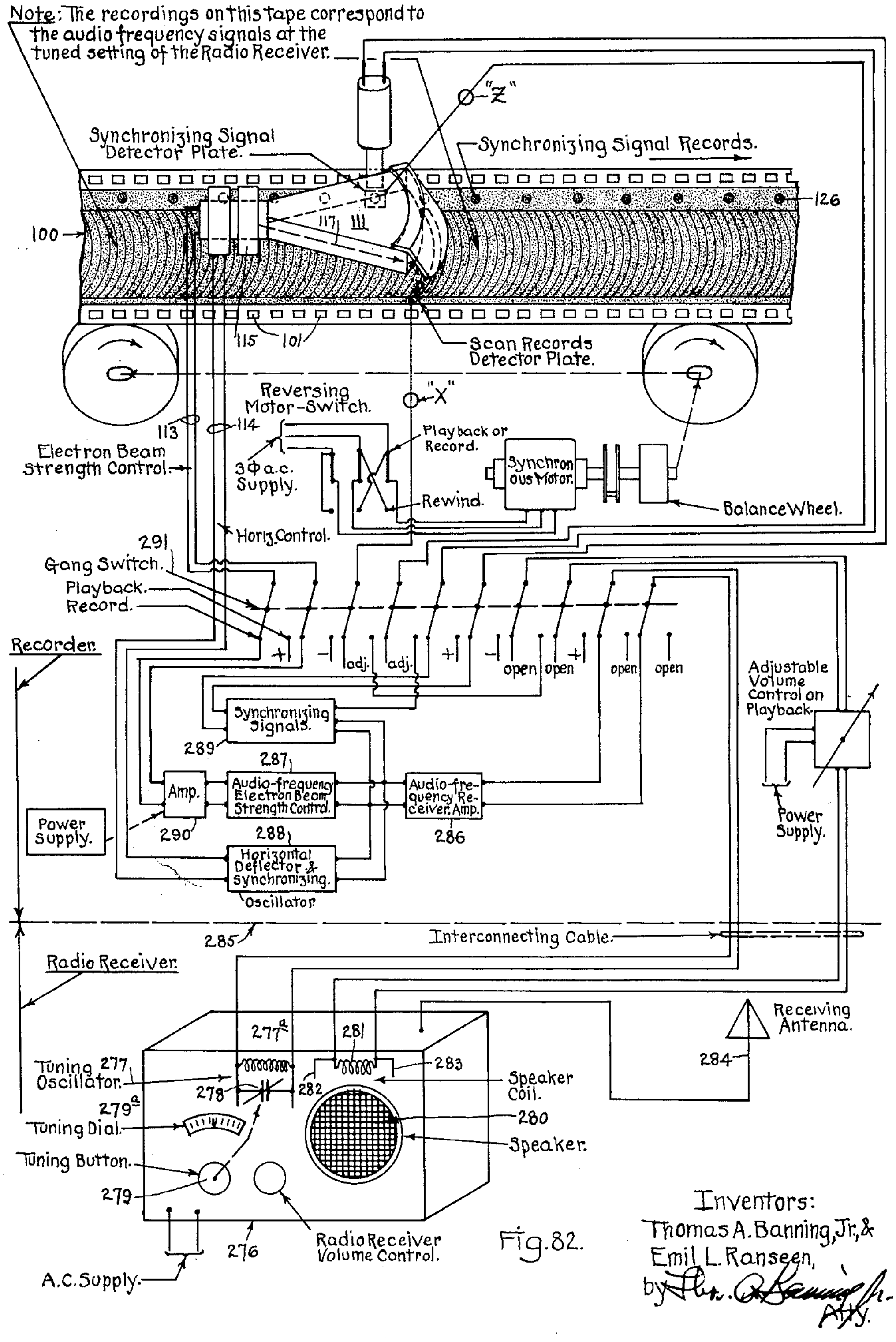
Figure 83:
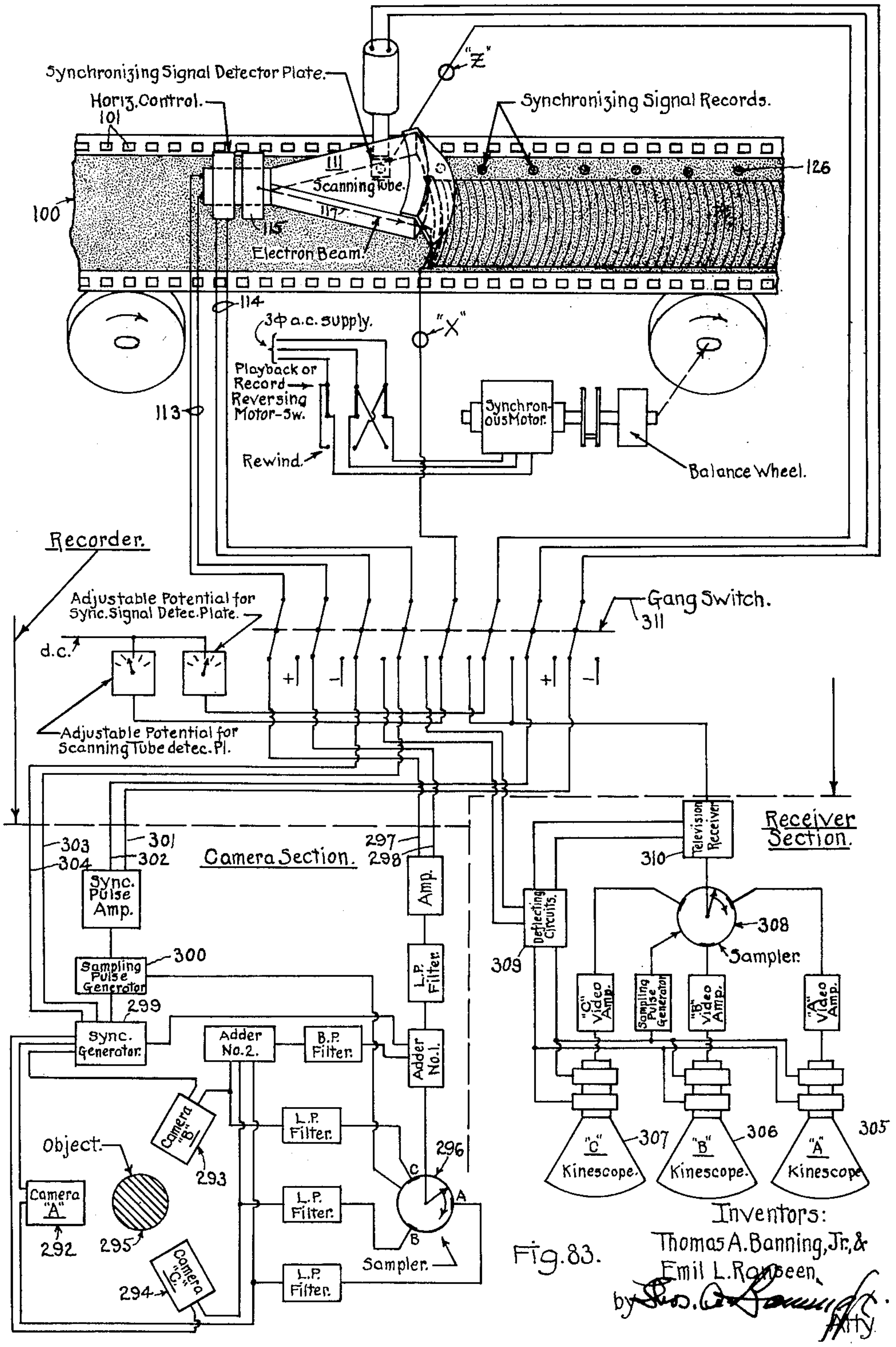
Figure 84:
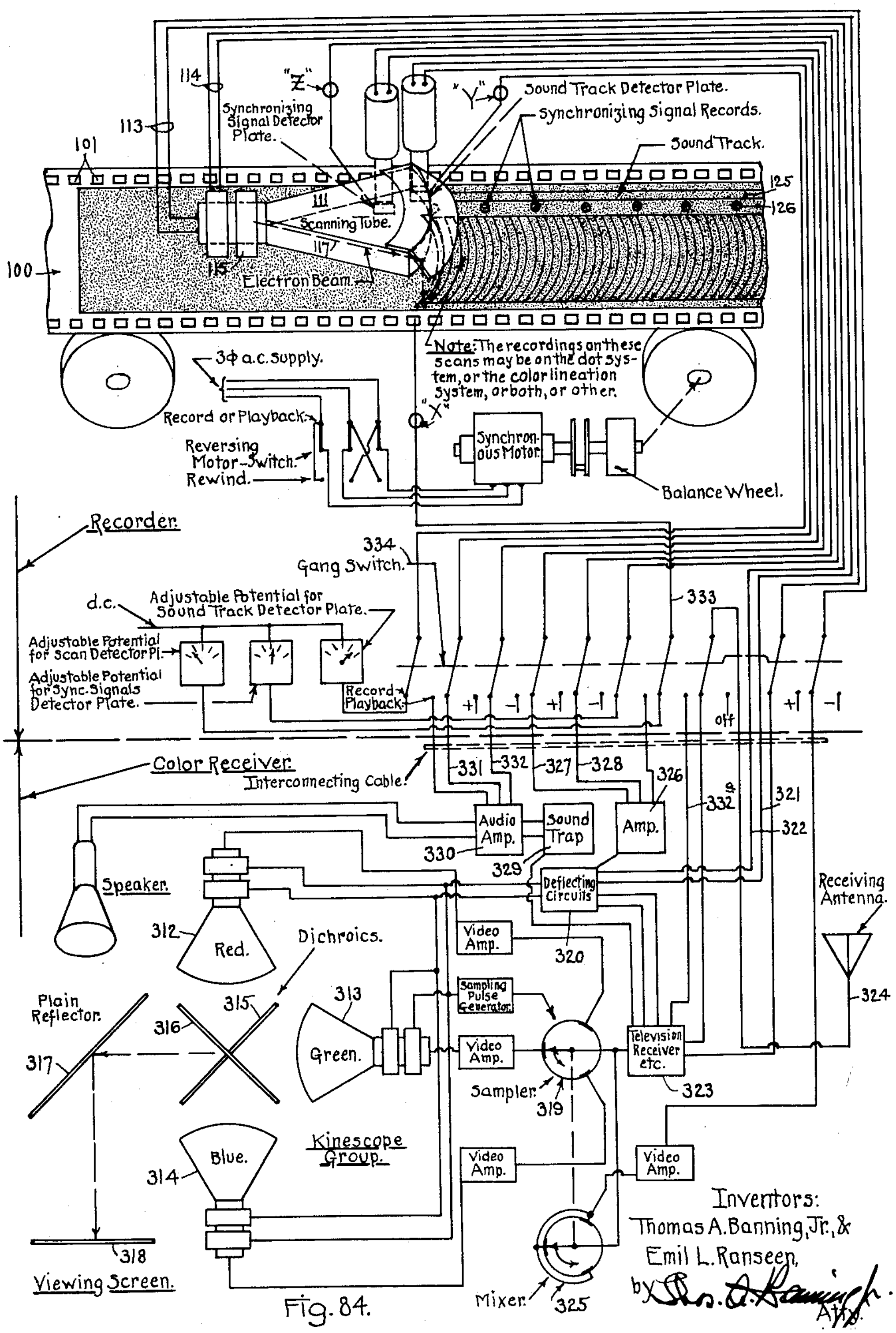

Figure 35 shows still another modification of the arrangement shown in Figure 33; but in the present case we have shown a single dynode directing the beam to a transparent window, with provision for emittion of the ultra-violet beam and directing the same through such window;

Figure 36 shows a fragmentary horizontal section taken on the line 36—36 of Figure 33, looking in the direction of the arrows;

Figure 37 shows a fragmentary horizontal section taken on the line 37—37 of Figure 34, looking in the direction of the arrows;

Figure $37^a$ shows a fragmentary plan view of a modified form of air gap producing conductor arrangement, in which there is provided a supplemental conductor extending along the air gap path and slightly above the two previously discussed conductors, said supplemental conductor being connected to one terminal of the modified arrangement, and the two original conductors being connected together and to the other terminal of such modified arrangement; and the ultra-violet beam acting at both sides of such supplemental conductor simultaneously;

Figure $37^b$ shows a fragmentary vertical section through the modified arrangement of Figure $37^a$, taken on the line $37^b$—$37^b$, looking in the direction of the arrows;

Figure 38 shows plan view of an arrangement for producing the cross scan recording on the tape electrostatically by use of a vertical scanning tube having a flat window which is provided on its inner surface with the phosphor to emit ultra-violet wave lengths, the window being transparent thereto, and in this arrangement provision is made for circuitry to cause change of the focal length of the electron beam during scans so that said beam will come to focus at the flat phosphor surface at all points across each scan, such compensating arrangements being well known in the arts; and in this figure the sealing strip or cover is shown in place over the right-hand portion of the recorded signal variations;

Figure 39 shows an edge view corresponding to Figure 38; and in this figure the pre-electrification plate is shown as being carried close to the location of the scanning tube, but displaced further from the tape surface than at locations prior to reaching the scanning tube, the arrangement serving to ensure retention of the pre-electrification charge on the tape surface to a location close to the area where modulation of the charge is to occur by scanning beam control; and this figure shows the sealing sheet being fed into sealing contact with the record carrying sheet directly beyond the location of the scanning tube;

Figure 40 shows a cross-section taken on the line 40—40 of Figure 39, looking in the direction of the arrows; and this figure shows the flat form of the lower or window end of the scanning tube;

Figure 41 shows a cross-section taken on the line 41—41 of Figure 39, looking in the direction of the arrows; and this figure shows the sealing or cover sheet being fed into place against the record carrying sheet;

Figure 42 shows a plan view of an arrangement of tape control in which use may be made of a scanning tube placed vertically with respect to the tape, and provided with a curved end window of ultra-violet transparent material, the curvature conforming to the focal point of the electron beam during its scanning swings, the inside surface of the transparent window being provided with a deposit of phosphor to emit ultra-violet wave lengths; and in this arrangement provision is made (as shown in further figures) for bringing the tape or sheet into curvature of its surface to conform to the curvature of the end window of the scanning tube as said sheet passes the location of such window, to thus ensure uniform amount of spacing between the tube window and the surface of the sheet, notwithstanding the curvature of the window;

Figure 43 hows an edge view corresponding to Figure 42 arrangement; and this figure shows how several sets of control rollers may be provided to ensure the desired control of the configuration of the sheet as it approaches and recedes from the location of the scanning tube window;

Figure 44 shows a cross-section taken on the line 44—44 of Figure 43, looking in the direction of the arrows;

Figure 45 shows a cross-section taken on the line 45—45 of Figure 43, looking in the direction of the arrows;

Figure 46 shows a section of tape or sheet on which the recordings are to be made electrostatically, the cover sheet not being shown over that portion where the recordings are to be made; but being shown over the right-hand portion of the figure; and in this figure we have shown, by way of illustration only, and by various degrees of shading, the intensities of the charges retained on the sheet after modulation by the scanning beam and the ultra-violet beam, it being understood, however, that the charges will be of reduced intensity at those locations of the illustration where the darker shadings are shown;

Figure 47 shows an edge view of the arrangement shown in Figure 46; this figure showing the provision for delivering the sealing strip into facial engagement with the record carrying strip after said strip moves away from the scanning tube; and in the arrangement shown in Figures 46 and 47 the lower end of the tube is flat but "conductors" are extended through such lower end to locations close to the charged surface of the travelling tape, according to certain of the features already explained;

Figure 48 shows a cross-section taken on the line 48—48 of Figure 47, looking in the direction of the arrows; and this figure shows how the "conductors" already referred to may be provided with electron beam contacting ends inside of the scanning tube, which ends are brought into a circular arc or other configuration needed to ensure that the focused end of the electron beam shall contact with each such conductor end in proper succession of engagement;

Figure 49 shows a cross-section taken on the line 49—49 of Figure 47, looking in the direction of the arrows; and this figure shows how the sealing or cover strip is fed into facial engagement with the record carrying tape;

Figure 50 shows a bottom end view of the scanning tube of the arrangement of Figures 46, 47, 48 and 49; and it shows the row of conductor ends projecting out from the tube end surface; and this figure is taken on the line 50—50 of Figure 48, looking upwardly in the direction of the arrows;

Figure 51 shows an edge view of a simple form of sensing unit for sensing the electrostatically recorded signals carried by the sealed tape; and this figure shows the detector plates in contact with or close to the under surface of the record carrying tape at the location of the lower end of the scanning tube of a vertical sensing tube arrangement;

Figure 52 shows a cross-section taken on the line 52—52 of Figure 51, looking in the direction of the arrows; and this figure shows the detector plates above referred to, in their several locations across the width of the tape;

Figure 53 shows a section of electrostatically recorded tape with the sealing sheet or cover in place with the exception of a portion of the right-hand end of the figure; and this figure shows the locations at which the sensing scan tube, and the sensing elements for the sound track and for the synchronizing signals may be located;

Figure 54 shows a section of electrostatically recording tape, which tape will have its electrostatically modulated signals or signal variations sealed permanently in place by use of a sealing spray arrangement, shown in later figures;

Figure 55 shows a cross-section taken on the line 55—55 of Figure 53, looking in the direction of the arrows; and this figure shows the record carrying sheet and the sealing sheet sealed thereto, with the electrostatic charges sealed permanently between the sheets;

Figure 56 shows a cross-section taken on the line 56—56 of Figure 53, looking in the direction of the arrows, and it shows the lower end of the sensing scanning tube (with the "conductors" extending through the same to locations close to the tape surface), and it also shows the detector plate in position directly beneath the tape at the location of such sensing scanning tube;

Figure 57 shows a cross-section taken on the line 57—57 of Figure 47, looking in the direction of the arrows, and it shows the sealing tape just before coming into sealing contact with the electrostatically recorded sheet;

Figure 58 shows a cross-section taken on the line 58—58 of Figure 47, looking in the direction of the arrows, and it shows the lower portion of the scanning tube carrying the "conductor" wires previously referred to;

Figure 59 shows a cross-section taken on the line 59—59 of Figure 47, and it shows the pre-electrification plate above the sheet on which the electrostatic modulations will be produced, and also the "balancing" plate below the sheet at the location of such pre-electrification plate;

Figure 60 shows a cross-section taken on the line 60—60 of Figure 47, and it shows the sheet which will receive the pre-electrification charge prior to the time such sheet comes to the location of the pre-electrifying plate;

Figure 61 shows a section of tape on which the recording will be performed electrostatically, and which tape may be treated with a spray of soft wax on which the electrification modulation operation may be produced, as shown in subsequent figures; or which recording may be sealed into place by they use of a separate sealing sheet such as already referred to;

Figure 62 shows an edge view corresponding to Figure 61; and in this figure there is shown provision for spraying the sheet of dielectric with soft warm wax of proper composition prior to the time the charges are placed on the sheet and at locations preceding the locations of such charge operations; and this figure also shows the provision of means to retain the so-sprayed wax in soft condition until the charge placing and modulation producing operations have been completed; and this figure also shows the provision of means to cool such wax surface directly after such charge modulating operation has been completed to thus seal the electrets directly into the body of the wax carried by the tape surface, a separate sealing sheet not being needed then to retain the modulated charges permanently; but nevertheless we have also shown, in this figure, means to deliver and seal to such a treated sheet a sealing or cover sheet according to the operations which have been previously explained herein;

Figure 63 is a cross-section taken on the line 63—63 of Figure 62, looking in the direction of the arrows; and this figure shows the lower end of the scanning recording tube, and the balancing plate, and the wax heating or warming means;

Figure 64 shows a cross-section taken on the line 64—64 of Figure 62, looking in the direction of the arrows; and this figure shows the sealing tape coming to the record carrying plate to be sealed thereto;

Figure 65 shows a section of tape whereon a recording is made magnetically, with use of the cross scan arrangement, but with the use of the "conductor" arrangement for transferring the controls from the electron beam inside of the envelope to suitable magnetizing elements outside of the envelope, and without use of the ionizing wave length beam as in various of the previously described figures; and this figure shows the tape carrying the magnetizable material with provision for first subjecting such magnetizable material to a pre-magnetizing effect to ensure provision of a uniform amount of magnetic effect on the tape surface, together with the scanning tube arrangement and the magnetizing devices for thereafter producing on the so prepared tape surface the desired modulations of magnetization;

Figure 66 shows an edge view corresponding to Figure 65; and this figure shows in outline the presence of the magnetizing coils (of very small size) outside of the tube envelope, each coil being connected to one of the conductors which extend through the envelope and whose inner ends are subject to impingement by the electron beam during its scanning swings;

Figure 67 shows a cross-section taken on the line 67—67 of Figure 66, looking in the direction of the arrows; and this figure shows the lower ends of the conductors which extend through the lower portion of the scanning tube as being individually in connection with the minute magnetizing coils which are located close to the tape surface;

Figure 68 shows a cross-section taken on the line 68—68 of Figure 66, looking in the direction of the arrows; and this figure shows the pre-magnetizing unit for placing a magnetization on the tape of uniform intensity over the entire tape surface prior to the subjecting of any elemental area of the tape surface to the magnetization modulating effect of the scanning tube coil in alignment with such elemental area;

Figure 69 shows a bottom end view of the scanning tube, together with the minute magnetizing coils which are connected to the ends of the "conductors" extending through the tube envelope, the free ends of all such minute coils being connected to a common return line as shown in this figure;

Figure 70 shows on greatly enlarged scale one end portion of the lower portion of the scanning tube, together with the magnetizing coil unit portion adjacent to such tube end, such magnetizing coil unit comprising a block of synthetic material having the coils embedded and moulded in such block, with their ends properly connected to the common return line, and to the individual "conductors" which extend through the tube end;

Figure 71 shows a cross-section taken on the line 71—71 of Figure 70, looking in the direction of the arrows;

Figure 72 shows a section of the magnetizable material tape carrying the magnetic cross scan signal variations, and also carrying a magnetically produced sound track, and the magnetically produced synchronizing signals along one edge portion of the tape;

Figure 73 shows an edge view corresponding to Figure 7; and this figure shows the minute sensing conductors which are located in regular spacing across the width of the scanned and recorded area, and which are electromagnetically influenced by the travelling tape to produce the desired sensing effects, which effects are then amplified and translated as desired;

Figure 74 shows a cross-section taken on the line 74—74 of Figure 73, looking in the direction of the arrows; and this figure shows the sensing conductors previously referred to and which are carried by a sensing block at the lower end of the scanning tube;

Figure 75 shows a bottom face view of the scanning tube of Figures 73 and 74; and this figure shows the minute sensing conductors located in alignment across the width of the cross-scan recorded portion of the tape; and one end of each such sensing conductor is connected to one of the "conductor" wires extending through the tube envelope and the free ends of these sensing conductors are all connected to a common line which may be used for delivering the sensed effects of the unit to suitable amplifying and translating units as desired;

Figure 76 shows on greatly enlarged scale one end portion of the lower portion of the scanning tube; and it shows the block of synthetic material in which the minute sensing conductors may be embedded or moulded in suitable manner;

Figure 77 shows a cross-section taken on the line 77—77 of Figure 76, looking in the direction of the arrows;

Figure 78 shows, schematically, a simple form of wiring connections for delivering the sensed effects from the minute sensing conductors to a common amplifying and interpreting unit or units;

Figure 79 shows, more or less schematically, a simple arrangement embodying the cross-scanning recording means herein disclosed, for enabling the recording of a televised program, when such recording unit is used in conjunction with a more or less conventional form of television receiver, such television receiver being provided with the usual antenna connection, the usual kinescope and speaker arrangement, the usual controls for picture and for brightness, the usual horizontal and vertical deflector and synchronizing means arrangements, and other elements; and in this figure we have shown suitable switching arrangements whereby the recorder may be caused to perform a recording operation on its tape, according to the cross-scanning principles herein disclosed, together with production of the sound track recording, and production of the necessary synchronizing signal recordings, or whereby the so-recorded record may be played-back to the television recorder by a simple switch reversing operation, accompanied by the necessary tape rewind to a beginning point; and in this figure the sound track is produced linearly along the edge portion of the tape;

Figure 80 shows, more or less schematically, a modification of the showing in Figure 79, such modification consisting principally in the production of the sound recordings as cross-scans conveniently superimposed on the cross-scans of the picture recording; for which purpose the arrangement shown in Figure 80 includes two cross-scanning tubes located at lineal separation along the tape travel, in which case the sound recordings, while made simultaneously with the picture recordings, will be displaced lengthwise of the tape by the amount of such lineal separation; and in this figure we have also shown means to effect accurate adjustment of at least one of the scanning tubes lengthwise of the tape, so as to ensure correct registry of both tubes' scans with the cross-scans produced or sensed, as the case may be;

Figure 81 shows, more or less schematically, a simple arrangement embodying the cross-scanning recording means herein disclosed for enabling the recording of all radio frequency signals received from the antenna of a radio receiver of conventional type, without need of preselecting any given station which may be within receiving range, so that thereby a full recording is placed on the tape of all the radio frequency signals thus striking the antenna, coming in at various radio frequencies of carrier waves; and with provision for also, by a simple switching operation, and with proper previous rewind of the so-recorded signals on the recorder, playing back all such signals into the antenna connection of the radio receiver, so that the operator may then select from such so-recorded radio frequency signals that carrier wave program which he desires to have played by such radio receiver; and in the arrangement shown in this figure the recorder itself is provided with suitable deflecting control means and saw-tooth generating means, and synchronizing signal means, to effect the necessary controls of the operations of the recorder elements;

Figure 82 shows, more or less schematically, a simple arrangement embodying the cross-scanning recording means herein disclosed for enabling the recording of that selected program which is at the time tuned for reception in a conventional radio receiver; and with suitable switching means of simple form to enable play-back of such so-recorded program, having previously produced necessary rewind of the tape of the recorder; and in this showing we have also included suitable deflecting control means and saw-tooth generating means, and synchronizing signal means, as a portion of the recorder itself, to enable and effect the necessary controls of the operations of the recorder elements;

Figure 83 shows, more or less schematically, a simple arrangement embodying the cross-scanning recording means herein disclosed for enabling the simultaneous production of recordings on the tape of a plurality of picture recordings, as for example, several industrial operations which are related to each other, by use of corresponding camera arrangements to emit television signals for such several operations, to mix such signals according to a selected means such as by mixing the highs of high frequency waves coming at equal frequency but phase displacements from each other according to a well known scheme in use at the present time, and placing such so-mixed highs on the tape under recorded conditions including the cross-scan means herein disclosed; together with simple switching means to enable the playing-back of such so mixed signals and proper sampling of the signals and forwarding of them to corresponding television kinescopes for simultaneous production of the several so-televised and recorded operations; the arrangements including necessary deflecting control means, and saw-tooth generating means, and synchronizing control means, to effect the necessary controls of the operations of the recorder and kinescope elements as required; and Figure 84 shows, more or less schematically, a simple arrangement embodying the cross-scanning recording means herein disclosed for enabling the recording of the signals received by a color television receiver from a selected channel, placing all such signals on the tape in proper relationship, to make a full recording of all such signals in proper relationship; together with simple switching means to enable playing-back of such so-recorded color television program onto a suitable color or monochrome television receiver.

Broadly speaking our present invention comprises a method of scanning or producing signal recordings over an area of the travelling tape, and for sensing and interpreting such recordings when desired, generally thus distinguished from conventional methods heretofore known and practised in which the recording is produced as a line or series of lines extending lengthwise of the travelling tape; and our invention also includes means to carry out our improved method or recording and to sense and interpret the recordings so produced. It is shown that although, strictly speaking a linear record must comprise an "area" of recording, since such linear record has a discrete dimension across the tape, still this width dimension is very small in general comparison to widths which may be provided with recordings according to our present method and means; and even when several such linear recordings are produced on the tape, as by "trick" recording operations, the actual area of tape surface covered by such linear recordings is only a small fraction of the area actually covered by recordings produced by our present invention. Probably the actual area covered by such lineal recordings is not over one percent of the actual area covered by our present cross scanning method and means. Generally speaking, therefore, we may properly define our operations as being an "area" recording as distinguished from a "linear" recording, although of course each scan produced by our method comprises a linear section of length determined by the width of the recorded area.

At this point it is noted that when the recording is made by either method—"linear" or "area"—there must be provided a width of tape at each side or edge thereof which is not economically used for recording purposes, since it is necessary to give proper support to the tape on the guiding elements (wheels or pulleys, sensing head, posts, etc.) and is also necessary to provide a tape of width which can be properly wound on and carried by the supplying and winding reels. Even under the condition that we have shown tapes provided with edge perforated strips for engagement with suitable sprockets to ensure proper control of tape movement, thus adding somewhat to the tape width when such perforated portions are not used, still it will be found that the "efficiency of use" of the tape per unit of length is vastly greater in the case of an "area" recording than it possibly can be in the case of a "linear" recording, even when using multiple lines of record, as previously suggested.

Since the production of our area of record requires the production of cross scans it is evident that proper control of placement of these scans on the tape is necessary; and even more important, it is desirable that when playing-back by sensing and translating such record scans there shall be registry between the sensing unit and each scan during the complete scan, and that overlaps of such sensing operation, covering parts of two adjacent scans, shall not occur. Actually, in many cases such overlaps would not be noticeable in the produced picture or other translation, due to the large number of scans per frame, and the frequency of scans; but nevertheless it is desirable to avoid such overlaps by good scan control during the sensing operation. On the contrary, when playing-back a linear recording, such as previously defined herein, it is not generally necessary to provide for any strict synchronizing operation, since the sensing occurs always along the line of record (or the plurality of such lines, in the case of such "trick" recordings as have been referred to above). This fact further greatly differentiates our method and means from those conventionally known and used. In case of very close controls of the tape rate both during recording and later during sensing, such synchronizing means may sometimes be dispensed with, but in general such synchronization means should be combined with the laying down of the records so as to be able to accurately control the subsequent sensing operations to ensure good registry with the sensing element or effect with the cross scan then being sensed.

When the cross scans are to be made at the very high frequencies suggested previously herein, and other even higher frequencies, both for recording and for sensing, it is quite evident that mechanically movable elements cannot be used for such scanning operations. Accordingly we have disclosed electronic scanning means similar to such scanning means conventionally used in many operations, notably in television work. The electronic scanning means herein illustrated and which will be described, takes the form of electron beam units, in which provision is made for effecting the scans by suitable deflection controls; but we also contemplate the use of other and equivalent electronic scanning means when applicable to the present problems, and within the scope of the claims to follow. When such electronic scanning means includes a closed envelope, as is needful under conventional electron tube operations, it is necessary to effect conversion of the electron beam effects within the tube to suitable recording and sensing effects outside of the tube, as we have pointed out. As suggested, however, envelopes are currently known which are transparent to the electron beam, and we contemplate the use thereof in the practice of our methods and as a portion of our means, within the scope of the claims to follow.

Various embodiments of features of our invention are shown in the drawings, and numerous details of parts are also illustrated. For purposes of clarity in description, and to facilitate understanding of the relations of these disclosures to each other we shall first briefly enumerate the various figures and drawing sheets as follows:

*Sheet #1, Figs. 1, 2 and 3.*—Recording; electrostatic; flat tube; ultra-violet.

*Sheet #2, Figs. 4, 5 and 6.*—Sensing; electrostatic; flat tube; ultra-violet.

*Sheet #3, Figs. 7, 8 and 9.*—Recording; electrostatic operation; flat tube; both electrostatic and magnetic recordings.

*Sheet #4, Figs. 10, 11, 12 and 12A.*—Recording; magnetic; flat tube; ultra-violet.

*Sheet #5, Figs. 13, 14, 15 and 16.*—Sensing; magnetic; flat tube; ultra-violet.

*Sheet #6, Figs. 17, 18 and 19.*—Sound recording; cross-scan; flat tube.

*Sheet #7, Figs. 20 and 21.*—Color signal cross-scan recordings, both "Dot" type and "Linear Scan" type.

*Sheet #7, Fig. 22.*—Details of ultra-violet-magnetic recording circuit.

*Sheet #7, Figs. 23 and 24.*—Details of ultra-violet-magnetic sensing circuits.

*Sheet #7, Figs. 25 and 26.*—Details of tube end, ultra-violet; flat tube-reflector type and vertical tube type.

*Sheet #8, Figs. 27 and 30.*—Details of magnetic tape, and scan thereof, granular or powdered magnetizable material type.

*Sheet #8, Figs. 28 and 31.*—Details of magnetic tape, and scan thereof, magnetizable foil, flat type.

*Sheet #8, Figs. 29 and 32.*—Details of magnetic tape, and scan thereof, magnetizable foil, ribbed type.

*Sheet #8, Figs. 33, 35 and 36.*—Details of tube end, flat type, ultra-violet with amplification by dynodes.

*Sheet #8, Figs. 34 and 37.*—Details of tube end, flat type, "Conductor" type with amplification by dynodes.

*Sheet #8, Figs. 37ᵃ and 37ᵇ.*—Details of air-gap for ultra-violet operation, double pole type.

*Sheet #9, Figs. 38, 39, 40 and 41.*—Recording; electrostatic; vertical tube, flat end; ultra-violet.

*Sheet #10, Figs. 42, 43, 44 and 45.*—Sensing; electrostatic; vertical tube, curved end; ultra-violet.

*Sheet #11, Figs. 46, 47, 48, 49 and 50.*—Recording; electrostatic; vertical tube; "conductor" type.

*Sheet #12, Figs. 51 and 52.*—Sensing; electrostatic; vertical tube; "conductor" type.

*Sheet #12, Figs. 53, 54, 55, 56, 57, 58, 59 and 60.*—Details of detector plates, etc.; electrostatic types.

*Sheet #13, Figs. 61, 62, 63 and 64.*—Recording; electrostatic; vertical tube; "soft wax" type.

*Sheet #14, Figs. 65, 66, 67, 68, 69, 70 and 71.*—Recording; magnetic; vertical tube; "conductors and coils" type.

*Sheet #15, Figs. 72, 73, 74, 75, 76, 77 and 78.*—Sensing; magnetic; vertical tube; "conductors and sensing wires" type.

*Sheet #16, Fig. 79.*—Schematic wiring diagram; television receiver and recorder combination and switching; separate lineal sound track.

*Sheet #17, Fig. 80.*—Schematic wiring diagram; television receiver and recorder combination and switching; cross-scan sound track.

*Sheet #18, Fig. 81.*—Schematic wiring diagram; radio receiver for audio translation with recorder for recording all radio frequency carrier waves received by antenna, and playing-back to radio receiver for tuning to selected carrier wave-audio frequency translation.

*Sheet #19, Fig. 82.*—Schematic wiring diagram; radio receiver for audio translation with recorder for recording by audio frequency that program which is tuned by the radio receiver.

*Sheet #20, Fig. 83.*—Schematic wiring diagram; production of plurality of pictures and signals therefor, and recording same on common tape; together with plurality of receiver kinescopes and playing-back said recorded pictures to said kinescopes to produce simultaneously the several recorded pictures.

*Sheet #21, Fig. 84.*—Schematic wiring diagram; color television receiver and recorder combination and switching for playing-back.

Generally speaking we provide a travelling tape of width to accommodate the lateral dimension of the cross-scans, plus necessary edge portions provided with sprocket tooth openings, and, preferably but not necessarily, also linear recordings of the synchronizing signals, and of the sound track, in case a sound track is required; although, as already stated, both the synchronizing signals and the sound recordings may sometimes be superimposed on the cross-scanning recording. We provide means to drive such tape at closely regulated uniform speed, although, of course, if desired provision may be made for change of that speed under the condition that closely regulated speed shall be produced at such changed speed; and also, in case of such change of tape speed for a previously recorded program provision must also be made for change of the scanning rate to conform to such change of tape speed. This will be readily understood as the description proceeds.

We provide scanning means of form and operational characteristics such that during recording the incoming signals shall be transferred, as to intensity, to the tape surface in the form of regularly recurring cross-scans of the desired tape width. We have herein disclosed means to record the intensities of the signals received during these cross-scans, and have herein disclosed, generally, two recording systems for ensuring this result. These may be designated as the electrostatic system, and the magnetic system, and both will be disclosed in full detail. Both these systems have many features in common, but necessarily differ in many details, due to the different inherent characteristics of the electrostatic effects and the magnetic effects; but generally speaking many of the features herein disclosed are of applicability equally to recordings made by both systems. We also provide means to sense the recorded signals, whether of the electrostatic or the magnetic type, for play-back and other uses of such signals by a simple switching control readily operable by the untrained user.

The scanning unit includes an electron beam (or other similar electronic element) producing gun, together with deflecting means for lateral deflections, preferably under control of a saw-tooth generator, and according to conventional devices of this general type. Fundamentally only the lateral deflecting control is needed since the scans are produced (on the tape) as simple linear scans across the desired tape width; but, as already suggested, it may sometimes be desirable to provide for slight "vertical" deflections in order to enable use of a discreet vertical dimension of the phosphor surface inside of the envelope, thus distributing the depletion of the phosphor, and ensuring longer life of uninterrupted operation. This is a detail which will be discussed hereinafter. In case of such "vertical" deflecting means a second saw-tooth generator or control will of course be required as is well understood in the electronic arts.

We have herein disclosed constructions in which the scanning unit is placed with its axis normal to the tape surface (being thus generally vertical), and other constructions in which the scanning unit is placed with its axis parallel to and relatively close to the tape surface so that the electron beam in such latter case swings substantially in a plane parallel to the tape surface. Generally speaking the latter arrangement presents numerous points of advantage over the vertical axis arrangement, but in some cases the vertical axis arrangement will be preferred due to special conditions of installation or otherwise. We have disclosed arrangements for producing the recording operations by either the electrostatic or the magnetic system, and with either the vertical tube arrangement or the "flat" (parallel) tube arrangement, and for both recording and sensing operations; and we have also disclosed one arrangement for producing the recording as both an electrostatic record and also as a magnetic record, on one and the same tape and by a combined operation.

It is here noted that the use of electronic scanning crosswise of the tape is very desirable due to the ability to execute and control such type of cross scans at extremely high rates of scanning, thus making it possible to conform the cross-scans of the tape recording to the cross-scans of the television system in use, and thus also making it possible to readily obtain proper synchronization of the cross-scans of the recorder and the television system by a common synchronizing means, as is shown in various of the figures of the present case. In this connection we have already referred to the practical difficulties inherent in any form of mechanical cross-scanning device to operate at the high rates needed and imposed by this problem; but it is evident that when such rates of cross-scan do not become too great such mechanical cross-scanning means may be used, and we contemplate the same as a portion of our present invention, except when limitations included in the claims forbid such interpretations.

In this connection we point out that we have herein disclosed the recording and sensing of audio signals (sound signals) by cross-scanning arrangements, and such showings have been made by use of electronic scanning devices the same as are shown for the scanning of the other signals. This has been done as a matter of convenience, and to show means to effect such sound recordings under conditions which will make it possible to obtain extremely faithful recordings and sensings of such sound signals due to the great length of scan track thus made available per unit of time. We have already called attention to this matter. However, when it is found satisfactory to make such sound recordings, by use of slower scans, as for example, scans of rate of the order of a few hundred per minute, mechanical means may be found satisfactory for the operation of the cross-scanning requirements. Generally, such an arrangement would be one in which the unit was intended for sound recording only, and it would present various advantages of construction and operation as compared to conventional linear scanning arrangements.

Referring to Figures 1, 2 and 3, the tape therein shown by the numeral 100 is provided with the edge perforations 101 which are engaged by the teeth (not shown) of suitable sprocket wheels in the sets 102, 103 and 104 for drive to the right (direction of the arrows in the figures). If desired the wheels 104 may be plain untoothed wheels, as they are provided primarily for support of the tape at a location of sealing in the modulated charges. The tape 100 is full width, but a sealing tape 105 coming from above may be of less width, but sufficient to seal in the electrostatic charges after the recording operation has been performed. The width of this sealing tape is shown between the lines 106 and 107 in Figure 2. This sealing tape comes down from a suitable reel (not shown) above the tape 100, and is fed over the presser roller 108 which cooperates with the rollers 104 already referred to. Thus it happens that the completed record tape is shown of double thickness in Figure 3 to the right of the roller 108. The desired sealing operation may be effected by use of cement or other medium, preferably of a type which does not require the use of heat for effecting its cementing action. This is true since the electrostatic charges have been modulated or deposited on the surface of the tape 100 (upper surface) before the sealing operation occurs, and it is desired to not materially accelerate any loss of electrostatic effect prior to the sealing operation.

It will be understood that the tape 100 and the sealing tape 105 should be formed of dielectric material, such as a suitable plastic, and should be very thin, compatible with proper strength and durability, probably of the order of 1 one-thousandth inch in thickness or less. Thus the total thickness of the sealed combination will be of the order of 2 one-thousandths inch or less. When reeling such thickness of tape on a reel having a hub diameter of 4 inches and a capacity to wind to a diameter of 16 inches it is possible to secure substantially 3000 convolutions of the tape on the reel, having a total length of substantially 94,230 inches. When feeding this tape at a linear speed of substantially 31.50 inches per second such a reel would supply recording or sensing for about 3000 or more seconds, substantially 45 to 50 minutes of operation without change.

In Figures 2 and 3 we have shown the "pre-electrification" plate 109 supported directly above the tape 100 and preferably slightly spaced from the tape surface. This plate 109 is supplied with a D.C. potential of high enough value to ensure production of a preliminary charge on the entire width of the tape 100 on which width recording is to be effected. If desired a balancing plate 110 may be likewise located directly beneath the tape opposite to said pre-electrification plate, so as to assist the pre-electrifying operation. Such balancing plate would in such case be supplied with potential of polarity opposite to that of the plate 109. Examination of Figures 2 and 3 shows that these plates are of form such as to produce their effects over tape surface areas which come close to the tube modulating position, presently to be explained, so as to ensure good potential control of the tape surface up to the location of such modulation of its charges.

The scanning tube shown in Figures 1, 2 and 3 is designated generally by the numeral 111. It is of generally segmental form, seen from above, including the end neck portion 112 which receives the electron gun, and the control yokes or coils. The electron gun is designated 113, and two deflection coils are shown, 114, and 115, although, when no "vertical" deflection is to be effected the deflection coil 115 will be dispensed with, the coil 114 being the horizontal deflection coil, and the coil 115 being the vertical deflection coil. These deflection elements are, of course, shown merely in schematic outline in the various figures, including Figures 1, 2 and 3.

The tube or envelope is provided with the broadened or triangular portion 116 to accommodate the beam's swings, such portion providing for a sufficient amount of beam swing to scan the desired width of the tape. The electron beam 117 thus pivots on the point 118 during scanning in conventional manner, and under deflection control of the coil 114. The end 119 of the envelope is formed of circular arcuate form so that the beam may be of fixed focal length in the form of these figures. Preferably, also this end is formed of material transparent to ionizing wave lengths, such as ultra-violet, and in the form of Figures 1, 2 and 3, wherein the effects are transmitted from the interior of the envelope to its exterior, by the "ionizing effect" it is necessary that such transparency of said window end be provided by use of proper material transparent to ionizing wave lengths. Other "conducting" arrangements will be disclosed hereinafter.

Provision is made for converting the electron beam to the ionizing wave length emission by use of suitable phosphor coated on the end portion or window of the tube 119. Phosphors which will emit wave-lengths in the ionizing series or range under electron beam excitation are well known; but as examples of such phosphors we mention the following by way of illustration only, namely, magnesium tungstate, or Blue Silicate ($CaMg(SiO_3)_2.Ti$) or neodymium oxide ($Nd_2O_3$). Other phosphors which will produce the desired emission are also well known in the arts. Materials which are transparent to ionizing wave lengths, such as the ultra-violet are many, but we may suggest quartz, fluorite, and "hard glass" as suitable materials for the envelope window. It is also desirable that lens effects be produced in such window by suitable formation thereof, so that the transmitted ultra-violet beam will be brought to focus outside of the envelope, and for this reason we have, in various of the figures, shown the window portion 119 as of rounded or lens formation, it being understood that the exact form of such window's section will depend on the light system, and the elements of distance, etc. found in the embodiment. Reference is made to Figures 25, 26, 33 and 35, as showing some forms of suggested lens arrangements, but these are schematic showings, only. It is desirable that the window material have not only a high efficiency of transmission of the ultra-violet wave-lengths, but also a rather high index of refraction so that proper lens effects may be produced in convenient window designs. The quartz and fluorite comply with these requirements; and additionally, quartz is transparent to ultra-violet radiation down to approximately 185 mu with less than 6% absorption in a plate 1 cm. thick, and fluorite is similarly transparent for radiation down to approximately 120 mu with a small absorption. Other materials will suggest themselves to the student of this application as suitable for production of the desired window, and also for production of the desired emission of ultra-violet by the impingement of the electron beam on the phosphor coating.

Since the electron beam is brought to focus at the surface or body of the phosphor coating on the inside of the window, it is possible to produce a sharply defined effect; and since there is thus produced a small, sharply defined spot of ultra-violet emission directly adjacent to the inside of the window, and the lens thereof, it is possible to pass this radiation as a sharp beam through to the outside of the envelope. The lens design will also add to the sharpness of the ultra-violet beam delivered to the outside. This beam will travel along the length of the window, being the arcuate width of the envelope end. It is needful to bring such travelling beam down into sharp focal contact with the surface of the electrified tape to obtain the desired modulating effect by dispersal of some of the electrification which was previously placed on the tape surface. When the ultra-violet beam is directed through the window as in the form shown in Figures 1, 2 and 3, it is evident that change of beam's direction must be effected outside of the envelope. In Figures 1, 2 and 3, and other figures we have secured this result by a reflector.

The ultra-violet reflector is shown at 120 in Figures 1, 2 and 3. It is in the form of an arcuate hood having a horizontal flange set onto the top surface of the envelope, and also having a downwardly extending reflecting flange 121 which is curved around in a horizontal plane to conform to the curvature of the window, and which flange is of form to reflect the incident beam down directly towards the tape surface as indicated at 122 in Figure 3. By proper reflector design, combined with proper consideration of the form of the ultra-violet beam coming through the window, it is possible to ensure that the reflected beam will come nicely to focus at the tape surface. By proper selection of the reflecting surface material a high efficiency of reflection of the ultra-violet wave-lengths may be secured. Thus, coatings of silver, copper, gold, steel, nickel, platinum, and others are high reflectors of the wave-lengths in question. We call attention especially the alloy known as Mach's Magnalium, consisting of 69 parts aluminium and 31 parts magnesium. This material has a very high reflecting ability for ultra-violet radiation, reflecting substantially 80% of the visible radiation, and substantially 67% of the radiation of 250 mu. This material will thus reflect a high percentage of the wave-lengths here in use. Other materials will suggest themselves to the student of this specification as being well adapted to the present problem.

The impingement of the ultra-violet beam against the electrified tape surface will release electrons therefrom in proportion to the time of exposure, and the intensity of the beam. Since the scanning is effected at substantially uniform rate across the scanned width of the tape it follows that the release of electrons from the tape surface will, at each elemental area along the line of scan, be proportional to the intensity of the ultra-violet beam, and therefore to the intensity of the electron beam. The intensity of that latter beam is modulated to accord with the intensity of the received television or other signals which are to be recorded. Thus it follows that an electrostatic recording is produced which is, at each elemental area of scan, of intensity proportional to the signal to be recorded. The remainder of the electrostatic deposit or electrification thus left on the tape surface will gradually disperse unless proper means be provided to retain the same against such dispersal. The sealing tape or strip 105 performs this function.

When said sealing tape has been promptly sealed to the modulated electrified surface of the tape 100, the contained "electrets" between the two tapes will remain there indefinitely since they are retained against dispersion by the tapes of dielectric material, and since said electrets cannot travel across the surfaces on which they have been deposited, such surfaces being non-conducting. However, such retained charges proportional to the retained and sealed electrets will exert electrostatic effects through the dielectric tapes, producing at all points outside of the sealed double thickness tape effects which are of sign opposite and of amount proportional to the strengths of the retained charges. We avail ourselves of these phenomena to produce desired sensing effects when it is desired to "play-back" the so-recorded signal intensities.

In Figures 1, 2 and 3 we have also shown the units 123 and 124 located above the pre-electrified area of the tape 100, in advance of the sealing position of the sealing tape 105. These units are for producing on the tape records of the audio signals and the synchronizing signals, respectively by principles which we have already described. That is, each of these units is so constructed that it directs an electron beam directly down towards the tape surface, the lower end of the envelope of such unit being closed but provided with a window transparent to ultra-violet, and with the necessary deposit of phospor on the inside surface of such window to produce the desired ultra-violet beam of intensity proportional to the strength of the electron beam. Thus a de-electrifying effect is produced on the surface of the pre-electrified tape at the desired location to produce a partial discharge of electrification corresponding to the signal so delivered to such unit 123 or 124 as the case may be. The sound track recording unit 123 will be supplied with substantially continuous but modulated strength signals corresponding to the variations in intensity of the sound signals to be recorded, so that such track will comprise a linear track of intensity varying along its length in well understood manner. The unit 124 will receive intermittent signals of intensity suitable to effect small recordings on the surface of the tape at equal intervals along the tape length as will be readily understood. The sound track in these figures is numbered 125 and the synchronizing signals are numbered 126. These signals are so located that they, too, will be enclosed and protected against dispersion by the sealing of the sealing tape 105 as already explained.

Reference is now made to Figures 4, 5 and 6 which illustrate a simple means of sensing and translating the signals which have been electrostatically recorded according to the operations already described. The principal difference between the mechanisms or units shown in Figures 4, 5 and 6 as compared to those shown in Figures 1, 2 and 3, lies in the provision, in Figures 4, 5 and 6 of one or more "detector" plates beneath the paths which are travelled by the several signal record carrying portions of the tape. Thus, in Figures 4, 5 and 6 we have shown the scanned record detector plate 127 beneath the tape under the position at which the scanning ultraviolet beam makes its scans, and the sound track detector plate 128 beneath the tape at the location of the unit 123, and the synchronizing signal detector plate 129 located beneath the tape at the location of the unit 124. As a matter of fact, the pre-electrifying plate 109 and the balancing plate 110 might also have been shown in Figures 4, 5 and 6, but during the sensing and translating operations said plates 109 and 110 are not in use; and the detector plates 127, 128 and 129 might also have been shown in Figures 1, 2 and 3, but during the recording operations these plates may or may not be found necessary, or desirable for use, although in many cases it will be found desirable to have them present and properly electrified to produce improved recording effects. Accordingly, it will be understood that said three detector plates may also be provided in the arrangements shown in Figures 1, 2 and 3, during the recording operations.

It is also here noted that during the sensing and translating operations all three of the electron beam units—the scanning tube 111, the unit 123, and the unit 124—will be controlled to produce substantially uniform and strong electron beam effects, without modulation, whereas during the recording operations already described these three units were controlled to produce, in their electron beams, modulated or variable strengths as already explained. Correspondingly, during the sensing and translating operations the several detector plates, 127, 128 and 129 will produce or receive variable strength effects as will soon be apparent, whereas during the recording operations all three of these plates should be held at substantially steady potential of value which may be determined and adjusted as we shall hereinafter show. The steady potential of each of these detector plates during recording may be adjusted to that value which will best meet the needs of the recording operation.

Now, when the sealed tape, carrying the modulated electrifications is passed or travelled over the detector plates during a playing-back it is evident that each detector plate will have induced in it a potential corresponding to and of sign opposite to the electrostatic charge carried by the tape at the location of such detector plate. This will be true of each of the three detector plates 127, 128 and 129, and regardless of whether or not the scanning tube, and the units 123, and 124 are at the time energized to produce ultra-violet beams in focus with the top surface of the tape. And the above effects will represent an average or overall effect, in the case of each detector plate, of all the charges carried by that portion of the tape which is directly above such detector plate at any instant. It is evident that in the case of the synchronizing signals such an operation might be acceptable, although possibly rather weak, since those signals are in the nature of pulses with intervals of non-effect between them, and they are not in reality necessarily modulated effects. However, it is also evident that such an operation would not be acceptable in the case of the sound track interpretation, nor, especially, in the case of the cross-sensing operation. Each of these recordings comprises a more or less continuously varying, or at any rate closely spaced varying record intensity, and means must of necessity be provided for very closely sensing and translating very small variations of intensity, even though very closely adjacent to each other. The provision of the constant intensity electron beams in the scanning unit 111, and in the units 123 and 124 during the sensing operation enables us to produce in each of the detector plates a response which is directly proportional in intensity to the strength of the electrostatic charge carried by that portion of the tape directly between the ultra-violet beam of such scanning unit or unit 123 or 124, and its individual detector plate, and the fineness with which this result may be produced will depend largely on the closeness of focus of the ultra-violet beam on the tape surface. This is true for the following reason:

As the previously electrostatically modulated and sealed tape (or an area thereof) moves along there are carried by its surfaces charges which are, at all elemental areas, of value proportional to, and of sign opposite to, the electret charges sealed into the tape of such areas. While the entire tape area may be considered as formed of an infinite number of elemental areas of infinitely small size, the resulting effect is that over a discrete area portion of the tape there is necessarily produced a more or less average condition, and the fineness with which the charge value at any area of small size may be sensed will depend on the fineness with which that area's charge may be defined and brought to condition to affect the detector plate. When a discharging or ionizing beam is brought to focus at a given point or very small elemental area of the tape, such beam being of constant strength as we have specified, the detector plate will be subjected to an influence which will be proportional to the charges of all of the elemental areas in registry with such plate at the moment, but modified by the fact that such beam is discharging the top face of the tape (opposite to the detector plate) at the location of such beam's focus; and the amount of such discharging action thus produced by the ultra-violet beam will depend on the strength of the charge which is trapped within the tape at the location of such beam focus. Accordingly, there will be produced on the detector plate a sympathetic change of potential which will correspond to such instantaneous discharging action being produced by the beam. As the tape travels along (in the case of the sound recordings, or the case of the synchronizing records), the detector plate will thus be subject to changing influences exactly proportional in value to the recorded charges carried by the tape.

In the case of the recorded cross-scans a similar but special condition will be produced as follows:

If it be assumed that each cross-scanning swing of the electron beam during sensing be harmonized with one of the recorded scans carried by the tape, so that as the ultra-violet beam from the scanning unit swings across the tape width it is riding on a previously recorded cross-scan, it is evident that an operation similar to that above explained will occur, the detector plate 127 then being subjected to a constantly changing influence proportionate to the intensity of the trapped charge carried by the tape at each elemental area along the line of such cross scan. Thus a sensing effect will be produced which may be translated and amplified in ready manner, as will be hereinafter disclosed. It is assumed in the foregoing explanation that the electron beam of the scanning unit 111 is held substantially constant during such scanning operation and sensing operation.

It is necessary, in order to obtain exactly correct sensing according to the foregoing explanation, that the cross-scans of the sensing unit (the scanning tube) be timed with the arrivals of the successive cross-scans carried by the tape. We have already showed that the synchronizing signals will effect periodical corrections of the operations in this regard, especially when the tape is driven by synchronous motor drive, or other very closely constant speed drive, with closely regulated frequency supply as is generally available. Such closeness of sensing operation will be the more pronounced in the case of recordings which are made during attachment to a given television receiver, and play-back to that same receiver, since, when using such a combination of elements, the same horizontal deflecting means (being one of the saw-tooth generator units of such television receiver) will be used during both operations, thus assuring close control of the rates of scan during both recording and subsequent sensing and translation.

In Figures 7, 8 and 9 we have shown a modified arrangement of the recording means shown in Figures 1, 2 and 3. In the present case we have inverted the scanning tube position, placing it below the travelling tape so that the effects thereof are produced on the bottom face of the tape instead of the top face thereof. Correspondingly, we have inverted the locations of the detector plates, and the pre-electrifying plate, and have provided for presentation of the sealing tape strip from below to its location against the bottom face of the modulated charge tape. Since Figures 7 and 8 are bottom face views of the main tape strip it is seen that the sound track and the synchronizing signals appear aligned close to the near edge of the tape instead of close to the far edge thereof as in Figures 1, 2 and 3. In Figures 7, 8 and 9 we have designated various of the units and elements with numerals the same as are shown on Figures 1, 2 and 3, but with the suffix "*a*," for ready identification. Examination of these Figures 7, 8 and 9 will show that when the sprocket wheels 102$^a$ and 103$^a$ are located above the tape it is necessary to provide support for the tape beneath, and this is done by the presser wheels 102$^b$ and 103$^b$ in Figures 7, 8 and 9; and the presser wheel 104$^a$ is located above the sealing tape guide wheel 108$^a$ so as to provide proper control of the tapes. The inversion of various other units will be readily understood from comparison of Figures 7, 8 and 9 with corresponding Figures 1, 2 and 3.

It will also be noted that in Figures 7, 8 and 9 we have moved the sprocket 102$^a$, presser wheel 102$^b$, guide wheel 108$^a$ and presser wheel 104$^a$ to the right sufficiently to allow a shallow pan 130 to be supported below and close to the bottom surface of the travelling tape beyond the charge modulating location, but prior to the incoming of the sealing tape to its sealing engagement with the so-modulated charge tape. This pan is supplied with finely comminuted magnetizable material, such as $Fe_3O_4$, or $Fe_2O_3$, or $Fe_3C$, or a suitable material which will receive and retain the magnetic charges, or will produce a magnetic control action according to the principles of operation presently to be described. This finely comminuted material lying in the pan is shown at 131 in Figure 9. The pan (and its contained fine material) are subjected to a controllable high potential which may be regulated, and when such potential is raised to the sufficient value the fine material will rise slightly in the pan, due to electrostatic repulsion effects produced by the pan's electrification. By properly adjusting the potential of the pan it is possible to ensure a "floating" of this fine material just beneath the bottom surface of the travelling tape, so that electrostatic charges of the surface of the tape will draw the fine material to such tape surface. The amount of material which will be thus drawn to the tape surface will depend on the amount of electrostatic charge left on the tape at each elemental area thereof after the modulating operation of the units, so that the so-treated tape will now carry a variable amount of the fine magnetizable material, in accordance with the recordings which have been deposited on the tape and after modulation.

As the tape moves from the location of the pan 130 to the location of the sealing strip 105^a that sealing strip will seal into permanent location between the tape strips not only the electrets which have been left on the tape, but also the magnetizable material, and the amount of the latter at each elemental area will be proportional to the electrostatic charge and thus also proportional to the recorded signal intensity. Furthermore, by using transparent dielectric sheets for the tape strips it will be possible thus to produce a "moving picture" frame or series of frames, since the magnetizable material will be opaque, but of powdered form, so that the density of the opaqueness at each elemental area will also be proportional to the intensity of the signal recorded for such area.

Such a tape recording may afterwards be sensed and translated either electrostatically by such a sensing arrangement as that already described in connection with Figures 4, 5 and 6, or magnetically, as by use of sensing means presently to be described in full detail. At this point, however, we point out that although the magnetizable material may not be of a kind to retain magnetization to which it has been subjected, being a "soft" material, still the permeability of each elemental area of the so-prepared tape will depend on the amount of magnetizable material there present, so when a magnetic sensing element or unit is brought to the location of each such elemental area, or a contrary operation is produced, moving the tape to such sensing unit, the magnetic effect produced in such magnetic sensing unit may be made proportional to the amount of the magnetic material present on the tape at such elemental area, and a proper use may be made of such effect. Thus a dual purpose recording may be produced, and, if we also consider the transparency effect already referred to, such a recording may be properly called a triple purpose recording.

Referring next to the showing of Figures 10, 11, 12 and 12A, these figures show means to produce a magnetic recording by direct magnetic effects under control of the scanning unit, and completely independently of need for any electrostatic modulation. Figures 10, 11 and 12 correspond generally to Figures 1, 2 and 3, but in the present case there is no need for provision of the sealing tape strip and accompanying rollers, etc. Furthermore, the means to produce the sound track shown in these figures as a linear track involves a magnetic sound track recording head, which may be of conventional form, the illustrated sound track being linear; and the means to produce the synchronizing signal recordings is magnetic in nature instead of electrostatic as in Figures 1, 2 and 3. Also, in Figures 10, 11 and 12 we have shown a pre-magnetizing or magnetism control unit, one of whose poles is shown at 132 in Figure 11, in place of the pre-electrification arrangement of Figures 1, 2 and 3. This pre-magnetization unit may or may not be used as determined by the designer; but generally it is desirable that the entire surface of the tape be brought to a uinform degree of magnetization (or be fully de-magnetized) prior to the recording operations.

The cross-scanning unit and provisions for delivering the effects of the scans to use outside of the envelope are similar in Figures 10, 11 and 12, including the proper horizontal deflector means, the electron beam modulation means, the phosphor for producing the ionizing wave lengths, the transparent—preferably lens type—window for the ionizing beam, the reflector for the ionizing beam, and other elements. Thus we do not repeat the description of these parts at this point.

In the present case we provide the two companion conductors extending across the width of the scanned area of the tape, being separated from each other to provide the narrow air gap. These conductors are shown at 133 and 134, in Figures 12 and 12A, and the air gap is there numbered 135. It is at once noted from Figure 12A that these conductors and air gap are so formed that the air gap is curved to conform exactly to the path of travel of the downwardly extending ultra-violet beam coming from the reflector; or conversely, the focused beam always travels along said air gap. Thus an ionizing effect is produced in the air gap, greatly increasing the conductivity of the air at the point of such beam at each instant, so that current may flow between the conductors at the location of such ionizing beam, and only at such location. The two conductors are in such case insulated from each other, as shown by the insulating clips 136 and 137 shown in the detail of Figure 27, presently to be described. It is here noted that in Figures 37^a and 37^b we have shown a modified arrangement of the air gap to which the ultra-violet beam is directed; but fundamentally the operations which we shall now describe are the same when using both forms of conductors and air gap.

The tape surface is provided with magnetizable material which material coating may be of the types now conventionally used for magnetic tape recordings, or a different form of surfacing for the tape, which is shown in Figures 28, 31, and 29, 32, presently to be described. The conventional form now in great use comprises very finely comminuted magnetizable material coating the tape surface, and suitably adhered thereto, such material being of suitable magnetizable quality. It is not deemed necessary to here describe such tape forms further.

Since the strength of the electron beam is modulated during recording the strength of the ultra-violet beam is also then modulated. Therefore the conductivity of the air gap at the point of focus of the ultra-violet beam is also modulated during recording, as the scanning progresses. By proper means, presently to be explained, this modulated control of the conductivity of the air gap may be translated into the function of producing the desired modulated magnetizing action on the surface of the tape during recording. One means to effect this function and result is shown in Figure 22. Also, since the strength of the electron beam is substantially constant during sensing (as has been already explained) the strength of the ultra-violet beam is also substantially constant during such sensing, and as the scanning progresses. By proper means, presently to be explained, this constant ultra-violet beam strength during sensing, and the corresponding constant conductivity of the air gap during sensing may be translated into the function of sensing the strength of the magnetic field along the scanned line of the tape, with corresponding production of effects which can be amplified and used for translation or other purposes. Means to effect such sensing during the sensing operation are shown in Figures 23 and 24. Attention is now directed to Figures 22, 23 and 24 as follows:

In Figure 22 we have shown the two conductors 133 and 134 as being connected to the lines 138 and 139 which are supplied with constant potential by the source such as the battery 140. Accordingly the potential across the air gap will be held constant. The flow of current across the air gap will therefore be directly proportional to the intensity of the ultra-violet beam ionizing such gap at any point of the length of the gap. Thus there will be produced a current flow between the conductors 133 and 134 which current will be proportional to the strength of the electron beam for each location along the length of the air gap. As the electron beam increases in intensity the current flow will proportionately increase in intensity; as the electron beam decreases in intensity the current flow will proportionately decrease in intensity. Thus a modulated current flow will be produced along the line of scan. This current will flow across the air gap at a location close to the surface of the magnetizable material carried by the tape, and thus a magnetizing effect will be produced on such magnetizable material. The strength of such magnetizing effect at each elemental area along the line of scan will be directly proportional to the strength of the electron beam for such location. Thus the desired function of producing a magnetic record in the form of cross-scans will be attained.

In Figure 23 we have shown the two conductors 133 and 134 as being connected to the lines 141 and 142. The line 142 connects to a source of potential, such as the battery 143, and the line 141 connects to a suitable detecting element, such as the grid of a tube. The heating element of such tube would be properly connected by return lines to the battery or otherwise. With such an arrangement it is evident that the battery is supplying a constant potential to the conductor 134. During sensing the strength of the electron beam is to be held constant as we have already explained, so the ultra-violet beam will produce a constant ionizing effect at the point of focus to the air gap, and thus the conductivity across the air gap will remain constant during scan. Thus, too, there will be produced a conducting very narrow path of gas across the air gap, which gas path of conductivity will travel along the length of the gap during scan. Any potential induced in the conducting narrow band of air across the gap during scan will be added algebraically to the potential of the conductor 134, so the potential delivered to the conductor 133, and to the line 141 connected thereto, will be the additive effect of the battery potential plus the induced E.M.F. thus produced. The narrow band of conductivity is travelling very fast along the air gap (we have shown that it may be of a velocity of the order of 2,000 ft./sec.). The E.M.F. induced therein will be proportional to the velocity times the strength of any magnetic field which is being cut. The velocity along the scan length is constant, so the induced E.M.F. will be proportional to the strength of the magnetic field. As that strength varies along the scanned line the induced potential will also vary, thus producing a modulated potential delivered over the line 141. This may be delivered to the grid of a tube of conventional type and connected conventionally, to produce the desired translation effects, etc.

In Figure 24 we have shown a modified arrangement for sensing the strength of the magnetic field along the line of scan. In this case a closed circuit sensing arrangement is provided, the line 141$^a$ (from the conductor 133) connecting back to the battery, and the line 142$^a$ including the resistor 144. Under these conditions the modulated E.M.F. produced at the air gap will be reflected in a modulated current value flowing through this closed circuit. Accordingly, by connecting the grid of the tube to a suitable portion of such closed circuit, as to the point 145, a modulated potential will be available, which will be usable for producing the desired translating or other effects.

The sensing effect produced by the scanning of the constant intensity ultra-violet beam focus along the air gap may also be analyzed as follows:

If the effect produced by the ionizing of the air at a very narrow path across the gap at the point of beam focus be individually considered as that effect which will be produced by such ionizing at a small elemental area of length equal to the width of the air gap (distance across the air gap), and of very small width (distance along the air gap), and if it be assumed that each such elemental area of ionizing effect is to be individually considered and examined, then it may be assumed that as the beam strikes such elemental area said area will be suddenly ionized and its conductivity be suddenly increased, so that a sudden increase of current flow (or a modulation of previously existing current flow) will occur; but the inductive impedence of that portion of the circuit at the air gap must also be considered in testing the resulting operation. That inductive impedence will be proportional to the strength of the magnetic field present at the location of such elemental area, being the strength of the field carried by the tape at such location. If that field be weak the impedence will be small, and the current change will occur rapidly; if that field be strong the impedance will be large (comparatively) and the current change will be slow. Thus, in any case a modulating effect will be produced in the circuit proportionate to the strength of the magnetic field carried by the tape at each elemental area; and such modulating effect may be translated and used to effect the desired further functions. It is here noted that this is true with either form of the sensing circuit, but it is especially true of the form shown in Figure 24.

With the simple form of air gap arrangement thus far described there will be produced what may be called a unipolar effect—that is, an effect in which only one magnetic pole is acting towards or from the tape surface, the other pole being away from such surface so that the lines of force must flow through a considerable length of air path to complete the circuit. It is desirable to provide an arrangement in which the effect is what may be called "bi-polar," that is, both magnetic poles are presented directly to the tape surface, and both magnetic poles will act during sensing to produce the desired effects. We have disclosed such an arrangement herein, for which purpose reference may be had to Figures 37$^a$ and 37$^b$ to which attention is now directed:

In Figures 37$^a$ and 37$^b$ the two conductors are shown at 146 and 147, producing between them an air gap 148 to which the ultra-violet beam focus is directed; but in the present case a third conductor 149, preferably quite narrow, is extended along the central portion of this air gap and slightly higher in elevation than the conductors 146 and 147 as well shown in Figure 37$^b$. The two conductors 146 and 147 are then connected together as shown by the dotted line 150 in Figure 37$^a$ so that the two electrical polarities are established between such connection 150 and the central conductor 149. The ultra-violet beam is then directed against the conductor 149 and both of the two air gap sections as it travels along the length of the scan. With this arrangement it is evident that current flow will be either from the conductor 149 to both of the conductors 146 and 147 or in opposite direction, from both of the conductors 146 and 147 to the central conductor 149; but in any case there will be produced current flows across the two "semi-air-gaps" in opposite directions. Of course the magnetizing effect during recording, or the sensing effect during sensing will then be dependent on the double effect thus produced. During recording these two currents of opposite directions of flow will produce opposite magnetic poles on the surface of the tape, so that a bi-polar magnetizing effect will be produced; and during sensing these bi-polar magnetized elemental areas of the tape will produce corresponding potential effects in modulation of the sensing circuit.

It will be understood that we contemplate the provision and use of either air gap arrangement in each of the various disclosures heretofore made or to be hereinafter made, when the magnetic type of recording and/or sensing is to be produced, either the simple form of air gap shown in Figures 22, 23 and 24, and elsewhere, or the double form shown in Figures $37^a$ and $37^b$.

It is desirable to bring the air gap (or the semi-air gaps) very close ot the magnetizable surface of the tape. Accordingly we direct attention especially to the detail showings contained in Figures 30, 33, 35 and $37^b$. In these figures the conductors defining the air gap are shown as provided with slightly widened bottom surfaces, smooth and preferably surfaced with thin hard surfacings of insulating material such as thin plastic coatings (shown by the rather heavy lines in said figures), and if desired the edges of these conductors may be slightly rounded up to avoid any scratching of the tape surface. Preferably, also, these conductors have their proximate edges brought to rather sharp lines, as shown in said figures so that the actual air gap is produced between these sharpened edges, and is brought very close to the tape surface. Under these conditons this gap-defining element may be allowed to actually ride slightly on the tape surface, pressing lightly against such tape surface, but substantially no heating effect will be produced by frictional contact thus established since the rate of tape travel is comparatively small, and since the unit will press but lightly against the tape surface during operation.

We have already mentioned the fact that the magnetizable tape may be coated with fine granular material of magnetizable quality, according to practice extensively in use at the present time. Such a form of tape surfacing is indicated in Figure 27. However, we also, in Figures 28, 31 and 29, 32 illustrate another form of tape on which the magnetic recordings may be produced. In this case we have shown the thin sheet or foil of highly magnetizable material such as what is known as "4–79 Ni," comprising an alloy including 4 percent molybdenum and 79 percent nickel, and iron 151 laid onto the surface of a thin but strong sheet of high tensile strength, such as nylon 152 the two elements being secured together as by thin cementing material. This foil of magnetizable material may have a thickness of much less than one one-thousandth inch, so that the combined thickness of the tape thus produced may be of the order of one or two one-thousandths inch.

In Figures 29 and 32 we have shown a modification of this foil type of tape, in the sense that we have indicated the curved cross ribs 153 formed on the tape and extending across the width to be scanned and of curvature or form to conform to the scans to be produced, and with the ribs spaced from each other at separations conforming to the scan spacings. These ribs shall extend up from the general surface of the foil only a small amount, probably about one one-thousandth inch, so that during scanning operations good definition will be assured between the recordings of the successive scans, and to ensure good contact of the sensing element with that portion of the tape surface which is being recorded or sensed.

It is desirable to secure relatively high intensity of the electron beam (consistent with avoidance of excessive rate of depletion of the phosphor deposit) so as to produce sufficiently high intensity of the ultra-violet beam to ensure maximum sensing and recording operations. We have referred to the provision of means to amplify the effects of the electron beam. Reference is directed to Figures 33, 34, 35, 36 and 37 as disclosing one simple means to secure such amplification. In these figures we have also disclosed tube forms and arrangements such that the ultra-violet beam, when used, or the "conductors," when used, will extend directly down towards the tape surface, even when using the "flat" type of tube, and without need of using ultra-violet reflectors.

In Figures 33 and 36 we have shown the window end of the tube as provided with an arcuate window, 154, preferably of the lens type, in the lower wall or face of the tube, instead of in the end wall thereof, as in previously discussed arrangements. This window is transparent to ultra-violet wave lengths as in the previous constructions. The inside surface of this window is provided with the phosphor coating 155 as before, for producing ultra-violet radiation under electron beam excitation, and conveniently such phosphor is shown as carried within a shallow arcuate groove to which the electron beam or its amplification, is directed. It is now noted that such beam must suffer a right-angular change of direction to act on this phosphor surface coating.

Within the tube envelope we provide the dynode 156, of arcuate form, in position to receive the electron beam 157, and direct the secondary radiation upwardly at an angle to a second dynode 158, also of arcuate form, which second dynode directs its secondary radiation directly down to the phosphor surface as shown at 159. The two dynodes are provided with voltages or potentials $E_1$ and $E_2$, respectively, $E_1$ being of sufficient potential to produce a first magnification in the form of its secondary radiation (being a potential of, say, 100 v.), and $E_2$ being of sufficient potential to produce a second magnification in the form of its secondary radiation (being a potential of, say, 200 v.). With this arrangement the two dynodes should be of proper curvature and face contours to ensure proper direction of their secondary radiations in the manner stated, through the scanning swing of the electron beam 157.

With this arrangement a two-fold benefit is secured; the intensity of the effect produced at the phosphor is greatly magnified, and there is avoided any need of reflection of the ultra-violet beam itself. In fact a third benefit may also be mentioned, in the form of avoidance of the absorption loss necessarily attendant on the use of such a reflector.

The arrangement shown in Figure 35 is similar to that just described; but in the present case only a single dynode, 160 is provided, of curvature and form to direct its secondary radiation directly down to the phosphor deposit on the lower surface of the tube envelope. This arrangement will frequently be found to produce sufficient magnification of effect for the present purposes.

The arrangement shown in Figures 34 and 37 embodies the "conductor" type of unit, presently to be described in detail in various forms, but these figures disclose means to secure the magnification of effects from the electron beam directed to such "conductors." In the present embodiment we have shown the series of conductors 161 extending downwardly through the bottom face of the tube envelope to points close to the tape surface. The electron beam 157 contacts these conductors in succession during each scan, the conductors being arranged around a circular arc conforming to the arc described by the end of the electron beam during scan, so that each conductor is in turn subjected to the direct effect of the electron beam, with corresponding transfer of effects to the outside of the tube envelope by conduction instead of by ultra-violet or ionizing effect. These conductors may produce electrostatic modulating effects on a pre-electrified tape surface according to the principles already described in connection with the production of an electrostatic recording, or the sensing thereof; or, as will presently be disclosed, these conductors may be connected to suitable magnetic record producing elements for recording, or to suitable record scanning elements for scanning the magnetic recordings. It is to be noted that when using this detail of construction in connection with the "conductor" type, all of the conductor wires may be and are shown as of equal length.

In the form shown in these figures the electron beam effect is amplified by the two arcuate dynodes 162 and 163 whose secondary radiations are of magnified intensity as compared to the exciting beams, the dynode 162 being shown as of potential $E_1$ and the dynode 163 being shown as of potential $E_2$. It is noted that when using this "conductor" effect arrangement there is no depletion of a phospher surface, and a very large amplification of effects may be conveniently produced and used.

In view of the foregoing discussion of the operations incident to the scanning of the recorded signals by the magnetic scanning operations and by use of the ionizing effect, extended discussion of the showings contained in Figures 13, 14, 15 and 16 is deemed unnecessary. These figures have direct reference to such scanning operations and the sensing of the recorded signals, and include the use of the air gap conductors already discussed in detail. It is pointed out, however, that in this sensing operation the signals of the linear magnetically recorded sound track are sensed by a conventional magnetic sensing unit shown schematically at 164, and that the magnetically recorded synchronizing signals are sensed by another conventional magnetic sensing unit shown schematically at 165.

In Figures 17, 18 and 19 we have shown the general form of cross scanned audio or sound signals, and also how such signals may be superimposed on the high frequency picture signal variations already referred to. The showings of these figures are schematic, and they have reference to the functions above stated, whether made by electrostatic means and operations or by magnetic means and operations. The following comments are in order concerning such recordings:

We have already pointed out the extreme faithfulness with which audio recordings may be made by the cross-scanning operation herein disclosed. When the cross-scans are made at the rate of 15,750 per sec., as suggested for making television recordings, it is evident that sound recordings may be made on the basis of a full cross-scan for each sound wave. This is a rather high rate of sound waves and represents a high pitched note, near the upper end of the audible range. Even at this high rate very minor variations in the wave form will be recordable, so very close and faithful recordings may be produced to the very highest sound frequencies which may be heard by humans. A further function which may be attained by use of the cross-scanning for sound recordings is as follows:

Since the cross-scanning principle may be used to effect recordings of radio frequency even to several megacycles it follows that instead of making recordings of sound intelligence by audio frequency recordings, such intelligence may be recorded by radio frequency, thus making it possible to record the full range of radio frequency carrier waves conventionally used for radio work within the broadcast band and even much higher. Due to this circumstance it is possible to record many radio frequency carrier wave programs on the same tape, by superposing them, one on others, as by recording all of them at one time, with provision for thereafter playing-back from such a record to a conventional radio receiver which may then be tuned to that carrier wave frequency desired, with corresponding possibility of selection of that program which the user may desire to hear. Under such an operation the output of the recorder would be delivered to the antenna connection of the conventional radio receiver, either directly, or by way of a suitable amplifier. We have shown, in the figures now being discussed such several kinds of recordings, either as audio recordings or as recordings of radio frequency carrier waves.

A futher function which may also be produced by the use of cross-scanning in connection with sound is as follows:

The conventional television receiver is provided with means, generally in the form of a "sound trap" to separate the sound signals from the picture signals being received on the antenna. In various of the showings already discussed we have included the sound recordings as a linear recording. Specifically, we have shown such linear sound recording as a sound track outside of the width of tape covered by the cross-scanning area. When this is done the tape width must be correspondingly increased by the width necessarily added by such outside linear sound track. However, if desired such linear sound track, or a linear sound track of some other recording may be superimposed on the cross-scanning record, provided that the frequency of the signals recorded by such linear track is materially lower than the frequency of the signal variations recorded by the cross-scans. This would almost invariably be the case since the very object of providing the cross-scanning record is to enable recordings of frequencies much above those which can be recorded by linear recordings with use of convenient tape speeds.

A further and important function which may be attained in the recording of sound records of audio frequency variations, or a direct sound recording itself, is as follows:

Such sound recording may be produced by the cross-scanning operation, using cross-scanning of high rates of scan, such as 15,750/sec., already referred to. In other words the sound recording would be at the same cross-scanning rate as that of the recording of the picture signals. Provision would be made for two scanning units, such as shown at 166 and 167 in Figure 19. One of these units would be connected into proper circuits to make the recording of picture signals, and the other would be connected to the sound circuits of the television receiver so as to make a direct recording of the audio wave variations as a cross scan. One of these recordings would be superimposed on the other as indicated in Figure 19. Due to the enormous difference between the frequency or rate of variations of the picture recording as compared to the maximum rate of variations of the sound recording it would then be possible to use the units 166 and 167 (or equivalent units) for sensing the double scans twice, one such unit being connected to the proper circuit elements of the picture translating equipment of the television receiver, and the other such unit being connected to the proper circuit elements of the speaker equipment of the television receiver, or other speaker unit as desired. Thus, during playing-back such a double record the advantages of using the cross-scanning principle for the sound recording would be availed of, and with use of only one width of tape. Furthermore, such tape would need be of width only sufficient to accommodate the cross-scanning records plus that additional width needed to accommodate the synchronizing signals if such signals were placed in a separate lineal track, as shown in Figure 19. If such synchronizing signals should be spotted on top of the cross-scans the tape width would be reduced correspondingly.

At this point it is deemed unnecessary to further describe the form of the color television signals shown in the recordings schematically illustrated in Figures 20 and 21, but reference will be made to these figures when certain schematic wiring diagrams are hereinafter discussed.

Figures 38 to 78, now to be discussed, show various arrangements of elements enabling the practice of our present invention, in which embodiments the scanning tube is placed vertically, that is, with its axis normal to the surface of the tape. Various arrangements embodying this feature as now described as follows:

Figures 38, 39, 40 and 41 illustrate an arrangement embodying the electrostatic recording principle, with provision for sealing the electrostatic modulated charges by use of the sealing tape or strip, and in this arrangement use is made of the "ionizing beam" principle to effect transfers of the effects of the electron beam within the tube to the tape. In view of the rather extended discussions already given respecting this general type of operation it is deemed unnecessary to here make further extended discussion of the same. However, it is noted that the pre-electrifying plate 168 is provided over the tape in advance of the location of the scanning tube 169, such plate being carried rather close to the lower end of the tube so as to ensure good control of the electrifying action close to the modulating location (the plate being shown as cut away in front of the lower end of the unit 170 which delivers and/or senses the synchronizing signals); and that portion of said plate closest to the scanning tube being at a greater separation from the tape than its portions further away from the scanning tube. By this arrangement such greater separation portion serves merely to protect the tape surface which has been pre-electrified from material amount of depletion of charge prior to the occurrence of the modulation action. Such greater separation portion of the plate is designated by the numeral 168a. The sound signal charge modulation means is shown at 171.

The arrangement shown in these figures is one in which the lower end of the scanning tube is straight and parallel to the tape surface. Accordingly, the ultra-violet beam moving through the tube window is of constant length to the tape surface over the entire scan. However, with this arrangement it is necessary to provide suitable circuitry to control the focal length of the electron beam during scanning so that said beam will always come substantially to good focus at the phosphor surface notwithstanding the fact that the length of such beam from the electron gun to such phosphor surface is constantly variable during scan. We have not shown such needed circuitry herein as the means to effect such beam length controls are well known in the electronic arts and it will be understood that such beam length compensation should be provided in the circuitry.

In the arrangement shown in Figures 42, 43, 44 and 45 we have included a vertical axis tube provided on its lower end with an arcuate window arrangement of such curvature as to conform to the swings of the electron beam without need of varying the focal length of the beam during each swing. Thus, the lower end 172 of the scanning tube 173 is formed of the curvature indicated above. We have then included in this arrangement means to so handle the travelling tape at the location of the tube, and as such tape approaches the tube and moves away therefrom, that the tape is given a transverse curve which will correspond to the curvature of the tube window at the location of such window, with provision for ensuring that the tape shall be flat in its portions both in advance of the tube and after leaving the tube location. Such provision is as follows:

As the tape approaches the tube it passes between a pair of "flat" rollers 174 and 175 by which the tape is held in desired flat condition prior to reaching the location of such rollers. Next the tape passes between a pair of rollers 176 and 177, the top roller being of convex surface formation, and the bottom roller being of corresponding concave surface formation, the convexities and concavities of the rollers being complementary to each other so that the tape passing between the rollers is securely held between them, but is caused to conform to their surface contours. These rollers 176 and 177 are separated from the rollers 174 and 175 a distance sufficient to enable the tape to change from its flat condition to its curved cross-section condition without serious distortion of the tape during travel between the two sets of rollers, so that it may be of the desired surface curvature as it passes beneath the window end of the tube. We have also provided the two sets of rollers 178 and 179, and 180 and 181, respectively, at the delivery side of the tube, the set 178—179 being of form the same as the set 176—177, and the set 180—181 being of form the same as the set 174—175. Thus the tape travel is of desired curved cross-section during its movement below the tube, and past the scanning location, and is restored to its flat condition at a later location. The sprocket wheels 182 and 183 are shown before or in advance of the rollers 174—175, and after or beyond the rollers 180—181, to ensure proper tape drive in the manner already referred to.

The sound track recording and/or sensing tube 184 and the synchronizing signal recording and/or sensing tube 185 are provided as shown. These need no further discussion here.

In the embodiment shown in Figures 46, 47, 48, 49 and 50 we have shown an arrangement embodying the "conductor" effect for transferring the effects of the electron beam within the envelope to the tape surface, for recording, with provision for sealing the modulated electrostatic charges by means of the sealing tape or sheet; and in Figures 51 and 52 we have shown an arrangement for sensing and translating the so-recorded signals, the record tape in these figures being of double thickness. Figures 55, 56, 57, 58, 59 and 60 are cross-sections taken on various of these figures. For convenience we shall consider all of these Figures 46 to 60, inclusive together as follows:

The scanning tube includes a series of many small conductors 186 extending through the lower end portion of the tube to locations close to the tape surface. These conductors conveniently take the form of small wires, moulded or fused through the envelope material, and very close together, but insulated from each other. The number of these wires across the line of scan will determine the number of discreet signals which can be individually recorded during the scan; and usually will be of the order of two or three hundred. This number of wires will determine the fineness with which the cross-scan may be defined, and the faithfulness of the recording produced. For example, assuming that there are three hundred wires across or along the line of scan, three hundred discrete elemental areas will be recorded by signals, and if the width of the corresponding television receiver kinescope screen is 24 inches there will be a recorded signal for each .08 inch along the line of scan in the television receiver kinescope. This would be a satisfactory fineness of detail of the recording for all practical purposes, and for sensing to produce a good translation during play-back from the recorder to the receiver. We do not, of course, limit ourselves to any prescribed number of these wires so long as the recorded (and/or sensed) recording is a satisfactory one for the purposes intended.

The inner ends of these wires are successively contacted or impinged during the scanning by the electron beam. Accordingly we have shown, in Figures 48, 52, 56 and 58, the inner ends of these wires as terminating in a line which is a circular arc drawn about the deflection point of the electron beam. These inner ends are designated 187, and are seen to lie in such a circular arc as just defined.

Since the lower outer ends of these wires come close to the tape surface they communicate to such locations the potentials and the discharging effects produced by the electron beam as it contacts with each of them in turn. Such discharges as are thus produced comprise small currents flowing to and on the electron beam, and the strengths of these currents will depend directly on the electron beam's intensities at the locations of the successive wires. Thus a discharging effect is produced at the tape surface, which discharging effect at each point is proportional to the electron beam intensity—that is, proportional to the strength of the signal being recorded.

Provision is made in Figures 46, 47, 48 and 49 for sealing in the so-modulated electrostatic charges according to the principles previously disclosed herein.

In the arrangement shown in Figures 51 and 52 it is intended that the electron beam shall be retained of substantially constant strength, so that during the scanning operation all of the wires are brought, in succession, to the same potential. The detector plate 188 located just beneath the tape at the location of the line of scan, will be subjected to an induced potential effect proportionate to the effect of the potential delivered through the wire which is at that point contacted by the electron beam, modulated by the potential of the sealed charge carried by the tape at such point. Since that sealed charge is at every point proportionate to the intensity of the corresponding signal by which such charge was produced and recorded, it follows that the potential of the detector plate will be modulated corresponding to the intensities of the so-previously-recorded charges. This detector plate may then be connected to the grid of a tube for amplification and translation as desired.

Detailed description of the several cross-sections shown in these groups of figures seems unnecessary and we therefore forego the same.

In Figures 61, 62, 63 and 64 we have shown another embodiment operating on the electrostatic charge principle, and with "conductors"; but in this case the charges are deposited on a soft wax of insulating and dielectric characteristics which then is hardened or solidified to entrap the modulated electrets within its body. We have, in these figures also shown a sealing tape or strip, but as indicated on Figure 62 this strip may or may not be used as found desirable.

In using this scheme of recording electrostatically it is to be noted that it is desirable to retain the electrostatically charged tape at a rather low temperature to avoid excessive depletion of the electrostatic charges by heat. The wax used should thus be one of relatively low softening temperature characteristic, and we have indicated such a one on Figure 62. The arrangement there shown includes the heating element 189 below the tape strip at location in advance of the modulating position, and below the pre-electrification zone, and is intended to hold the sprayed wax, coming from the perforated tube 190, at soft temperature during the pre-electrification operation, and during the modulating operation. Then the cooling element 191 immediately cools the wax so-charge-modulated, thus solidifying the wax and ensuring indefinite retention of the modulated charge within the body of the wax. Then the enclosing or sealing tape may or may not be brought into sealing engagement with such so-treated tape as desired. The details of any such further operation need not be elaborated here as they have been sufficiently described hereinbefore.

In Figures 65, 66, 67, 68, 69, 70 and 71 we have disclosed and shown an arrangement for production of the record magnetically, but by use of means including the "conductor" principle instead of the "ionizing" principle heretofore described in detail. To this end we have disclosed in Figures 69, 70 and 71 one means of producing a direct coil magnetization at each elemental area of the tape surface along the line of scan, and of amount proportional to the intensity of the signal to be recorded at such elemental area. In Figures 72, 73, 74, 75, 76, 77 and 78 we have shown an arrangement for sensing the magnetically recorded signal values along the line of scan, such arrangement operating also on the "conductor" principle, and incorporating means to directly detect the strengths of the magnetic charges carried by the tape at such elemental areas. In Figures 76 and 77 we have also included a novel arrangement of "electronic switching" which produces an amplification of the current value for each detected elemental area magnetization.

The arrangement shown in Figures 65, 66, 67 and 68 is similar to that shown in Figures 61 to 64, as respects the provision of the wire "conductors" extending through the tube envelope, but in the present case these wires connect to the minute magnetizing coils which are supported with their helical axes normal to the tape surface so that the magnetizing effect produced by each coil is directly towards the tape surface. Each of the wires 186$^a$ is thus directly connected to the correspondingly located and individual coil 191. The free ends of all these minute coils are connected to a common line 192, and the electron beam and/or the amplifying elements which are to be presently referred to, connect to the opposite side of the circuit. Accordingly, as each of the wires 186$^a$ is contacted by the electron beam during scan a discharge of current takes place over such wire, and the magnitude of that discharge will depend on the intensity of the electron beam at the time of such contact; that strength of the electron beam depending in turn on the intensity of the signal then being recorded. Thus the corresponding coil 191 will be magnetized to an extent proportional to the intensity of the signal, and will produce a magnetic recording on the tape of corresponding value.

Conveniently all of the coils 191 are moulded and contained in a common block of synthetic material, thus also effectively insulating them from each other, and retaining them securely in proper relative positions to each other as a lineal set of minute coils, and notwithstanding their individual physical weaknesses. Such block 193 may be provided with a flange 194 moulded into it, and attachable to the lower end portion of the scanning tube, thus retaining all of the coils also in correct positions not only to each other, but also to the tube elements. In Figures 70 and 71 the inner end of one of the wires 186$^a$ is shown being electrified by the contacting of the electron beam.

It is noted that the magnetization thus produced is effected regardless of the tape's travel, and that since the duration of each of the magnetizing effects of each coil is extremely minute, it follows that the planting of the magnetization on each elemental area of the tape is practically uninfluenced by the tape's travel. This will be better realized when it is recalled that when magnetizing, say, three hundred elemental areas of the scan in the time of each scan—one fifteen thousand seven hundred fiftieth of a second, the duration of each magnetizing interval will not exceed one four million seven hundred twenty-five thousandth of a second. At a tape travel of 31.50 inches per second this will represent a tape travel of 0.0000066 inch during each elemental area recording. Actually the tape travel will be but a fraction of this extremely minute amount since the interval of magnetization will include only a portion of the time to scan the elemental area in question.

In Figures 72, 73, 74, 75, 76, 77 and 78 we have shown a simple means to sense the magnetic record carried by the tape, which sensing means incorporates the "conductor" principle, for magnetic sensing. This arrangement includes a minute potential sensor 195 for each elemental area along the line of scan, each such conductor extending in direction such that it will have generated in it an E.M.F. proportional to the intensity of the magnetism carried by the tape at the location sensed by such conductor during tape travel. To this end each such conductor extends across the tape, and therefore is subjected to the effect of the magnetic intensity at its location, and proportionately to the rate of tape travel, since such conductor will cut the lines of force emitted by such magnetic intensity at such elemental area location, the rate of cutting being proportional to the rate of tape travel. One end of each of these conductors connects to one of the "conductor" wires 186$^b$ extending through the tube envelope, as shown in Figures 76 and 77. The other ends of all these wires connect to the common line 196 which in turn connects to suitable sensing devices, such as the grid of a tube, or to a circuit arrangement such as schematically shown in Figure 78.

The focused end of the electron beam contacts each of the wires $186^b$ in turn (or an amplifying arrangement presently to be disclosed) during the scanning operation, so that the potential effect delivered to the common line 196 by the contacting of the electron beam with such wire $186^b$ will be modulated or affected by the E.M.F. being produced by the magnetic field of the tape acting on the corresponding conductor 195. Thus there will be delivered to such common line 196 a potential which is modulated according to the intensity of the magnetic field carried by each elemental area of the line of scan.

In Figure 77 we have also shown means to amplify the effects produced as above in the following manner: Within the end portion of the tube, and extending along such end portion close to the wires $186^b$ is a narrow plate 197 in the form of a dynode, and this plate is connected to a potential source of value such as to produce a secondary emission effect when the plate is impinged by the electro beam. The electron beam is then so focused that it strikes this plate and thus produces the desired amplifying effect to the adjacent wire $186^b$; or the electron beam may be so focused as to act simultaneously on both the plate 197 and the adjacent wire $186^b$. Thus a greatly magnified potential and current effect will be produced in each of the conductors 195 as it is brought into play, and the modulating effect due to the magnetic field carried by the tape will be superimposed on such magnified current effect.

As shown in Figures 76 and 77 all of these small conductors 195 and the connections thereto and therefrom may be embedded in a block 198 of such material as plastic or synthetic material, moulded with the flange plate 199 which may be readily connected to the lower end portion of the tube. Thus the sensing unit may be produced as a self-contained unit, readily attachable to the lower portion of the tube.

The sensors 200 and 201 are schematically shown for sensing the linear sound track signals and the synchronizing signals, respectively, as will be understood.

It is also pointed out that amplifying means, such as shown in Figure 77, may be included in the recording arrangement shown in Figure 71, although we have not specifically illustrated the same in said figure.

Reference may now be had to Figures 79, 80, 81, 82, 83 and 84 which show, schematically, several installations or uses or combinations of recording and sensing elements embodying the features hereinbefore explained. It is here noted that each of these combination installations includes various interconnections between elements of our recording and translating equipment and other elements of equipment, such as a conventional television receiver, a conventional radio receiver, color television receiving equipment, and other units. But we point out that such combinations in each instance involve certain well defined and important interfunctions between the elements of our equipment and such generally conventional other units. For example, the necessity for producing the synchronizing signal records, and for afterwards using such synchronizing signal records during playing-back, is an important feature of interconnection between the various units of the entire ensemble.

In each of these schematic showings we have included in partial perspective a section of tape carrying the recordings, together with a typical scanning tube of the type hereinbefore disclosed in position over the face of such tape; and we have also shown schematically the necessary units for producing and sensing the sound and synchronizing signals. The scanning tubes thus shown are of the "flat" type already referred to.

We have also in each of these figures shown means to drive the tape at uniform speed, the means illustrated comprising a three phase synchronous meter. Manifestly other drive means might be substituted therefor, provided the speed of tape drive should be very closely controlled and/or regulated. It may be mentioned that the illustrated drive means includes a "Balance Wheel" included at a point to take up minor variations in motor speed, and also includes a "flexible" clutch between the motor and the drive to the sprockets. This clutch does not permit of more than very small angular displacements between its driving and driven shaft elements, so that no "lag" can accumulate as between the number of motor revolutions and the number of revolutions executed by the driven end; but this clutch does permit slight angular variations to occur as between the driving and driven shaft elements with constant restoration to registry of these parts, thus permitting the motor, if necessary to take care of very slight departures from exact constancy of motor speed, without corresponding departure of the tape speed from a condition of uniformity.

In each of Figures 79 and 80 we have shown a combination of the recorder means with a conventional television receiver, and have shown several of the circuit elements of that receiver in conventional block schematic block diagram form. In both of these figures such conventional elements are the same and the schematic circuits illustrated in the two cases are alike as far as concerns the television receiver itself. However, an important difference between the showings of Figures 79 and 80 resides in the fact that in Figure 79 the sound signals are recorded along a lineal recording of the tape, with use of a conventional sound recording element or head, and with conventional sensing from such sound track during playback, whereas in Figure 80 we have shown the sound signals as recorded by cross-scans superimposed on the cross-scans of the picture signals. This latter arrangement requires provision of one of our scanning units for producing and/or sensing these sound signal records, with its synchronizing signal provisions, and further requires that such synchronizing signal provisions for such second scanning unit shall work simultaneously with those of the picture scanning unit. But even a more important element of difference between Figures 79 and 80, due to such provision for recording the sound signals by cross-scanning lies in this, that the scanning deflection controls of both of the scanning units must be accurately effected together. Accordingly we have in Figure 80 made provision for actuating the horizontal deflection controls of both scanning units from the same control lines.

It is further noted that the various recording units shown in Figures 79 to 84, inclusive, may operate on either the electrostatic or the magnetic recording principle as desired, and that they may operate on either the "ionizing" effect principle or the "conductor" effect principle as desired, and that they may be provided with scanning tubes of either the "flat" type or the "vertical" type as desired, or other types. Consideration of the changes needed when changing from the recording to the sensing operation with various of the arrangements already disclosed shows that in some cases slight circuit changes are necessary in making such changes for any selected from of the equipment. These are, however, of minor nature, and are readily effected without need of detailed description further here. It is however, noted that as between the "ionizing" type and the "conductor" type there are also changes or slight differences of circuits needed, either for the recording or the sensing function. To avoid needless complexity of circuits illustrated in these several figures, and to maintain the characteristic that said circuits are schematic, we have, in each case shown certain of the elements, notably the detection plates also schematically, and with simple line connections thereto in the wiring diagrams. We shall thus describe these circuits, but it will be understood that the exact forms of these circuit elements will depend partially at least on the exact type of recording and sensing units selected for the equipment.

In Figure 79 the television receiver as a whole is shown at "A" and the recording and sensing unit as a whole at "B." The line 202 is intended to distinguish these units from each other and to show generally how the circuit lines between the two units are interconnected. We have shown such interconnection by the cable indicated at 203. This cable will of course carry the necessary lines needed to establish the proper interconnections between the units "A" and "B," and such cable may be provided with end plugs of numbers of terminals needed according to the lines carried by the cable; and the television receiver and the recorder should be provided with corresponding multiple conductor sockets to receive such cable end plugs to establish the needed interconnections between the units "A" and "B." These sockets should also have their terminals properly connected to the circuits of the television receiver and of the recorder to enable the desired circuit connections to be established merely by insertion of the plugs into their respective sockets. Such arrangements are well known in the electrical arts. Thus, when the two units are to be operated in connection such connections may be very readily made and without the presence of expert operators.

We have shown a multiple line two throw switch 204 as included in the recorder unit "B," but of course this switch might have been shown as included in the television receiver set "A," instead. However, since the television receiver will generally be delivered as a distinct unit without corresponding provision of the recorder, but with provision of the needed cable socket to receive the cable plug at a future time, we prefer to include such switch as a portion of the recorder. This switch is shown as including the ten blades 205, 206, 207, 208, 209, 210, 211, 212, 213 and 214, connected for common control movement by the element 215. If desired such switch may also be provided with a third of "Off" position between its two working positions. Of these two working positions that to the left, in which position the switch is shown in Figure 79, is the "Recording" position, and that to the right is the "Playback" position.

At this point we mention that in the circuit arrangement shown in Figure 79 the switch blade 212 is for control of the antenna. During normal television reception and with or without simultaneous recording by the recorder, this blade establishes connection of the antenna to the antenna input connection of the television receiver, but during play-back this blade is in its right-hand position, with the antenna disconnected from the television receiver and dead. During such playback the receiver is obtaining its picture signals from the previously recorded tape.

In Figure 79 the various blades are conveniently identified as to their general functions, as follows:

Blade 205, line 216, sound track detector plate.
Blade 206, line 217, and
Blade 207, line 218, synchronizing signal unit.
Blade 208, line 219, and
Blade 209, line 220, sound track unit.
Blade 210, line 221, synchronizing signal detector plate.
Blade 211, line 222, scanning tube detector plate.
Blade 212, line 223, antenna line.
Blade 213, line 224, and
Blade 214, line 225, electron beam strength control, for the picture recording scanning unit.

During recording the blade 205 connects by line 226 to a potential control unit 227; the blades 206 and 207 connect to the synchronizing unit 228 (or other suitable synchronizing unit of the receiver "A") by the lines 229 and 230; the blades 208 and 209 connect to the audio amplifier unit 231 by the lines 232 and 233; the blade 210 connects by the line 234 to a potential control unit 235; the blade 211 connects by a line 236 to the potential control unit 237; the blade 212 connects by the line 238 to the antenna connection to the television receiver; and the blades 213 and 214 connect by the lines 239 and 240 to the picture and brightness lines of the television receiver kinescope.

At this point we call attention to the fact that when the recorder unit is of that type in which the recordings are magnetically made on a suitable form of tape, using either the "ionizing" effect or the "conductor" effect to transfer the electron beam effects to the outside of the tube, there is no need for inclusion of the detector plates beneath the tape, since both the recording and sensing operations are performed at the top face of the tape; whereas such detector plates are needed when using the electrostatic type of recording and sensing. Accordingly, when using the magnetic type of recording the switch blades 205, 210 and 211 will be unnecessary and the corresponding lines may be either eliminated or modified for other uses and purposes. Likewise the potential control elements 227, 235 and 237 may be eliminated when the recordings are of the magnetic type. We also call attention to the fact that when using the electrostatic type of recording and sensing it may be desirable to modify the lines 222, 216, and 221, which connect to the detector plates by inclusion of various elements such as amplifiers, etc. Accordingly, we have shown such additional elements in said lines as follows: an element "X" in the line 222, an element "Y" in the line 216, and an element "Z" in the line 221.

With the arrangements thus far described it will be found that during television receiver operation a recording may be made with the switch in its left-hand position as shown in Figure 79, the intensity of the electron beam of the scanning tube of the recorder following the intensity of the electron beam of the television receiver, and thus producing a record in which the intensities of the recorded scans follow faithfully the intensities of the kinescope scans; that the synchronizing signals are placed on the tape in exact harmony with the receipt of the synchronizing signals by the synchronizing elements of the television receiver—that is, at completion of each frame; that the horizontal scans of the electron beam of the recorder scanning unit exactly follow the horizontal scans of the kinescope electron beam; and that the intensities of the sound recordings exactly follow the sound intensities of the audio or sound waves sent to the speaker of the television receiver.

It will also be found that when it is desired to playback from the tape recording to the television receiver such operation may be effected by throwing the switch to the right-hand position. Thereupon it will be found that the synchronizing signals previously recorded by the tape will be fed back into the television receiver circuits so that the synchronizing corrections to be made in that television receiver will come from the tape recording, and will thus be correctly placed with respect to the cross-scans to be signalled by the recorder; that the horizontal cross-scans of both the television receiver and the tape recorder will be dictated by the saw-tooth generator of the television receiver for such horizontal scans; and that the sound wave signals recorded by the tape recorder will be delivered to the speaker of the television receiver or to suitable amplifying elements if need be. Since the frequency of the cross-scans was dictated by the horizontal deflector and saw-tooth generator of the television receiver during the recording operation, and which frequency is well standardized to meet F.C.C. requirements, and since the cross-scans of both the recorder and the television receiver are also controlled by the same instrumentalities during playing-back, it follows that close harmony between the needed functions and units will be produced during playing-back, so that correct interpretations will occur. Furthermore, the incoming of the synchronizing signals now from the recorded tape instead of from the ether, will ensure good harmony between the scans recorded on the tape and such synchronizing signals so that the television receiver will be kept in proper step with needed corrections, with the playing-back from the tape. It is understood that during such playing-back the motor drive to the tape is made by the same current supply as was used during the recording, as far as frequency and close regulation thereof are concerned.

We have shown the driving motor as provided with the reversing switch 241 in the supply lines leading to the motor 242 by which the tape is driven. By this switch it is possible to reverse the direction of tape drive for re-wind; but of course during playing-back the direction of motor drive and tape feed is the same as during recording.

It should also be noted that when using the magnetic type of recording and playing-back the lines 216, 221, and 222 will be properly connected to the air gap conductor elements according to the showings of Figures 22, 23 and 24, and elsewhere, or to other elements suitable to performs the needed functions of laying down the magnetic recordings during recording, and of sensing the magnetic recordings during playing-back. Sufficient has been disclosed to enable the necessary changes to be made in said lines and their connections to the elements shown in Figures 22, 23 and 24 to enable proper operations to be performed when using the magnetic tape type of recording and sensing, without burdening this specification and the drawings with further details thereof.

In view of the rather full description of the showing of Figure 79 it is deemed unnecessary to make extended description of Figure 80. It is, however pointed out that in the arrangement of Figure 80 there is not shown any linear sound track, which feature has already been referred to. Since it is desirable to bring both sets of scans into registry with each other we have, in Figure 80 shown the scanning unit 243 for the sound track or sound signals as provided with means to enable close adjustment of such unit towards and from the picture signal scanning unit so as to bring both units into exactly correct separation from each other lengthwise of the tape. Such means takes the form of the stud 244 connected to the unit 243 by a threaded connection including the sleeve 245 through which the stud is threaded, such sleeve being connected to the unit 243 by the bracket connection 246. By rotating the stud in one direction or the other the unit 243 will be shifted towards or away from the unit for picture scanning, it being understood that the stud 244 is supported for rotation but held against endwise shift.

The arrangement shown in Figure 81 is intended for making a record of all radio frequency signals striking the antenna, which signals are of frequency not too great for record according to our cross-scanning principles. Thus we have already shown that signals of the frequency of several megacycles may be recorded and sensed by the use of our equipment herein disclosed. In the present Figure 81 we have shown a conventional radio receiver having the tuning button 247, and station indicator scale 248 of conventional desgin and form. We have also shown the antenna connection 249, and the speaker 250, also of conventional form. Under conventional operation of this receiver the antenna 251 is connected directly to the antenna connection 249, unless the receiver is provided with an internal antenna in which case the antenna 251 may be considered as being within the housing of the receiver itself. The elements above the line 252 are considered as being contained within or as comprising portions of the recorder unit.

Since when conducting the operation now to be described the radio receiver does not of itself have any of several elements or units needed for the operation of the recorder, we have in the present case provided such units within or as portions of the recorder. These include the radio-frequency electron beam strength control 253, the horizontal deflector and synchronizing unit 254, and the unit 255 for producing the synchronizing signals during recording. These may embody the needed elements for performance of their functions according to conventional and well understood principles presently in very wide use in the electronic arts. We have also provided the radio-frequency receiver amplifier 256 which handles the incoming signals for amplification at radio frequency.

We have provided the eight blade double throw switch 257 including the blades 258, 259, 260, 261, 262, 263, 264 and 265. These may be thrown to the left as shown in Figure 81, for recording, and to the right for playing-back, and if desired a central or off position may also be provided. In the arrangement shown it is only necessary to provide two conductors between the radio receiver and the recorder, these being antenna lines, 266 from the antenna to the switch blades 264 and 265, and 267 from the switch to the receiver antenna connection 249.

With the switch in its left-hand position, as shown for recording, the antenna is connected to the antenna connection 249 so that the radio receiver may receive any desired station which may be on the air and receivable, by merely tuning the button to the proper station position. In other words, as far as the receiver is concerned a normal operation may be conducted. In this position of the switch, which is the recording position, the blades 258 and 259 are connected to the unit 253 through the amplifier 268. Said blades connect by the lines 269 and 270 to the electron beam strength control of the scanning unit of the recorder. Thus the electron beam will be varied as to strength by the signals received by said unit 253. Said unit is connected to the unit 256 which receives radio frequency signals directly from the antenna over the line 271, the switch being in the recording position. With the switch in said position the synchronizing signal unit 255 connects by the lines 272 and 273 to the synchronizing signal recorder unit, thus planting the synchronizing signals on the tape. Likewise, with the switch in the recording position the scan records detector plate (when there is one) is connected by the line 274 and switch blade 260 to an adjustable potential, and the synchronizing signal detector plate is connected by the line 275 and switch blade 261 to an adjustable potential, assuming that the arrangement is one which includes such detector plate.

With the above disclosed arrangements it is evident that all radio frequency signals striking the antenna and which are within the recordable frequency, will be recorded on the tape at their radio frequencies. Each carrier wave will be recorded superimposed on all other received carrier waves, so that there will be produced on the tape a recording which exactly simulates the effects being delivered to the antenna by the ether during the interval of recording. In other words the tape record will include all received radio frequency signals, not audio signals. If thereafter the switch be moved to its right-hand position, for playing-back, examination of the circuits will show that the antenna is now "Off," and that the scan records detector plate is connected to the antenna connection of the receiver. Accordingly, the playing-back will deliver to the receiver antenna connection the same jumble of signals as came in from the ether by way of the antenna, but since that jumble is a result of the intermixing of all of the received carrier frequencies, it is just as possible to now tune the receiver to any one of the carrier waves so received and recorded as it would have been to tune the receiver to the desired station's carrier wave had the reception been directly from the antenna instead of by way of the recording. Thus we have provided the means to enable recording all of the frequencies which are on the ether during the interval of recording, and which are of frequency within the recordable range of the recorder. Thus, too we have provided means which will make it possible to locate and translate signals carried by many stations or sending stations during the recording interval, and we are not limited to the reception of a single station which was tuned by the receiver during its program emitting. Thus, too we have provided the means to enable finding or locating signals received during a given interval, long after the time of such interval. Many other benefits and advantages will be found to follow from these functions.

The arrangement shown in Figure 82 differs from that shown in Figure 81 principally in this, that while the arrangement of Figure 81 is intended for the recording of radio frequency signals, which recorded signals may afterwards be sensed and translated and played-back to the radio receiver, there to enable the operator to select that program which he wishes to play on the radio, on the contrary, in the arrangement of Figure 82 the recordings are of the sound waves themselves, and are thus in the much lower frequency range. We have previously discussed the desirable effects which may be secured when such sound waves within the audio frequency are recorded by our cross-scanning arrangement.

In the arrangement shown in Figure 82 the radio receiver 276 is provided with the conventional tuning button for tuning to the selected radio frequency of the desired station; and we have shown schematically such a frequency tuning arrangement in the form of the oscillator 277 including the fixed inductance 277$^a$ and the variable capacitance 278 across such inductance, the variable capacitance being operated by use of the tuning button 279. The dial is provided for indicating the tuned station as shown at 279$^a$ according to conventional arrangements of such tuners. The speaker 280 is also shown, together with its power coil 281, and connections 282 and 283 for delivering the sound waves to such speaker, so that the lines connected to said connections 282 and 283 carry the sound waves which correspond to the radio frequency signal which has been tuned, and which sound waves are being delivered to the speaker. The arrangement shown in this figure includes means to make a tape recording of these sound waves. Of course when any other radio frequency is tuned, corresponding to another sending station or otherwise, the sound waves then delivered over the connections 282 and 283 will correspond to the new program thus tuned.

With a recording of the kind just described it is evident that play-back of any one of the recorded programs may be effected by delivering to the speaker connections 282 and 283 replicas of the sound wave recordings thus previously placed on the tape. At such times the antenna 284 is disconnected from the receiver, or, alternatively, the speaker coil and connections 282 and 283 may be disconnected from the receiver circuits during play-back; and since such circuit arrangements are well known we do not show them in detail in Figure 82.

The line 285 shows, schematically, the division point between those elements comprising portions of the receiver, and those, above such line, comprising portions of the recorder. The recorder shown then includes the audio frequency receiver element 286, the audio frequency electron beam strength control unit 287, the horizontal deflector and synchronizing unit 288, the synchronizing signal unit 289, and the amplifier for electron beam strength control unit 290, when needed.

The ten blades, double throw switch 291 is provided in the recorder unit, which when thrown to its left-hand position as indicated in Figure 82, produces the needed connections for recording the sound waves then being produced by the radio receiver at its then tuned position, being the program then being played; and which switch, when thrown to its right-hand position, produces the needed connections for playing-back such sound wave recorded program to the speaker unit of the radio receiver. In view of the rather detailed description already given of several of the switching and related arrangements it seems unnecessary here. It is, however, emphasized that with the present arrangement of Figure 82, we are making a recording directly of sound waves at their audio frequencies, on the tape record, and are playing such recordings back, by the cross-scanning principle as distinguished from the conventional linear principle which has been well known and widely used in this and related arts.

We consider next the arrangement shown in Figure 83. In this arrangement provision is made for simultaneously producing a tape recording of picture signals of a plurality of camera examinations of one or more objects, the signals for such plurality of camera examinations being recorded as regularly recurring or cyclically recorded recordings of elemental areas of the several objects being examined by such cameras. To this end we have provided the plurality of cameras—in the illustrated case, three—examining the object or objects. In the illustrated case these three cameras, 292, 293 and 294 are shown as being directed to a common industrial unit, 295, such as the tuyeres of a blast furnace whose operation is under examination, and whose operations at different points are to be tape recorded. These cameras deliver individual scanning signals on three successive high frequency waves coming at regular time spacing, as when spaced one hundred twenty degrees apart, according to well understood principles in the television art. Provision is then made for sampling the "highs" of these successive signals, by use of the sampler unit shown schematically at 296, and delivering the sampled highs in mixed form over the lines 297 and 298. Suitable synchronous generator means 299, sampling pulse generating means 300, and accessories are provided as portions of the camera section, so indicated in Figure 83. The synchronizing signals are delivered over the lines 301 and 302, for use in the recorder; and horizontal deflection control signals are delivered over the lines 303 and 304 also for use in the recorder. Thus provision is made for delivering to the recorder cross-scanning unit not only the needed mixed high signals for use in controlling the intensity of the electron beam of the scanning tube, but also for controlling and producing the horizontal scans of that electron beam, and for delivering the necessary synchronizing signals to the proper unit of the recorder.

In the schematically illustrated embodiment of Figure 83 we have shown a receiver and kinescope section to which the recorded signals may be delivered from the tape recording, and by which section such signals may be translated into the desired plurality of viewable pictures on the several kinescope screens. Thereby we have provided the means to enable playing-back such plurality of recorded picture signals, so that the happenings which occurred at the corresponding camera viewed locations can be simultaneously viewed by an individual or a group of individuals, at a time and place convenient and desirable for producing such subsequent operation. Thus, we have shown the three kinescopes, 305, 306 and 307 located in the receiver section, together with the sampler by which the received mixed signals are disassociated from each other and delivered to said three kinescopes in regularly recurring progression, such sampler being numbered 308, the deflecting circuit unit 309 for producing both the horizontal and vertical deflecting signals for the kinescopes, and the television receiver unit 310 to which the sensed signals from the scanning unit of the recorder are delivered during playing-back.

The eight blade, double throw switch 311 is provided in the recorder section for effecting the needed controls of circuit connections during recording (left-hand switch position as shown in Figure 83) and during playing-back (right-hand position of the switch). It is understood that this switch may also have a central "Off" position if desired. It is not deemed necessary to describe the various circuit connections in full detail here, as they will be readily understood from earlier discussions along this line contained in this specification.

It is here pointed out that with the mixed highs arrangement disclosed in this figure we are able to place the "dot" signals coming from the several cameras on the cross-scans of the tape in regularly recurring progression in various manners. One such manner is that shown in Figure 20 which we have previously discussed, and which dot arrangement is also intended for making a record of the color television signals by the mixed highs arrangement. Such being the case it will be understood that many of the features of such a dot recording also can be used for color television recording. We shall presently disclose a color television recording arrangement in fuller detail herein. It should be pointed out, however, that if desired each full line scan of the receiver may be assigned to a corresponding scan of a camera, 292, 293, or 294 of Figure 83, with provision for sending the scan signals to the recorder scan lines from the three cameras in regular order and recurring succession. In such case each "dot" will be one scan line long. In such case, too, the receiver will be arranged, as respects its connections and its sampler 308, to send the played-back scan lines of the recorder to the three kinescopes in succession and regular order of progression. We call attention to the scan line arrangement shown in Figure 21 as illustrative of such a scheme of scanning, although that figure is illustrative particularly of the recorded signals of a color television program, on the three primary color basis.

In Figure 84 we have shown, schematically, an arrangement whereby color television signals, being currently tuned and received by a conventional form of color television receiver, may also be recorded on tape according to our herein disclosed recording arrangements, and afterwards played-back to that same television receiver as a color replica. It is not necessary to describe these arrangements in full detail in view of the extended discussions already given, but the following explanations are in order:

The specific arrangement shown in this figure is one in which the color televised signals are delivered to the receiver by the so-called "mixed highs" system on the three primary color basis. We have previously referred to this system. In figure 84 we have schematically shown the three receiver kinescopes 312, 313 and 314, for the Red, the Green, and the Blue, respectively; and we have shown the dichroic reflectors 315 and 316, together with the common reflector 317 for delivering the three color kinescope translated sets of signals to the common viewing screen 318, according to well understood arrangements. The sampler 319 is shown for distinguishing the signals of the three sets and delivering such signals properly to the several kinescopes, for production of the completely translated color replica. The deflecting circuits for both horizontal and vertical deflections are shown at 320, and the horizontal deflection control lines 321 and 322 extend from this control to the recorder (through the switch, presently to be referred to) for control of the horizontal scans of the recorder scanning tube, according to the principles already disclosed herein.

The television receiver, etc., is shown at 323 for delivering the desired signals which arrive over the antenna 324 to the sampler 319 for the three kinescopes of the receiver, and to the sampler 325 for delivery to the recorder instrumentalities as presently to be shown. The unit 325 may also be understood to be a mixer as designated on Figure 84. This unit 325 actually delivers mixed signals, in amplified form, to the electron beam strength control element of the recorder scanning unit, so that all of the mixed signals will go to the recorder for placement on the tape in regularly recurring order, while at the same time said signals are being separated from each other and delivered separately to the several kinescopes in proper sequence.

The synchronizing signals for recording on the tape are delivered from the unit 320 through the amplifier 326 to the lines 327 and 328 for delivery to the synchronizing signal recording unit of the recorder. The usual sound trap 329 is shown for separating the sound signals received over the ether for delivery to the receiver speaker as audio signals in conventional manner, an audio amplifier 330 being shown in such circuits. The sound signals are then delivered over the lines 331 and 332 for transmission to the sound recorder of the recording unit.

Provision is made for delivering the antenna received signals directly to the unit 323 of the television receiver during normal reception, and during the production of a recorded record; and for disconnecting the antenna from the television receiver and connecting the antenna connection of the television receiver to the proper sensing element of the scanning unit of the recorder during playing-back. Examination of Figure 84 thus shows the line leading to the sensing line 333 of the recorder scanning unit, when the switch is moved to its right-hand or playing-back position. By this arrangement, during playing-back the signals are coming from the recorder sensing element instead of from the antenna.

The ten blade double throw switch 334 is provided, which, when in its left-hand position, ensures proper connections for recording the color television signals received from the ether, and when in its right-hand position ensures proper connections for playing-back the so-recorded signals. It is not believed necessary to describe the various connections to this switch, in view of the extended descriptions already given earlier herein.

We have referred to the provision of means to effect adjustment of the sensing unit or scanning tube of the recorder parallel to the direction of tape travel and have shown such a means at 244, 245 and 246 in Figure 80. We have also referred to the desirability of making provision for effecting slight rocking adjustments of the same scanning tube to bring the scans into exact registry with previously laid down scans. In various of the figures we have designated the approximate location of the vertical axis of tube swing when effecting such rocking adjustments, by the point 335. It will be seen that this vertical axis of rock extends substantially through the line of scan at its central position as shown in Figures 1, 7, 10, 22, 23, 24, 38, 46, 53, 54, 61, 65 and 72, and others. It is not deemed necesary to illustrate such rocking structure as any suitable scanning tube support capable of effecting or allowing such rocking adjustment may be used.

We have already referred to the provision, if desired, of means to effect "vertical" deflection of the electron beam to ensure distribution of the point of impingement thereof on the phosphor deposit over an area of discreet width, and thus to avoid constant scanning on a single line. In various of the figures we have shown the vertical deflection element 336 in relation to the scanning tube and in addition to the horizontal deflection element 337 of such tube. We have, for purposes of simplicity in illustration, not shown the schematic circuit connections to these vertical deflection elements, as they will correspond generally to the provisions made in conventional kinescope controls and other elements. It is pointed out, however, that in case of use of such additional deflection means the amount of deflection produced thereby would be small in comparison to that vertical deflection produced in conventional kinescopes and the like; and also that the reflector and lens arrangements should be such as to ensure scan along the same line at all times, and for all conditions of such vertical deflector adjustment or functioning. For example, referring to Figure 25, the electron beam and the ultra-violet beam therein shown are in what may be considered as a central position, and under these conditions the ultra-violet beam is brought to focus at the position of the air gap at which the scanning occurs. If, by use of such a vertical deflection means the electron beam should be higher up in Figure 25 than illustrated, so that the point of impact of the ultra-violet beam on the reflector surface of the flange 121 would fall farther to the left than shown in said Figure 25, then, by slightly curving said surface on a concavity, it could be so designed that the reflected ultra-violet beam would still come to focus at the location of the air gap. Correspondingly, such a slight concavity of the reflecting surface would also make proper compensation when the electron beam was deflected downwardly. Of course the form of the lens should also be proper to ensure the desired results indicated above. We do not herein show the exact form of such reflector surface, nor of such lens surfaces, as those skilled in the arts are familiar with proper designs of such parts to ensure the desired results as pointed out above.

Referring to the showings of Figures 70 and 71 wherein we have disclosed means to produce the magnetizing effects at elemental areas of the surface of the tape for one form of magnetic recording; and referring to the showings of Figures 76 and 77 wherein we have disclosed means to sense such magnetic recordings by the "conductor" effect, we point out that the very minute magnetizing coils and/or the very minute sensing conductors shown in these figures, or their equivalents, may be readily produced by photo-etching operations on suitable sheets of plastic or other insulating carrier, if desired. Such operations will enable production of these very small elements with accuracy, and of size smaller than can be produced by various other operations; and when produced, such magnetizing or sensing elements will be rugged and dependable and readily attachable to the tube or other suitable element.

We claim:

1. A recording and translating device comprising in combination a movable element having a signal responsive recording surface of sensitive force emitting material, means to support said element in recording and translating position for movement of the element along a path of travel means to move the element along said path during the recording or translating operation, an electronic element including a gas tight envelope having a window, a gun in the envelope, said gun being constituted to emit a beam, means to support the envelope element with the window in proximity to the signal responsive surface of the movable element and extending across the same for a width thereof to be cross-scanned, a beam responsive surface within the envelope and in light transmitting proximity to said window, said surface being constituted to emit a secondary light beam of wave lengths within the ionizing frequency range at the location of excitation of said signal responsive surface by the beam, said secondary beam being directed towards the window, means to deflect the beam for traverse of the location of excitation of said surface along the window and transversely of the surface of the movable element, said window being formed of material transparent to wave lengths in the ionizing frequency range and the ionizing frequency wave lengths of the beam passing through said window and traversing the length of the window along a path of scan harmoniously with the deflections of the beam, said path of scan including a path transversely of the surface of the movable element, and means to control the strength of the beam emitted by the gun to thereby also control the strength of the secondary beam during scan of said secondary beam transversely of the surface of the movable element.

2. A device as defined in claim 1, wherein the beam emitted by the gun extends substantially parallel to the surface of the movable element at the location of said electronic tube element, together with means to reflect one of the beams through an angle and towards the surface of the movable element.

3. A device as defined in claim 2, wherein said reflecting means comprises a reflector outside of the envelope and in the path of the secondary beam.

4. A device as defined in claim 3, wherein the window and said beam responsive surface are located in alignment with the beam emitted by the gun, and in which the secondary beam emerges from the window in said alignment.

5. A device as defined in claim 1, together with means within the envelope to amplify one of the beams.

6. A device as defined in claim 1, wherein the window lies in a plane substantially parallel to the surface of the movable element at the location of scan, together with a reflector within the envelope to direct one of the beams towards the inside surface of the window.

7. A device as defined in claim 6, wherein said reflector is in the path of travel of the beam emitted by the gun.

8. A device as defined in claim 7, wherein said reflector is an amplifying device for amplifying the strength of the beam.

9. A device as defined in claim 1, wherein the beam emitted by the gun extends towards the surface of the movable element at the location of scan.

10. A tape recording and translating device comprising in combination a tape having a signal responsive recording surface of sensitive force emitting material, means to support said tape in recording and translating position for movement of the tape longitudinally of its axis, means to move the tape longitudinally, an electronic element in proximity to the signal responsive surface of the tape, said electronic element including a gas tight envelope having a window extending transversely of the tape and having a dimension in said transverse direction corresponding to the length of a record scan across the tape, a beam responsive surface within the envelope and in light transmitting proximity to said window, said surface being constituted to emit a light beam of wave lengths within the ionizing frequency range at the location of excitation of said surface by a beam, a gun in connection with said electronic element and mounted for production of a beam towards said surface to excite said surface for production of a secondary beam of light directed towards said window and of said ionizing frequency wave lengths, and means to deflect the beam for traverse of the location of excitation of said surface along the window and transversely of the tape, said window being formed of material transparent to wave lengths in the ionizing frequency range and the ionizing frequency wave lengths of the beam passing through said window and traversing the length of the window along a path of scan harmoniously with the deflections of the beam, said path of the ionizing wave length beam extending transversely of the tape, and a second electronic element in proximity to the tape adjacent to said transversely extending path of scan of said ionizing wave length beam, said second electronic element comprising a pair of parallel spaced apart electric conductors in close proximity to the surface of the tape and extending transversely of the tape at opposite sides of the path of the ionizing wave length beam, the ionizing wave length beam travelling in the space between said conductors and rendering said space electrically conducting proportionately to the strength of said ionizing wave length beam at each location of said beam during travel of said beam in its aforesaid path.

11. A device as defined in claim 10, together with means to provide a potential difference between the spaced apart electric conductors.

12. A device as defined in claim 10, together with means to sense and translate a record on said tape of signals to be sensed and translated and which signals correspond to varying strengths of force of the recording surface of the tape at different points of scan of the ionizing wave length beam, said means comprising means to maintain the strength of the beam produced by the gun substantially constant and the ionizing wave length beam substantially constant, the second electronic element comprising a sensing element, and means in connection with said second electronic element to produce a signal of strength proportional to the difference between the strength of the ionizing wave length beam and the strength of force of the signal responsive surface at each point of scan, and means to translate said signals.

13. A device as defined in claim 10, together with means within the envelope to amplify the strength of the beam emitted by the gun at a location between the gun and the beam responsive surface.

14. Means as defined in claim 15 wherein said amplifying means comprises dynode means.

15. A tape recording and translating device comprising in combination a tape having a surface of magnetizable material from which the force emitted is magnetic, means to support said tape in recording and translating position for movement of the tape longitudinally of its axis, means to move the tape longitudinally, an electronic element in proximity to the signal responsive surface of the tape, said electronic element including a gas tight envelope having a window extending transversely of the tape and having a dimension in said transverse direction corresponding to the length of a record scan across the tape, a beam responsive surface within the envelope and in light transmitting proximity to said window, said surface being constituted to emit a light beam of wave lengths within the ionizing frequency range at the location of excitation of said surface by a beam, a gun in connection with said electronic element and mounted for production of a beam towards said surface to excite said surface for production of a secondary beam of light directed towards said window and of said ionizing frequency wave lengths, and means to deflect the beam for traverse of the location of excitation of said surface along the window and transversely of the tape, said window being formed of material transparent to wave lengths in the ionizing frequency range and the ionizing frequency wave lengths passing through said window and transversing the length of the window along a path of scan harmoniously with the deflections of the beams, said path of scan including a path transversely of the tape adjacent to the location of the path of scan which extends transversely of the tape, and a second electronic element in proximity to the tape adjacent to the location of the path of scan which extends transversely of the tape, said second electronic element including spaced apart electric conductors, connections for flow of current to one conductor and from the other conductor, the ionizing wave length beam moving into said space between the conductors during execution of the scan along said path and ionizing the space between the conductors at each elemental location of said ionizing beam during each scan to make the space between the conductors current transmitting at such elemental location, and means to control the intensity of the beam emitted by the gun during the deflections of the beam, together with current supply means in connection with the conductors, the current flow between the conductors being influenced by the strength of the ionizing wave length beam related to the strength of the magnetic force emitted by the surface of the tape corresponding to each elemental location scanned by the ionizing wave length beam.

16. A device as defined in claim 15, together with means to make a record on said tape of signals to be recorded, said means including means to vary the strength of the beam emitted by the gun proportionately to the strengths of the signals to be recorded and with proportional variation of the strength of the ionizing wave length beam during scan, the conductivity of the space between the conductors being modulated at the location of the ionizing beam proportionately to the strength of the ionizing beam at such location with corresponding variation of the current flowing between the conductors at the changing location of such ionizing beam during scan, the current flowing between the conductors at each elemental location of the ionizing beam producing a magnetizing effect on the corresponding elemental area of the surface of the tape.

17. A device as defined in claim 15, wherein the tape comprises a strip of fabric together with a sheet or film of magnetizable foil on one face of such fabric.

18. A device as defined in claim 17, wherein said sheet or film of magnetizable foil is provided with ridges projecting from the surface of such sheet or film and of contour and location corresponding to successive scans.

19. A device as defined in claim 15, wherein the second electronic element includes a third conductor intermediate between two conductors, the first and second conductors being spaced apart from the third conductor and there being two parallel gaps between the third conductor and the first and second conductors, and wherein the first and second conductors are connected together and of one electrical polarity and the third conductor is of opposite electrical polarity.

20. A device as defined in claim 15, together with means to sense and translate magnetic effects of the surface of such tape corresponding to signals recorded on such surface, said means including means to maintain the strength of the beam emitted by the gun constant to correspondingly maintain the strength of the ionizing wave length beam constant, the conductivity of the beam ionized spaced between the conductors remaining constant during the scan of the ionizing beam, the current strength flow at such ionized space being influenced by the intensity of the magnetic effect of the surface of the tape corresponding to the ionized space between the conductors during scan, together with means to translate said current flow strength.

21. A tape recording and translating device comprising in combination a tape having an electronic charge carrying signal responsive surface from which the force emitted is electrostatic, means to support said tape in recording and translating position for movement of the tape longitudinally of its axis, means to move the tape longitudinally, an electronic element in proximity to the signal responsive surface of the tape, said electronic element including a gas tight envelope having a window extending transversely of the tape and having a dimension in said transverse direction corresponding to the length of a record scan across the tape, a beam responsive surface within the envelope and in light transmitting proximity to said window, said surface being constituted to emit a light beam of wave lengths within the ionizing frequency range at the location of excitation of said surface by a beam, a gun in connection with said electronic element and mounted for production of a beam towards said surface to excite said surface for production of a secondary beam of light directed towards said window and of said ionizing frequency wave lengths, and means to deflect the beam for traverse of the location of excitation of said surface along the window and transversely of the tape, said window being formed of material transparent to wave lengths in the ionizing frequency range and the ionizing frequency wave lengths passing through said window and traversing the length of the window along a path of scan harmoniously with the deflections of the beam, said path of scan including a path transversely of the tape adjacent to the location of the path of scan which extends transversely of the tape.

22. A device as defined in claim 21, together with means to make a record on said tape of signals to be recorded, said means including means to vary the strength of the beam emitted by the gun proportionately to the strengths of the signals to be recorded and with proportional variation of the strength of the ionizing wave length beam during scan, the ionizing wave length beam traverse of the path of scan discharging electrostatic charges from the tape at the ionized points of such scan by amounts proportionate to the strength of such ionizing beam at each point of such traverse with production of partially discharged elemental areas of the tape surface remaining of strengths corresponding to the signals recorded on such elemental areas.

23. A device as defined in claim 22, together with a second tape of electrostatic charge carrying surface characteristics, means to deliver said second tape into surface contact with the electrostatic charge carrying surface of the first mentioned tape at a location beyond the path of scan which extends transversely of the tape, and means to seal the tapes together with such surface contact condition.

24. A device as defined in claim 22, together with means to deliver to the surface of the tape at a location beyond the path of scan which extends transversely of the tape fine magnetizable material substantially in proportion to the strength of the electrostatic charge remaining on the tape at each element area thereof.

25. A device as defined in claim 24, together with a second tape of electrostatic charge carrying surface characteristics, means to deliver said second tape into surface contact with the electrostatic charge carrying surface of the first mentioned tape at a location beyond the location of delivery of such fine magnetizable material to the surface of the first mentioned tape, and means to seal the tapes together.

26. A device as defined in claim 24, together with means to sense and translate electromagnetic effects of the surface of such tape corresponding to signals recorded on such surface.

27. A device as defined in claim 22, together with a second electronic element in proximity to the tape adjacent to the location of the path of scan which extends transversely of the tape, said second electronic element including a plate element.

28. A device as defined in claim 21, together with means to sense and translate electrostatic effects of the surface of such tape corresponding to signals recorded on such surface, said means including means to maintain the strength of the beam emitted by the gun constant and correspondingly maintain the strength of the ionizing wave length beam constant, a second electronic element plate located in proximity to the surface of the tape opposite to the location of the first mentioned electronic element and in opposition to the path of scan across the tape, and having induced in such second electronic element plate a potential proportional to the charge remaining on the tape, together with means to translate such potential and connections between such translating means and said plate.

References Cited in the file of this patent

UNITED STATES PATENTS

| | | |
|---|---|---|
| 2,200,741 | Gray | May 14, 1940 |
| 2,351,889 | Strubig | June 20, 1944 |
| 2,698,928 | Pulvari | Jan. 4, 1955 |
| 2,716,048 | Young | Aug. 23, 1955 |
| 2,724,021 | Goeppinger | Nov. 15, 1955 |
| 2,900,443 | Camras | Aug. 18, 1959 |